(12) United States Patent
Dubey et al.

(10) Patent No.: US 10,679,008 B2
(45) Date of Patent: Jun. 9, 2020

(54) KNOWLEDGE BASE FOR ANALYSIS OF TEXT

(71) Applicant: Microsoft Technology Licensing, LLC, Redmond, WA (US)

(72) Inventors: Rajeev Dubey, Sammamish, WA (US); Navendu Jain, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 85 days.

(21) Appl. No.: 15/487,960

(22) Filed: Apr. 14, 2017

(65) Prior Publication Data

US 2018/0173698 A1 Jun. 21, 2018

Related U.S. Application Data

(60) Provisional application No. 62/435,480, filed on Dec. 16, 2016.

(51) Int. Cl.
G06F 40/30 (2020.01)
G06F 16/33 (2019.01)

(52) U.S. Cl.
CPC .......... *G06F 40/30* (2020.01); *G06F 16/3347* (2019.01)

(58) Field of Classification Search
None
See application file for complete search history.

(56) References Cited

U.S. PATENT DOCUMENTS

| 4,816,994 A * | 3/1989 | Freiling .............. G06F 11/2257 706/59 |
| 6,131,112 A * | 10/2000 | Lewis ................... H04L 41/042 709/207 |
| 6,446,081 B1 | 9/2002 | Preston |

(Continued)

FOREIGN PATENT DOCUMENTS

| CN | 103885938 | 6/2014 |
| EP | 1134727 | 9/2001 |

OTHER PUBLICATIONS

MacKay, "Information Theory, Inference, and Learning Algorithms", Cambridge University Press, Aug. 25, 2004, 641 pages, (2 parts).

(Continued)

*Primary Examiner* — Jonathan C Kim
(74) *Attorney, Agent, or Firm* — Schwegman Lundberg & Woessner, P.A.

(57) ABSTRACT

A knowledge base can include a dictionary associated with classes of a model, e.g., an ontology. A text segment that is not found in the dictionary can be received. Feature(s) can be determined for the text segment and, based partly on providing the feature(s) to a classifier, a set of values can be determined. The distribution can include values respectively corresponding to the classes. One of the values can be greater than a predetermined threshold. That value can correspond to a class. An indication identifying the class can be presented via a user interface having functionality to provide input that the text segment is associated with the class, is not associated with the class, or is associated with another class. Based at least partly on adding a new class to the ontology, a precedence table indicating priorities between motifs defining relationships between classes of the ontology can be updated.

15 Claims, 12 Drawing Sheets

(56) References Cited

U.S. PATENT DOCUMENTS

| | | | |
|---|---|---|---|
| 6,546,230 B1 | 4/2003 | Allison | |
| 6,742,141 B1* | 5/2004 | Miller | G06F 11/0748 706/45 |
| 6,829,734 B1* | 12/2004 | Kreulen | G06Q 30/02 379/9.02 |
| 7,010,593 B2* | 3/2006 | Raymond | H04L 41/0631 709/220 |
| 7,058,567 B2 | 6/2006 | Ait-Mokhtar et al. | |
| 7,209,923 B1* | 4/2007 | Cooper | G06F 16/285 |
| 7,246,159 B2* | 7/2007 | Aggarwal | G06F 11/3495 709/220 |
| 7,454,430 B1* | 11/2008 | Komissarchik | G06F 16/345 |
| 7,644,053 B2* | 1/2010 | Kipersztok | G06N 5/04 706/46 |
| 7,853,544 B2* | 12/2010 | Scott | G06F 40/30 706/46 |
| 7,995,485 B1* | 8/2011 | Anderson | H04L 41/0631 370/216 |
| 8,032,489 B2* | 10/2011 | Villella | G06F 11/3476 707/622 |
| 8,112,667 B2* | 2/2012 | Belluomini | G06F 16/334 714/27 |
| 8,161,325 B2* | 4/2012 | Calman | G06F 11/079 714/26 |
| 8,169,921 B2* | 5/2012 | Yang | H04L 41/0681 370/242 |
| 8,200,527 B1 | 6/2012 | Thompson et al. | |
| 8,285,697 B1* | 10/2012 | Truher | G06F 40/205 707/706 |
| 8,332,434 B2 | 12/2012 | Salkeld et al. | |
| 8,484,224 B1* | 7/2013 | Harris | G06F 16/487 707/748 |
| 8,489,530 B2* | 7/2013 | De | G06N 7/005 706/45 |
| 8,515,828 B1* | 8/2013 | Wolf | G06Q 30/02 705/26.1 |
| 8,699,939 B2 | 4/2014 | German et al. | |
| 8,747,115 B2 | 6/2014 | Lorge et al. | |
| 8,762,131 B1* | 6/2014 | Diaconescu | G06F 40/242 704/9 |
| 8,838,599 B2* | 9/2014 | Xu | G06F 16/313 707/737 |
| 9,092,802 B1* | 7/2015 | Akella | G06F 40/30 |
| 9,135,571 B2 | 9/2015 | Delaney et al. | |
| 9,262,438 B2* | 2/2016 | Agrawal | G06F 16/9537 |
| 9,892,192 B2* | 2/2018 | Chandrasekaran | G06F 16/3344 |
| 9,996,623 B1* | 6/2018 | Ferrill | G06F 16/9535 |
| 2002/0156817 A1* | 10/2002 | Lemus | G06F 16/38 715/256 |
| 2002/0161875 A1* | 10/2002 | Raymond | H04L 41/0631 709/223 |
| 2002/0165884 A1* | 11/2002 | Kreulen | G06F 16/93 715/259 |
| 2002/0169783 A1* | 11/2002 | Kreulen | G06F 16/355 |
| 2003/0172046 A1* | 9/2003 | Scott | H04L 41/024 |
| 2004/0030421 A1 | 2/2004 | Haley | |
| 2004/0148154 A1* | 7/2004 | Acero | G06F 40/216 704/1 |
| 2004/0148170 A1* | 7/2004 | Acero | G06F 40/216 704/257 |
| 2005/0027664 A1* | 2/2005 | Johnson | G06F 40/45 706/12 |
| 2005/0138486 A1* | 6/2005 | Gromyko | G06Q 10/10 714/49 |
| 2005/0138556 A1 | 6/2005 | Brun et al. | |
| 2005/0154690 A1* | 7/2005 | Nitta | G06F 16/30 706/46 |
| 2005/0171948 A1* | 8/2005 | Knight | G06F 16/313 |
| 2006/0010217 A1* | 1/2006 | Sood | H04L 51/12 709/206 |
| 2006/0026157 A1* | 2/2006 | Gupta | G06F 16/84 |
| 2006/0235881 A1* | 10/2006 | Masarie | G06F 40/295 |
| 2007/0005650 A1 | 1/2007 | Coen et al. | |
| 2007/0067293 A1* | 3/2007 | Yu | G06F 16/3346 |
| 2007/0276651 A1* | 11/2007 | Bliss | G10L 15/30 704/9 |
| 2008/0104032 A1* | 5/2008 | Sarkar | G06F 16/958 |
| 2009/0055684 A1* | 2/2009 | Jamjoom | G06F 11/0709 714/26 |
| 2009/0063387 A1* | 3/2009 | Beaty | G06N 5/04 706/50 |
| 2009/0083295 A1* | 3/2009 | Minamino | G06F 16/289 |
| 2009/0248671 A1* | 10/2009 | Maruyama | G06F 16/353 |
| 2010/0049590 A1* | 2/2010 | Anshul | G06Q 30/0203 705/7.32 |
| 2010/0063799 A1* | 3/2010 | Jamieson | G06F 16/36 704/9 |
| 2010/0169361 A1* | 7/2010 | Chen | G06F 16/285 707/769 |
| 2011/0153539 A1* | 6/2011 | Rojahn | G06F 16/367 706/50 |
| 2011/0282872 A1* | 11/2011 | Oksman | G06F 16/334 707/727 |
| 2011/0289076 A1* | 11/2011 | Boyle | G06N 5/04 707/723 |
| 2011/0295854 A1* | 12/2011 | Chiticariu | G06F 16/313 707/737 |
| 2011/0307435 A1* | 12/2011 | Overell | G06N 5/022 706/46 |
| 2011/0313962 A1* | 12/2011 | Jones | G06F 16/35 706/20 |
| 2012/0011428 A1* | 1/2012 | Chisholm | G06F 40/169 715/230 |
| 2012/0245924 A1* | 9/2012 | Brun | G06F 40/258 704/9 |
| 2012/0290715 A1* | 11/2012 | Dinger | H04L 12/6418 709/224 |
| 2013/0041921 A1* | 2/2013 | Cooper | G06F 16/3338 707/780 |
| 2013/0110498 A1* | 5/2013 | Bekkerman | G06Q 10/1053 704/9 |
| 2013/0332145 A1* | 12/2013 | Bostick | G06F 16/36 704/9 |
| 2013/0339288 A1* | 12/2013 | Lamanna | G06N 5/027 706/48 |
| 2014/0006861 A1* | 1/2014 | Jain | G06N 5/022 714/26 |
| 2014/0073882 A1 | 3/2014 | Choi et al. | |
| 2014/0288920 A1* | 9/2014 | Proux | G06N 5/025 704/9 |
| 2014/0365232 A1 | 12/2014 | Sadeghi | |
| 2015/0006519 A1* | 1/2015 | Jain | G06F 11/3636 707/723 |
| 2015/0019204 A1* | 1/2015 | Simard | G06F 16/951 704/9 |
| 2015/0019461 A1* | 1/2015 | Simard | G06N 7/005 706/11 |
| 2015/0142704 A1 | 5/2015 | London | |
| 2015/0161131 A1* | 6/2015 | Provine | G06F 16/248 707/731 |
| 2015/0178270 A1* | 6/2015 | Zuev | G06F 40/30 704/9 |
| 2015/0347375 A1* | 12/2015 | Tremblay | G06F 40/284 704/9 |
| 2015/0356142 A1* | 12/2015 | Proux | G06F 16/3334 706/11 |
| 2016/0034478 A1* | 2/2016 | Hernandez-Sherrington | G06F 16/2228 707/609 |
| 2016/0048772 A1* | 2/2016 | Bruno | G06N 5/022 706/11 |
| 2016/0078344 A1* | 3/2016 | Agarwal | G06F 16/9024 706/14 |
| 2016/0085741 A1* | 3/2016 | Blanchflower | G06F 40/295 704/9 |

(56) References Cited

U.S. PATENT DOCUMENTS

| | | | |
|---|---|---|---|
| 2016/0092523 | A1* | 3/2016 | Chandrasekaran .......................... G06F 16/3344 707/602 |
| 2016/0162456 | A1* | 6/2016 | Munro .................. G06F 16/243 704/9 |
| 2016/0162458 | A1* | 6/2016 | Munro .................... G06F 16/93 715/230 |
| 2016/0358242 | A1* | 12/2016 | Lagos ................... G06F 16/243 |
| 2017/0004184 | A1* | 1/2017 | Jain .......................... G06F 16/35 |
| 2017/0004205 | A1* | 1/2017 | Jain .......................... G06F 16/93 |
| 2017/0032027 | A1* | 2/2017 | Mauro ................ H04M 3/5133 |
| 2017/0214799 | A1* | 7/2017 | Perez .................... G06F 16/353 |
| 2017/0344625 | A1* | 11/2017 | Hosokawa ............ G06F 40/169 |
| 2018/0033017 | A1* | 2/2018 | Gopalakrishnan Iyer ................... G06F 40/205 |
| 2018/0060302 | A1* | 3/2018 | Liang .................... G06F 40/284 |
| 2018/0090136 | A1* | 3/2018 | Connell, II ............. G06F 40/20 |
| 2018/0300308 | A1* | 10/2018 | Kabeya ................. G06T 11/206 |

OTHER PUBLICATIONS

Manning, et al., "Foundations of Statistical Natural Language Processing", Retrieved at <<http://cs.famaf.unc.edu.ar/laura/llibres/snlp.pdf>>, In Book of Foundations of Statistical Natural Language Processing, Jun. 18, 1999, pp. 1-329, 353 pages, (Part 1 of 2).

Manning, et al., "Foundations of Statistical Natural Language Processing", Retrieved at <<http://cs.famaf.unc.edu.ar/laura/llibres/snlp.pdf<<, In Book of Foundations of Statistical Natural Language Processing, Jun. 18, 1999, pp. 330-680, 351 pages, (Part 2 of 2).

Marcus, et al., "Building a Large Annotated Corpus of English The Penn Treebank", Retrieved at <<http://delivery.acm.org/10.1145/980000/972475/p313-marcus.pdf>>, In Journal of Computational Linguistics—Special Issue on Using Large Corpora, vol. 19, Issue 2, Jun. 1993, pp. 18.

McCallum, et al., "Early Results for Named Entity Recognition with Conditional Random Fields, Feature Induction and Web-Enhanced Lexicons", Retrieved at <<http:l/people.cs.umass.edu/~mccallum/papers/mccallum-conll2003.pdf>>, In Proceedings of the Seventh Conference on Natural language learning at HLT-NAACL, vol. 4, May 31, 2003, pp. 4.

Medem, et al., "TroubleMiner: Mining Network Trouble Tickets", Retrieved at <<http://ieeexplore.ieee.org/stamp/stamp.jsp?tp=&arnumber5195946>>, In IFIP/IEEE International Symposium on Integrated Network Management—Workshops, Jun. 1, 2009, pp. 7.

Melchiors, et al., "Troubleshooting Network Faults Using Past Experience", Retrieved at <<http://ieeexplore.ieee.org/stamp.stamp.jsp?arnumber=00830413>>, In IEEE/IFIP Network Operations and Management Symposium, Apr. 10, 2000, pp. 14.

Mitra, et al., "Automatic Text Summarization by Paragraph Extraction", Retrieved at <<http://www.aclweb.org/anthology-newW/W97/W97-0707.pdf>>, In Proceedings of the Workshop on Intelligent Scalable Summarization at the ACL/EACL Conference, Jul. 7, 1997, pp. 8.

Muehlen, et al., "Developing Web Services Choreography Standards The Case of REST vs. SOAP", Retrieved at <<http://citeseerx.ist.psu.edu/viewdoc/download?doi=10.1.1.80.94&rep=rep&type=pdf>>, In Journal of Decision Support Systems Special Issue, Jul. 2005, pp. 35.

"N-Gram Extraction Tools", retrieved at <<http://goo.gl/VNT Ja>>, accessed on Oct. 31, 2012, 3 pages.

Nagao, et al., "A New Method of N-Gram Statistics for Large Number of Nand Automatic Extraction of Words and Phrases from Large Text Data of Japanese", Retrieved at <<http://delivery.acm.org/1 0.1145/1 000000/991994/p611-nagao.pdf>>, In COLING '94 Proceedings of the 15th Conference on Computational linguistics, vol. 1, Aug. 5, 1994, pp. 5.

Noy, et al., "Ontology Development 101: A Guide to Creating Your First Ontology.", Retrieved at <<http://protege.stanford.edu/publications/ontology_development/ontology101.pdf>>, In Technical Report of Stanford Knowledge Systems Laboratory and Stanford Medical Informatics, Mar. 2001, pp. 25.

Paolacci, et al., "Running Experiments on Amazon Mechanical Turk", Retrieved at <<http://repub.eur.nl/res/pub/31983/jdm10630a[1].pdf>>, In Judgment and Decision Making, vol. 5, No. 5, Aug. 2010, pp. 9

Patrick, et al. "Improving accuracy of identifying clinical concepts in noisy unstructured clinical notes using existing internal redundancy", In Proceedings of the fourth workshop on Analytics for noisy unstructured text data, Oct. 26, 2010, pp. 35-42, 8 pages.

Potharaju, et al., "Juggling the Jigsaw: Towards Automated Problem Inference from Network Trouble Tickets", In Proceedings of 10th USENIX Symposium on Networked Systems Design and Implementation, Apr. 2, 2013, pp. 127-141.

Qiu, et al., "What Happened in My Network Mining Network Events from Router Syslogs", Retrieved at <<http://conferences.sigcomm.org/imc/2010/papers/p472.pdf>>, In Proceedings of the 10th ACM SIGCOMM Conference on Internet Measurement, Nov. 1, 2010, pp. 13.

Raghavendra, et al., "No Power Struggles: Coordinated Multi-level Power Management for the Data Center", Retrieved at <<http://www.cs.pitt.edu/-kirklcs3150spring2010/2008_asplos_nopowerstruggles.pdf>>, In ACM SIGOPS Operating Systems Review, vol. 42, Issue 2, Mar. 1, 2008, pp. 12.

Roughan et al., "IP Forwarding Anomalies and Improving their Detection Using Multiple Data Sources", in the Proceedings of the ACM SIGCOMM Workshop on Network Troubleshooting: Research, Theory and Operations Practice Meet Malfunctioning Reality, Sep. 2004, 6 pages.

Seemakurty, et al., "Word Sense Disambiguation via Human Computation", Retrieved at <<http://www.cs.cmu.edu/~tomasic/doc/2010/SeemakurtyEtAIHCOMP2010.pdf>>, In Proceedings of the ACM SIGKDD Workshop on Human Computation, Jul. 25, 2010, pp. 4.

Shokripour, et al., "Automatic Bug Assignment Using Information Extraction Methods", In Proceedings of International Conference on Advanced Computer Science Applications and Technologies, Nov. 26, 2012, 6 pages.

Simm, et al., "Classification of Short Text Comments by Sentiment and Actionability for VoiceYourView", In Proceedings of IEEE International Conference on Social Computing / IEEE International Conference on Privacy, Security, Risk and Trust, Aug. 20, 2010, pp. 552-557.

Smadja, Frank., "Retrieving Collocations from Text: Xtract", Retrieved at <<http://acl.ldc.upenn.edu/J/J93/J93-1007.pdf>>, In Journal of Computational Linguistics—Special Issue on Using large Corpora, Mar. 1993, pp. 36.

Sorokin, et al., "Utility Data Annotation with Amazon Mechanical Turk", Retrieved at <<http://ieeexplore.ieee.org/stamp/stamp.jsptp=arnumber=4562953>>, In IEEE Computer Society Conference on Computer Vision and Pattern Recognition Workshops, Jun. 23, 2008, pp. 8.

Spasic et al., "Text mining and ontologies in biomedicine: Making sense of raw text", In the Journal of Briefing in Bioinformatics, vol. 6, No. 3, Sep. 2005, pp. 239-251.

"SQL Server", Retrieved at <<http://www.microsoft.com/sqlserver/en/us/default.aspx>>, Aug. 8, 2012, pp. 12.

Sukumaran, et al., "Integrating Structured and Unstructured Data Using Text Tagging and Annotation", In the Data Administration Newsletter, May 29, 2007, 6 pages.

Toutanova, et al., "Enriching the Knowledge Sources Used in a Maximum Entropy Part-of-Speech Tagger", Retrieved at <<http://nlp.stanford.edu/-manning/papers/emnlp2000.pdf>>, In Proceedings of the Joint SIGDAT Conference on Empirical Methods in Natural Language Processing and Very Large Corpora, Oct. 7, 2000, pp. 3.

Turner et al., "California Fault Lines: Understanding the Causes and Impact of Network Failures", in the Proceedings of the ACM SIGCOMM 2010 Conference, Aug. 2010, 12 pages.

Ukkonen, "On-line Construction of Suffix Trees", in the Journal of Algorithmica, vol. 14, Iss. 3, Sep. 1995, pp. 249-260.

Von Ahn, "Games with a Purpose", in the Journal of Computer, vol. 39, Iss. 6, Jun. 2006, pp. 92-94.

(56) References Cited

OTHER PUBLICATIONS

Von Ahn et al., "Labeling Images with a Computer Game", in the Proceedings of the SIGCHI Conference on Human Factors in Computing Systems, Apr. 2004, 20 pages.
Weight, "Allegiance: How Text Analytics Changes Everything", Retrieved on Apr. 15, 2015, Available at <<https://www.allegiance.com/documents/text_analytics_pdf>>, 6 pages.
Welch, "A Technique for High-Performance Data Compression", in the Journal of Computer, vol. 17, Iss. 6, Jun. 1984, 12 pages.
Wu et al., "Open Information Extraction using Wikipedia", in the Proceedings of the 48th Annual Meeting of the Association for Computational Linguistics, Jul. 2010, 10 pages.
Xu et al., "Detecting Large-Scale System Problems by Mining Console Logs", in the Proceedings of the ACM SIGOPS 22nd Symposium on Operating Systems Principles, Oct. 2009, 16 pages.
Yamamoto et al., "Using Suffix Arrays to Compute Term Frequency and Document Frequency for All Substrings in a Corpus", in the Journal of Computational Linguistics, vol. 27, Iss. 1, Mar. 2001, 30 pages.
Yamanishi, et al., "Dynamic Syslog Mining for Network Failure Monitoring" in the Proceedings of the 2005 Eleventh ACM SIGKDD International Conference on Knowledge Discovery in Data Mining, Aug. 2005, 10 pages.
Yuan et al., "SherLog: Error Diagnosis by Connecting Clues from Run-time Logs", in the Proceedings of the Fifteenth Edition of ASPLOS on Architectural Support for Programming Languages and Operating Systems, Mar. 2010, 12 pages.
Zhang et al., "Extraction of Chinese Compound Words—An Experimental Study on a Very Large Corpus", in the Proceedings of the Second Workshop on Chinese Language Processing: held in conjunction with the 38th Annual Meeting of the Association for Computational Linguistics, vol. 12, Oct. 2000, 8 pages.
Ziefle, "Effects of display resolution on visual performance", Human Factors, The Journal of the Human Factors and Ergonomics Society, vol. 40, No. 4, 1998, pp. 554-568.
Manning, et al., "Introduction to Information Retrieval", Retrieved at <<http://www.math.unipd.it/~aiolli/corsi/0910/IR/irbookprint.pdf>>, In Book of Introduction to Information Retrieval, May 27, 2008, pp. 504.
"Non Final Office Action Issued in U.S. Appl. No. 14/788,247", dated Jul. 23, 2018, 37 Pages.
"Non Final Office Action Issued in U.S. Appl. No. 14/788,695", dated Aug. 22, 2017, 15 Pages.
"International Preliminary Report on Patentability Issued in PCT Application No. PCT/US2016/039466", dated Sep. 4, 2017, 8 Pages.
"Second Written opinion Issued in PCT Application No. PCT/US2016/039466", dated Jun. 6, 2017, 7 Pages.
"Final Office Action Issued in U.S. Appl. No. 14/788,247", dated Apr. 2, 2018, 36 Pages.
"Non Final Office Action Issued in U.S. Appl. No. 14/788,247", dated Sep. 7, 2017, 33 Pages.
U.S. Appl. No. 14/788,247, Jain, et al., "Utilizing Semantic Hierarchies to Process Free-Form Text", filed Jun. 30, 2015, 43 pages.
Aciar, Silvana, "Mining Context Information from Consumer's Reviews", In Proceedings of 2nd Workshop on Context-Aware Recommender Systems, Sep. 30, 2010, 5 pages.
Aguilera et al., "Performance Debugging for Distributed Systems of Black Boxes", in the Proceedings of the 19th ACM Symposium on Operating Systems Principles, Oct. 19, 2003, 16 pages.
Aho et al., "Efficient String Matching: an Aid to Bibliographic Search", in the Journal of the Communications of the ACM, vol. 18, Iss. 6, Jun. 1975, 8 pages.
Ahonen et al., "Applying Data Mining Techniques for Descriptive Phrase Extraction in Digital Document Collections", in the Proceedings of the 1998 IEEE International Forum on Research and Technology Advances in Digital Libraries, Apr. 1998, 10 pages.
"Attensity Text Analytics Software", In Attensity White Paper, Retrieved on: Apr. 15, 2015, 14 pages.

Barco, et al., "Automated Troubleshooting of Mobile Networks Using Bayesian Networks", Retrieved at <<http://www.lcc.uma.es/-eva/doc/materiales/barco.pdf>>, in the Proceedings of the IASTED International Conference Communication Systems and Networks, Sep. 9, 2002, pp. 6.
Barnes et al., "A Hierarchical O(N log N) Force-Calculation Algorithm", in the Journal of Nature, vol. 324, Iss. 4, Dec. 4, 1986.
Baysal, et al., "A Bug You Like: A Framework for Automated Assignment of Bugs", In IEEE 17th International Conference on Program Comprehension, May 17, 2013, 2 pages.
Behnel, S. et al., "Cython: C-Extensions for Python", retrieved at <<http://cvthon.com>>, published 2008, accessed Oct. 31, 2012, 3 pages.
Bhattacharya, et al., "Automated, Highly-Accurate, Bug Assignment Using Machine Learning and Tossing Graphs", In Journal of Systems and Software, vol. 85, Issue 10, Oct. 2012, 37 pages.
Bos, et al., "Cascading style sheets, level 2 revision 1 CSS 2.1 specification", W3C working draft, W3C, Jun. 2005, 220 pages.
Bostock et al., "D3: Data-Driven Documents", in the Journal of the IEEE Transactions on Visualization and Computer Graphics, vol. 17, Iss. 12, Dec. 2011, 9 pages.
Brauckhoff et al., "Anomaly Extraction in Backbone Networks using Association Rules", in the Journal of IEEE/ACM Transactions on Networking (TON), vol. 20, Iss. 6, Dec. 2012, 7 pages.
Bray et al., "Extensible Markup Language (XML)", World Wide Web Consortium Recommendation REC-xml-19980210, available at ><http://www.w3.org/TR/PR-xml-971208>>, retrieved on Aug. 16, 2012, 42 pages.
Church et al., "Word Association Norms, Mutual Information, and Lexicography", in the Proceedings o fthe 27th Annual Meeting on Association for Computational Linguistics, Jun. 26, 1989, 8 pages.
Cohen et al., "Capturing, Indexing, Clustering, and Retrieving System History", in the Proceedings of the 20th SCM Symposium on Operating Systems Principles, Oct. 2005, 14 pages.
Cooley et al., "Web Mining: Information and Pattern Discovery on the World Wide Web", in the Proceedings of the Ninth IEEE International Conference on Tools with Artificial Intelligence, Nov. 1997, 10 pages.
Deerwester et al., "Indexing by Latent Semantic Analysis", in the Journal of the American Society for Information Science, vol. 41, No. 6, Sep. 1990, 17 pages.
Ellram, et al., "Total Cost of Ownership a Key Concept in Strategic Cost Management Decisions", in the Journal of Business Logistics, vol. 19, No. 1, 1998, pp. 55-84.
Ensan, et al., "Towards Domain-Centric Ontology Development and Maintenance Frameworks", In Proceedings of the 19th International Conference on Software Engineering & Knowledge Engineering, Jul. 9, 2007, 6 pages.
"Enterprise Feedback Management", Published on: Jun. 30, 2012 Available at: <<http://www.forumresearch.com/services-enterprise-feedback-management.asp>>, 2 pages.
Fielding, "Architectural Styles and the Design of Network-based Software Architectures", Doctoral Dissertation, available at <<http://jpkc.fudan.edu.cn/picture/article/216/35/4b/22598d594e3d93239700ce79bce1/7ed3ec2a-03c2-49cb-8bf8-5a90ea42f523.pdf>>, Aug. 2012, 180 pages.
Ford et al., "Availability in Globally Distributed Storage Systems", in the Proceedings of the 9th USENIX Conference on Operating Systems Design and Implementation, Oct. 4, 2010, 14 pages.
Fruchterman, et al, "Graph drawing by force-directed placement", Software Practice and Experience, vol. 21. No. 11, Nov. 1991, pp. 1129-1164.
Garrett, "Ajax: A New Approach to Web Applications", retrieved on Aug. 16, 2012, available at <<http://scholar.googleusercontent.com/scholar?q=cache:DY1KmbMV5IMJ:scholar.google.com>>, 6 pages.
Gill et al., "Understanding Network Failures in Data Centers: Meaurement, Analysis, and Implications", in the Proceedings of the ACM SIGCOMM 2011 Conference, Aug. 15, 2011, 12 pages.
Goldstein et al., "Summarizing Text Documents: Sentence Selection and Evaluation Metrics", in the Proceedings of the 22nd Annual International ACM SIGIR Conference on Research and Development in Information Retrieval, Aug. 1999, 8 pages.

(56) References Cited

OTHER PUBLICATIONS

Gruber, "Toward principles for the design of ontologies used for knowledge sharing", in the International Journal of Human-Computer Studies—Special issue: the Role of Formal Ontology in the Information Technology, vol. 43, Iss. 5-6, Nov./Dec. 1995.

Gruschke, "Integrated event management Event Correlation Using Dependency Graphs", in the Proceedings of the 9th IFIP/ IEEE International Workshop on Distributed Systems, Operations and Management, Oct. 1998, 12 pages.

Heim, "Anaphora and Semantic Interpretation: A Reinterpretation of Reinhart's Approach", MIT Working Papers in a Linguistics 25, 1998; pp. 205-246.

Hickson, "A Vocabulary and Associated APIs for HTML and XHTML", Editor's Draft, available at: <<https://sonnycc.files.wordpress.com/2010/12/html5.pdf>>, 23 pages.

Huang, et al., "Diagnosing Network Disruptions with Network-Wide Analysis", Retrieved at <<http://www.cc.gatech.edu/-jx/reprints/metrics160.pdf>>, in the Proceedings of the ACM SIGMETRICS International Conference on Measurement and Modeling of Computer Systems, Jun. 12, 2007, pp. 12.

PCT Search Report for corresponding PCT International Application No. PCT/US2016/039467 dated Oct. 10, 2016, 6 pages.

PCT Search Report and Written Opinion for corresponding PCT International Application No. PCT/US2016/039466 dated Oct. 10, 2016, 12 pages.

Johnson, "NOC Internal Integrated Trouble Ticket System Functional Specification Wishlist ("NOC TT Requirements")", Merit Network Inc., Jan. 1992, 13 pages.

Jonsson, et al., "Automated Bug Assignment: Ensemble-based Machine Learning in Large Scale Industrial contexts", In Proceedings of Empirical Software Engineering, Retrieved on: Apr. 29, 2015, 52 pages.

"JQuery", available at <<http://jquery.com/>>, retrieved on Aug. 7, 2012, 1 page.

Justeson, et al., "Technical terminology: some linguistic properties and an algorithm for identification in text", Natural Language Engineering: vol. 1, No. 1, Mar. 1995, pp. 9-27.

Kandula, et al., "Detailed Diagnosis in Enterprise Networks", Retrieved at <<http://research.microsoft.com/pubs/80590/sigcomm09-395.pdf>>, in the Proceedings of the ACM SIGCOMM Conference on Data Communication, Aug. 17, 2009, pp. 12.

Kandula, et al., "What's Going On? Learning Communication Rules in Edge Networks", Retrieved at <<http://citeseerx.ist.psu.edu/viewdoc/download?doi=10.1.1.145.3918&rep=rep1&type=pdf>>, in the Proceedings of the ACM SIGCOMM Conference on Data Communication, Aug. 17, 2008, pp. 12.

Khanna et al., "Automated Rule-Based Diagnosis through a Distributed Monitor System", in the Journal of IEEE Transactions on Dependable and Secure Computing, vol. 4, Iss. 4, Oct. 2007, 14 pages.

Konig et al., "Reducing the Human Overhead in Text Categorization", in the Proceedings of the 12th ACM SIGKDD International Conference on Knowledge Discovery and Data Mining, Aug. 2006, 6 pages.

Labovitz et al., "Experimental Study of Internet Stability and Backbone Failures", in the Proceedings of the Twenty-Ninth Annual International Symposium on Fault-Tolerant Computing, Jun. 1999, 8 pages.

Lang, et al., "Enhancing Business Intelligence with Unstructured Data", In Proceedings of Conference on Database Systems in Business, Technology and Web, Mar. 2, 2009, pp. 469-485..

Law et al., "An Integrated Case-Based Reasoning Approach for Intelligent Help Desk Fault Management", in the Journal of Expert Systems with Applications, vol. 13, Iss 4, Nov. 1997, pp. 265-274.

Lim et al., "A Log Mining Approach to Failure Analysis of Enterprise Telephony Systems", in the Proceedings of the 2008 IEEE International Conference on Dependable Systems and Networks with FTCS and DCC, Jun. 2008, pp. 398-403.

Loper, et al., "NLTK: The Natural Language Toolkit", Retrieved at <<http://arxiv.org/pdf/cs/0205028v1.pdf>>, In Proceedings of the Workshop on Effective Tools and Methodologies for Teaching Natural Language Processing and Computational Linguistics, May 17, 2002, pp. 8.

Manber, et al., "Suffix arrays a New Method for on-Line String Searches", Retrieved at <<http://webglimpse.net/pubs/suffix.pdf>>, In Proceedings of the First Annual ACM-SIAM Symposium on Discrete Algorithms, Jan. 22, 1990, pp. 16.

Mani, et al., "The Tipster Summac Text Summarization Evaluation", Retrieved at <<http://acl.ldc.upenn.edu/E/E99/E99-1011.pdf>>, In Proceedings of the Ninth Conference on European Chapter of the Association for Computational Linguistics, Jun. 8, 1999, pp. 9.

"Final Office Action Issued in U.S. Appl. No. 14/788,247", dated Feb. 7, 2019, 20 Pages.

"Notice of Allowance Issued in U.S. Appl. No. 14/788,247", dated May 1, 2019, 14 Pages.

\* cited by examiner

DOCUMENT 300

302 — {2B2BBEE0-E7CC-11E5-B623-0002A5D5C51B}

304

| TEXT SECTION | THE 'FULLSCREEN' BUTTON ON WINDOWS 10 APPS SHOULD BE IN A DIFFERENT PLACE, SO THAT THE TRADITIONAL 'MINIMIZE,' 'CLOSE,' AND 'MAXIMIZE/RESTORE' BUTTONS APPEAR IN THE REGULAR ORDER. |

312  308

310

306

| FEEDBACK SOURCE: | UIF | LAST MODIFIED BY: | |
| --- | --- | --- | --- |
| CREATED DATE: | MARCH 14, 2015 | LAST MODIFIED ON: | |
| CREATED TIME: | 9:26:53 AM | SURVEY QUESTION ID: | 42 |
| CREATED BY USER: | JDOE | SURVEY RESPONSE: | 4 |
| HARDWARE TYPE: | TABLET | AMBIENT LIGHT: | 250 LUX |
| HARDWARE ID: | {374CE8C0-E7CC-11E5-8848-0002A5D5C51B} | | |

1202 — PRESENT, VIA A USER INTERFACE, AN INDICATION ASSOCIATED WITH A WORD OR A PHRASE NOT FOUND IN A DICTIONARY ASSOCIATED WITH A KNOWLEDGE BASE, THE INDICATION SUGGESTING AT LEAST ONE CLASS ASSOCIATED WITH A MODEL TO WHICH THE WORD OR THE PHRASE BELONGS

1204 — DETERMINE AN INPUT ASSOCIATED WITH THE USER INTERFACE

1206 — DETERMINE, BASED AT LEAST IN PART ON THE INPUT, AN OPTION SELECTED

ACCEPT / REJECT / MODIFY

1208 — MAP THE WORD OR THE PHRASE TO AN ENTRY IN THE DICTIONARY CORRESPONDING TO THE AT LEAST ONE CLASS

1210 — DO NOT ADD THE WORD OR THE PHRASE TO THE DICTIONARY

1212 — MAP THE WORD OR THE PHRASE TO AN ENTRY IN THE DICTIONARY CORRESPONDING TO A NEW CLASS

KNOWLEDGE BASE FOR ANALYSIS OF TEXT

RELATED APPLICATIONS

This application claims the benefit of U.S. Provisional Application No. 62/435,480 filed on Dec. 16, 2016, the entire contents of which are incorporated herein by reference.

BACKGROUND

Users often provide feedback regarding products, services, software elements, or hardware elements through various means. In some instances, the feedback relates to bugs, problems, or other issues with the software or hardware, while in other instances the feedback relates to asking questions, reporting experiences (e.g., positive/negative feedback), or providing suggestions for improving the software or hardware. In further instances, the feedback includes text or other information, such as a general description about how the software or hardware works, a feature that a user likes or dislikes, information that is not related to the software or hardware, and so on. For example, a user might use a support interface provided by an operating system to let an administrator know about features that the user likes and problems that the user is having with a particular feature of the operating system. Users also often provide responses to their feedback items, and engage in dialog with technical-support personnel, e.g., via online services. Such dialog can be conducted, e.g., to resolve problems.

In many instances, the feedback is manually viewed and evaluated by administrators (or other people associated with the service, software, or hardware) to identify bugs or other issues with the service, software, or hardware that need fixing. Since the feedback is manually evaluated, and often recorded in a user terminology which is different from terminology used by administrators. In some instances, the feedback encompasses multiple different types of information (which may or may not be applicable to the administrators or others reviewing the feedback), the administrators spend considerable time analyzing the feedback. Moreover, some systems designed to assist administrators in reviewing suggestions are unable to correctly process unknown terms, such as the names of recently-released products. Since user feedback often accompanies product releases, this greatly limits the usefulness of such systems to administrators. Furthermore, some systems designed to assist administrators in reviewing feedback are inaccurate and/or are unable to infer feedback based on granularity levels that are appropriate for the intended purpose. Again, such shortcomings greatly limit the usefulness of such systems to administrators.

SUMMARY

This disclosure describes systems, methods, and computer-readable media for generating and/or updating a knowledge base that can be utilized for analyzing free-form text. The knowledge base can include a dictionary, which can be associated with a plurality of entries. The plurality of entries can respectively correspond with individual classes of a plurality of classes of a model, e.g., an ontology. A first text segment, e.g., a word or a phrase, that is not found in a dictionary can be received. A set of features associated with the first text segment can be determined and can be provided to a classifier. In some examples, based at least in part on providing the set of features to the classifier, a set of probabilities, set of values, and/or set of multi-dimensional information criteria, associated with the classes predicted for the first text segment can be determined. The set of probabilities, set of values, and/or set of multi-dimensional information criteria can include a plurality of probabilities, values, and/or multi-dimensional information criteria, respectively, corresponding to individual classes of the plurality of classes. The plurality of probabilities, values, and/or multi-dimensional information criteria can be compared to a predetermined threshold. In at least one example, the predetermined threshold can be multi-dimensional. At least one probability, value, and/or multi-dimensional information criteria of the plurality of probabilities, values, and/or multi-dimensional information criteria, respectively, can be determined to be greater than the predetermined threshold. The at least one probability, value, and/or multi-dimensional information criteria can correspond to the class.

An indication identifying the class can be presented via a user interface, which can have functionality to provide an acceptance that the first text segment is associated with the class, a rejection that the first text segment is not associated with the class, or a modification of the class to another class of the plurality of classes or to a new class. In an example, an input corresponding to the acceptance that the first text segment is associated with the class can be determined and the first text segment can be mapped to the entry in the dictionary. In an alternative example, an input corresponding to the rejection that the first text segment is not associated with the class can be determined and the first text segment may not be mapped to the entry in the dictionary. In yet another alternative example, an input corresponding to modification of the class to another class of the plurality of classes can enable the first text segment to be mapped to another entry in the dictionary corresponding to the other class or new class instead of the entry corresponding to the class. That is, in such examples, an input corresponding to a modification can change the mapping between the first text segment and a class identified by the classifier to a different class, e.g., specified by an administrator.

In the example where the first text segment is mapped to the entry in the dictionary, a document including free-form text can be received. The document can be associated with a second text segment that is substantially similar to the first text segment. The second text segment can be determined to be associated with the class, and an actionable item associated with the second text item can be determined based at least in part on the class and at least one grammar pattern. Information about the actionable item can be provided to individuals for evaluation. For instance, an administrator that manages a particular software and/or hardware element can be informed of the actionable item for an enhancement to the particular software and/or hardware element. Based on the information, the administrator can fix a problem with the software, implement a new feature, and/or perform a variety of other acts.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 shows an example document in accordance with some examples.

FIG. 12 is a flow diagram that illustrates another example process for updating a dictionary.

DETAILED DESCRIPTION

Overview

Figure 1:
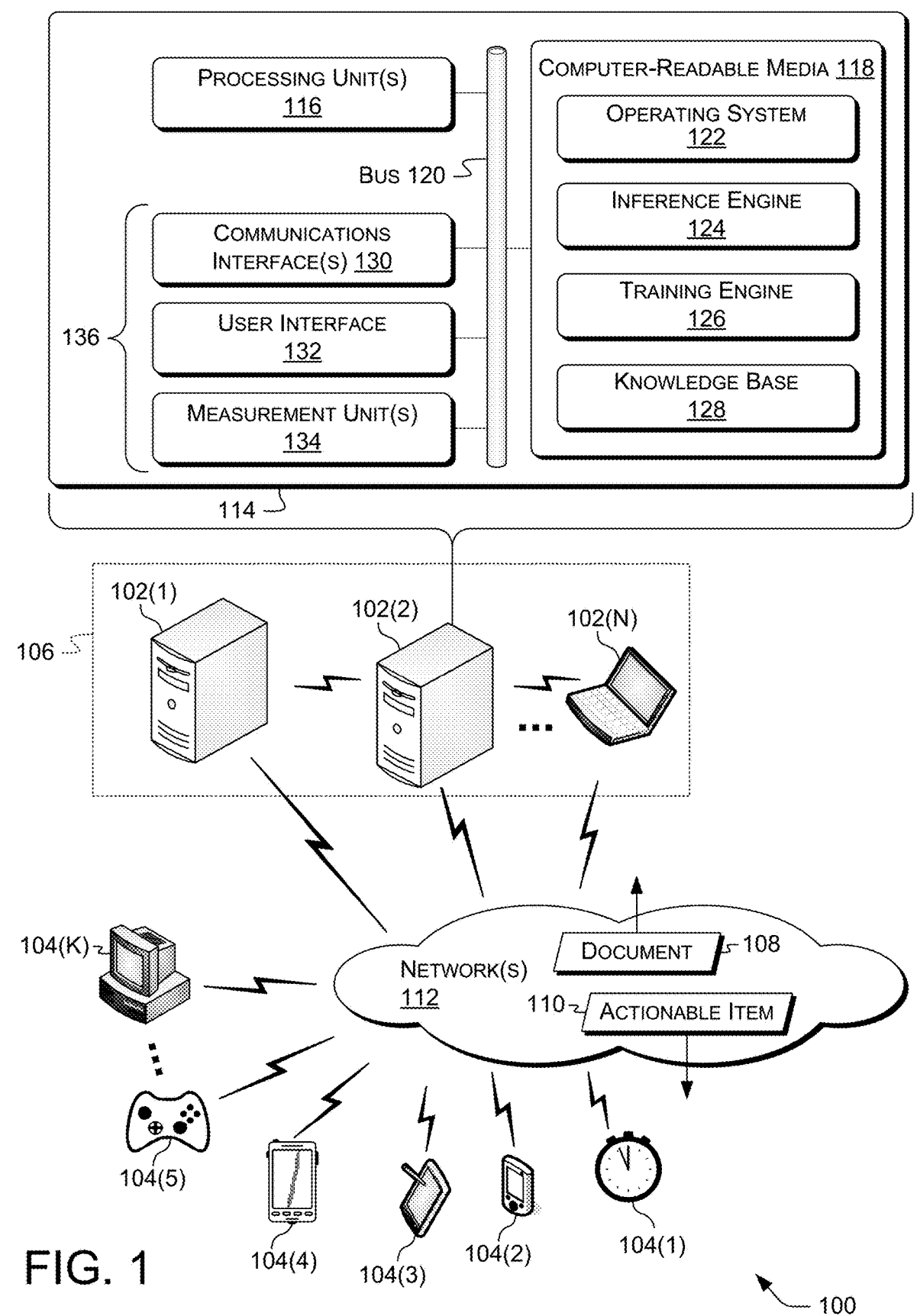
FIG. 1 is a block diagram depicting an example environment for implementing automated text analysis as described herein.

This document relates to analysis of data, and more particularly to performing automated inference of motifs expressed in documents. As used herein, a "motif" is a high-level category of an "actionable item." That is, a "motif" can be a high-level category associated with a specific grammar pattern, as described herein. Example motifs can include, e.g., a user statement, suggestion, question, resolution report, blocking issue or problem, or action statement. An "actionable item" corresponding to the motif can be a piece of text, e.g., provided by a user, that corresponds to the specific grammar pattern. Actionable items can include, e.g., prompts, indications, flagged statements, or other data, e.g., text. Various examples are directed to techniques and architectures for automatically processing user feedback based on a knowledge base, e.g., to determine actionable items. Example techniques described herein are directed to creating and updating a knowledge base of a system, e.g., by semi-automatically adding words and/or phrases to a dictionary associated with the knowledge base. Furthermore, example techniques described herein are directed to prioritizing multiple motifs inferred for a document based on a framework associated with the knowledge base. Additionally, example techniques described herein include enhancing the dictionary to enable more granular inferences.

Various examples can provide information about actionable items to individuals for evaluation. Actionable items can relate to software, hardware, and/or another item or entity. In some examples, an administrator that manages a particular software and/or hardware element can be informed of actionable items for an enhancement to the particular software and/or hardware element. Based on the information, the administrator can fix a problem with the software, implement a new feature, and/or perform a variety of other acts.

In some implementations of techniques described herein, a service provider can collect one or more documents, e.g., documents that include user feedback. The one or more documents can be collected from a variety of sources, such as an online source, a customer support portal, an electronic message, a conversation with a customer or intelligent personal assistant, and so on. The one or more documents can generally include at least some free-form text provided by a user, e.g., text in a natural language. Further, the one or more documents can include a variety of information which may or may not be relevant to an actionable item. For example, a document can include a sentence regarding a problem that a user is having with a software element, a sentence regarding a feature of the software element for which the user has indicated an interest, e.g., a feature the user likes, a sentence that is unrelated to the software element, and so on. Examples herein are given in the English language, but this is not limiting. Example techniques herein can be adapted to other natural or constructed languages.

The service provider can analyze a document based on a knowledge base. Individual text segments, e.g., sentences, phrases, words, etc., of the document can be tagged with classes of a model such as an ontology. Phrases matching criteria such as described herein, can be associated with classes of the ontology. Examples of such phrases can include technical phrases, e.g., domain-specific phrases, product names, or component names. Patterns of the classes can then be located in the tagged text segments to determine motifs such as a problem, a suggestion, a question, a delighter, or a resolution. For example, a tagged text segment that matches a grammar pattern that is associated with a particular motif, e.g., a suggestion, can be identified as including the particular motif, e.g., the suggestion. In other words, the service provider can determine that the tagged text segment describes a problem, a suggestion, or other item that can be addressed by performing a task. In some examples, a text segment may include more than one motif.

Example techniques described herein further enable more granularity such that individual motifs can be associated with fundamental areas. As used herein, "fundamental area" can correspond to an area of interest to a domain expert, an administrator, or another individual. For instance, each product or service domain can have domain specific aspects which are fundamental to how end users judge the quality of the product or service. As a non-limiting example, in a software domain, the fundamental areas can correspond to compatibility, functionality, localization, performance, privacy, reliability, usability, security, etc. In at least one example, a fundamental area can be a user-defined class of the model, e.g., an ontology. As non-limiting examples, the service provider can determine that the tagged text segment describes a performance problem, a security suggestion, or a localization question that can be addressed by performing a task. In some examples, rule-based systems and/or machine learning models can be built based on the tagged text segment to classify the input document into one or more of the motifs and/or fundamental areas.

The service provider can make information available regarding actionable items found in the one or more documents. The information can be made available in a variety of manners to a variety of individuals. In some examples, an actionable item regarding a software entity can be provided to an individual that manages the software entity, e.g., sent in an email, provided via an interface, etc. In another example, an individual can request actionable items for a particular entity, e.g., via a graphical interface. In yet another example, information regarding actionable items can include a ranking of the actionable items. The ranking can be performed, e.g., based on frequency or domain-specific criteria such as relevance to a particular topic or category or importance for accomplishing a particular goal. For instance, if an individual makes a request to view top actionable items for an instant messaging application, the service provider can provide a ranking of actionable items that are identified for the instant messaging application across user feedback from multiple users.

In some instances, the techniques and architectures described herein can normalize user feedback. For example, by mapping user feedback to ontologies, the user feedback can be grouped according to various classes of words or phrases. This can increase consistency of words across various contexts. For example, a customer term for a problem with a software element can be mapped to a class that represents a technical term used by an administrator of the software element. Further, the techniques and architectures can analyze text in the form in which the text is presented, e.g., analyze a text segment based on surrounding text segments, such as surrounding words or phrases. This mapping can be performed in a hierarchical manner, e.g., by mapping portions of a parse tree of the text to respective classes of a model.

In many instances, the techniques and architectures are described herein in the context of actionable items related to software or hardware. However, the techniques and architectures can be applicable to a wide variety of contexts, such as in a consumer context where feedback of consumer products is analyzed, a vehicle context where feedback of vehicles is analyzed, a consumable item context where feedback of consumable items is analyzed, e.g., food, a service context where feedback of a service is analyzed, e.g., restaurant service or another business service, and so on.

As used, the term "document" refers to a collection of one or more words, and can include both electronic and physical documents. In the context of an electronic document, the term can encompass the combination of human-language words along with metadata, e.g., as in the case of a word processing document or spreadsheet document. The term "feedback record" refers to a particular type of document that includes user feedback, e.g., solicited or unsolicited feedback. In some examples, contents of a document can be processed upon receipt or retrieval of the complete data for that document. For example, an e-mail message can be processed once the message has been completely received. In some examples, contents of a document can be processed as they become available. For example, a microblog feed such as the TWITTER "firehose" stream, considered as a single document, can be processed as new microblog entries become available. Example techniques described herein can be applied to whatever data is available, unless expressly indicated otherwise.

Some documents can include certain automated fields that are auto-filled by software that generates the documents. For example, auto-filled fields can be populated by the document-generating software with particular data values that relate to software being used or software generating the document. Documents can also include unstructured data, such as free-form text produced by humans communicating about the problem, or semi-structured data generated by machines or software, such as logging messages generated by one or more devices. As discussed in more detail below, some example implementations can process this unstructured or semi-structured data to automatically infer various motifs, e.g., individual problems, actions, or suggestions inferred from an individual document and trends associated with the network failures inferred using multiple documents.

Some examples, scenarios, and examples of techniques for analysis of free-form user text in accordance with various examples are presented in greater detail in the description of the following figures.

Illustrative Environment

FIG. 1 shows an example environment 100 in which examples of full-text analysis systems can operate or in which inference analysis methods such as described below can be performed. In the illustrated example, various devices and/or components of environment 100 include computing devices 102(1)-102(N) (individually or collectively referred to herein with reference 102), where N is any integer greater than or equal to 1, and computing devices 104(1)-104(K) (individually or collectively referred to herein with reference 104), where K is any integer greater than or equal to 1. In some examples, N=K; in other examples, N>K or N<K. Although illustrated as, e.g., desktop computers, laptop computers, tablet computers, IoT sensors, or cellular phones, computing devices 102 or 104 can include a diverse variety of device categories, classes, or types and are not limited to a particular type of device.

In the illustrated example, computing devices 102(1)-102(N) can be computing nodes in a cluster 106, e.g., a cloud service such as MICROSOFT AZURE, IBM BLUEMIX, etc. Cloud computing permits computing resources to be provided as services rather than a deliverable product. For example, in a cloud-computing environment, computing power, software, storage, information, and/or network connectivity are provided (for example, through a rental agreement) over a network, such as the Internet. In the illustrated example, computing devices 104 can be clients of cluster 106 and can submit jobs to cluster 106 and/or receive job results from cluster 106. Computing devices 102(1)-102(N) in cluster 106 can, e.g., share resources, balance load, increase performance, or provide fail-over support or redundancy. In some examples, some of the computing devices 102 can be hosted by a cloud service and others hosted at a customer's site. In the illustrated example, computing devices 104 communicate with computing devices 102. Additionally or alternatively, computing devices 104 can communicate with cluster 106, e.g., with a load-balancing or job-coordination device of cluster 106, and cluster 106 or components thereof can route transmissions to individual computing devices 102. Computing devices 104 can additionally or alternatively operate in a cluster or grouped configuration.

By way of example and not limitation, computing devices 102 or 104 can include, but are not limited to, server computers or blade servers such as Web servers, map/reduce servers or other computation engines, or network-attached-storage units (e.g., 102(1)), laptop computers, thin clients, terminals, or other mobile computers (e.g., 102(N)), wearable computers such as smart watches or biometric or medical sensors, implanted computing devices such as biometric or medical sensors, or fixed sensors, such as IoT sensors, configured to monitor time, environmental conditions, vibration, motion, or other attributes of the world or structures or devices therein, e.g., bridges or dams (e.g., 104(1), represented graphically as a clock), computer navigation client computing devices, satellite-based navigation system devices including global positioning system (GPS) devices and other satellite-based navigation system devices (e.g., 104(2), represented graphically as a PDA), tablet computers or tablet hybrid computers (e.g., 104(3)), smartphones, mobile phones, mobile phone-tablet hybrid devices, or other telecommunication devices (e.g., 104(4)), portable or console-based gaming devices or other entertainment devices such as network-enabled televisions, set-top boxes, media players, cameras, or personal video recorders (PVRs) (e.g., 104(5), represented graphically as a gamepad), automotive computers such as vehicle control systems, vehicle security systems, or electronic keys for vehicles, personal data assistants (PDAs), desktop computers (e.g., 104(K)), or integrated components for inclusion in computing devices, appliances, or other computing devices configured to participate in or carry out root-cause determination as described herein, e.g., for software debugging or monitoring purposes. In some examples, as indicated, computing devices, e.g., computing devices 102(1) and 102(2), can intercommunicate to participate in or carry out text analysis or inference as described herein.

Different devices or types of devices can have different uses for text analysis results. For example, devices generally used by individual users such as computing devices 104(2)-104(4) can present confirmation to the users that their suggestions or other feedback documents have been received. Devices generally used by system administrators, such as computing device 104(K), can display detected actionable items, e.g., suggestions, or trends in actionable items, e.g., to persons responsible for entities relevant to the suggestions or other actionable items. Users, administrators, or other entities receiving reports of actionable items, can choose to base future decisions on those reports, though this is not required.

In some examples, users of computing devices 104 communicate with providers of, e.g., hardware of computing devices 102 or 104 or software running thereon, to provided user feedback or comments regarding the hardware or software. Such communications are referred to herein as documents 108 and can be transmitted, e.g., electronically from a computing device 104 to a computing device 102. Such transmissions can be directly from a user. Additionally or alternatively, a user can communicate feedback to, e.g., a customer-service agent using a computing device 104(K), and the agent can provide a corresponding document 108 to computing devices 102.

In some examples, documents 108 can include structured data populated by computing devices 102 or 104, unstructured data such as free-form user text written by individual users, e.g., feedback from a user in a natural or constructed language, automated messages/events logged by one or more computing devices 102 or 104, or combinations thereof. As used herein, the term "free-form user text," when used in the context of a group of documents 108, refers to free-form user text in at least one of the documents 108. Examples of types of data in a document are discussed below with reference to FIG. 3. Users can provide documents 108, e.g., during the course of use of a hardware or software product or service, when such a product or service crashes or otherwise malfunctions, or upon request, e.g., from computing device 102 or 104 or a software program running thereon. Various examples of documents 108 are discussed herein, e.g., with reference to the MICROSOFT CORTANA speech-recognition and personal-assistant software. However, these examples are not limiting. For example, the APPLE SIRI personal-assistant software or other types of personal-assistant software can also be used to provide documents 108.

In some examples, computing device(s) 102 analyze received documents 108 to infer user meaning. For example, computing device(s) 102 can determine motif(s) associated with a received document 108 and can determine actionable item(s) 110 based at least in part on the motif(s) inferred from the document 108. A document 108 can correspond to one actionable item 110, e.g., "SIRI should do logging," or to multiple actionable items 110, e.g., "CORTANA should read my mind and should control the weather." Another example of an actionable item 110 is a resolution, e.g., "I'm glad my teleporter works now!" Computing device(s) 102 can transmit information associated with actionable items 110 to computing device(s) 104, e.g., to a computing device 104(K) such as a workstation, or other computing device 104 of a user that is associated with management of the software or hardware that is the subject of the actionable item 110, e.g., CORTANA or SIRI.

In some examples, computing devices 102 or 104 can communicate with each other or with other computing devices via one or more networks 112. For example, as indicated, computing devices 104 can transmit documents 108 to computing devices 102 and receive actionable items 110 from computing devices 102, via network(s) 112. In some examples, computing devices 102 or 104 can communicate with external devices via networks 112. For example, networks 112 can include public networks such as the Internet, private networks such as an institutional or personal intranet, cellular networks, or combinations of private and public networks. Networks 112 can also include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof.

Networks 112 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, networks 112 can also include a number of devices that facilitate network communications or form a hardware infrastructure for the networks, such as switches, routers, gateways, access points, firewalls, base stations, repeaters, backbone devices, and the like. Networks 112 can also include devices that facilitate communications between computing devices 102 or 104 using bus protocols of various topologies, e.g., crossbar switches, INFINIBAND switches, or FIBRE CHANNEL switches or hubs.

Different networks have different characteristics, e.g., bandwidth, latency, accessibility (open, announced but secured, or not announced), or coverage area. Computing devices 104 can use networks 112 having appropriate characteristics in communicating documents 108, e.g., synchronously or asynchronously, to computing device(s) 102. The type of network 112 used for any given connection between, e.g., a computing device 104 and cluster 106 can be selected based on these characteristics and on the type of interaction. For example, a low-power, low-bandwidth network can be selected for IoT sensors, and a low-latency network can be selected for smartphones such as computing device 104(4).

In some examples, networks 112 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX, or multiples or combinations thereof.

Still referring to the example of FIG. 1, details of an example computing device 102(2) are illustrated at inset 114. The details of example computing device 102(2) can be representative of others of computing devices 102 or 104. However, individual ones of the computing devices 102 or 104 can include additional or alternative hardware and/or software components. Computing device 102(2) can include one or more processing units 116 operably connected to one or more computer-readable media 118 such as via a bus 120, which in some instances can include one or more of a system bus, a data bus, an address bus, a Peripheral Component Interconnect (PCI) Express (PCIe) bus, a PCI bus, a Mini-PCI bus, and any variety of local, peripheral, or independent buses, or any combination thereof. In some examples, plural processing units 116 can exchange data through an internal interface bus (e.g., PCIe), rather than or in addition to network 112. While in this example the processing units 116 are described as residing on the computing device 102(2), the processing units 116 can also reside on different computing devices 102 or 104 in some examples. In some examples, at least two of the processing units 116 can reside on different computing devices 102 or 104. In such examples, multiple processing units 116 on the same computing device 102 or 104 can use an interface bus 120 of the computing device 102 or 104 to exchange data, while processing units 116 on different computing devices 102 or 104 can exchange data via networks 112.

Processing units 116 can be or include one or more single-core processors, multi-core processors, CPUs, GPUs, general-purpose graphics processing units (GPGPUs), or hardware logic components configured, e.g., via specialized programming from modules or APIs, to perform functions described herein. For example, and without limitation, illustrative types of hardware logic components that can be used in or as processing units 116 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 116 can represent a hybrid device, such as a device from ALTERA or XILINX that includes a CPU core embedded in an FPGA fabric. These or other hardware logic components can operate independently or, in some instances, can be driven by a CPU. In some examples, at least some of computing devices 102 or 104 can include a plurality of processing units 116 of multiple types. For example, the processing units 116 in computing device 102(2) can be a combination of one or more GPGPUs and one or more FPGAs. Different processing units 116 can have different execution models, e.g., as is the case for graphics processing units (GPUs) and central processing unit (CPUs). In some examples, processing units 116, computer-readable media 118, and modules or engines stored on computer-readable media 118 can together represent an ASIC, FPGA, or other logic device configured to carry out the functions of such modules or engines.

Computer-readable media described herein, e.g., computer-readable media 118, include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 102 or 104.

In contrast to computer storage media, communication media can embody computer-readable instructions, data structures, program modules, or other data in a modulated data signal, such as a carrier wave, or other transmission mechanism. As defined herein, computer storage media does not include communication media.

In some examples, computer-readable media 118 can store instructions executable by the processing units 116 that, as discussed above, can represent a processing unit incorporated in computing device 102. Computer-readable media 118 can additionally or alternatively store instructions executable by external processing units such as by an external CPU or external processor of any type discussed above. In some examples at least one processing unit 116, e.g., a CPU, GPU, or hardware logic device, is incorporated in computing device 102, while in some examples at least one processing unit 116, e.g., one or more of a CPU, GPU, or hardware logic device, is external to computing device 102.

Computer-readable media 118 can store, for example, executable instructions of an operating system 122, an inference engine 124, a training engine 126, and other modules, programs, or applications that are loadable and executable by processing units 116. Computer-readable media can also store, for example, a knowledge base 128. In some examples not shown, one or more of the processing units 116 in one of the computing devices 102 or 104 can be operably connected to computer-readable media 118 in a different one of the computing devices 102 or 104, e.g., via communications interface 130 and network 112. For example, program code to perform steps of flow diagrams herein can be downloaded from a server, e.g., computing device 102(1), to a client, e.g., computing device 104(K), e.g., via the network 112, and executed by one or more processing units 116 in computing device 104(K). For example, the computer-executable instructions stored on the computer-readable media 118 can upon execution configure a computer such as a computing device 102 or 104 to perform operations described herein with reference to the operating system 122, the inference engine 124, the training engine 126, or the knowledge base 128.

In some examples, the inference engine 124 can be configured to process document(s) 108 to infer various motifs (e.g., user text corresponding to those motifs, and likewise throughout) from the documents 108. For example, the inference engine 124 can identify motifs such as problems, actions, questions, suggestions, etc. expressed in the documents 108 and can determine actionable items 110 based on identified motifs. For example, documents 108 expressing or containing suggestion motifs can include words or phrases that describe request(s) for new behavior (s) of an entity or changes to existing behavior(s) of an entity (e.g., add keyboard shortcuts, remove animations). The inference engine 124 can also identify trends over multiple documents 108 such as suggestions associated with a particular model of device or a particular device configuration. The inference engine 124 can process the documents 108 using information stored in the knowledge base 128, as discussed in more detail below.

In some examples, one or more computing device(s) 104 can include inference engine interface(s) (not shown) configured to communicate with, or receive results determined by, inference engine 124. For example, the inference engine interface can include a browser that receives and displays visualizations reflecting the inferences made by the inference engine 124, and a computing device 104 can display the visualizations to a user of computing device 104. Thus, computing device 104 can be used by a design engineer or manager to help analyze actionable items 110 (e.g., user suggestions) and, e.g., set development priorities accordingly. The inference engine interface can also be configured to operate on other, e.g., non-visual, forms of output by querying the inference engine 124 using one or more application programming interfaces to obtain output from the inference engine 124.

Computer-readable media 118 of the computing device 102 can store an operating system 122. In some examples, operating system 122 is not used (commonly referred to as a "bare metal" configuration). In some examples, operating system 122 can include components that enable or direct the computing device 102 to receive data via various inputs (e.g., user controls, network or communications interfaces, memory devices, or sensors), and process the data using the processing units 116 to generate output. The operating system 122 can further include one or more components that present the output (e.g., display an image on an electronic display, store data in memory, transmit data to another computing device, etc.). The operating system 122 can enable a user to interact with apps or with modules of the training engine 126 using a user interface 132. Additionally, the operating system 122 can include components that perform various functions generally associated with an operating system, e.g., storage management and internal-device management.

Computing device 102 can also include one or more communications interfaces 130 to enable wired or wireless communications between computing devices 102 or 104 and other networked computing devices 102 or 104 involved in root-cause determination or running apps, or other computing devices, over networks 112. Such communications interfaces 130 can include one or more transceiver devices, e.g., network interface controllers (NICs) such as Ethernet NICs or other types of transceiver devices, to send and receive communications over a network. The processing units 116 can exchange data through respective communications interfaces 130. In some examples, the communications interface 130 can be a PCIe transceiver, and the network 112 can be a PCIe bus. In some examples, the communications interface 130 can include, but is not limited to, a transceiver for cellular (3G, 4G, or other), WI-FI, Ultra-wideband (UWB), BLUETOOTH, or satellite transmissions. The communications interface 130 can include a wired I/O interface, such as an Ethernet interface, a serial interface, a Universal Serial Bus (USB) interface, an INFINIBAND interface, or other wired interfaces. The communications interface 130 can additionally and/or alternatively include at least one user-interface device or user interface, at least one bus such as a memory bus and/or local bus, at least one memory interface, and/or at least one hardwired interface such as a 0-20 mA control line. For simplicity, these and other components are omitted from the illustrated computing device 102.

In some examples, computing device 102 or 104 can include user interface 132. User interface 132 can include one or more output devices configured for communication to a user or to another computing device 102 or 104. Output devices can be integral or peripheral to computing device 102 or 104. Examples of output devices can include a display, a printer, audio speakers, beepers, or other audio output devices, a vibration motor, linear vibrator, or other haptic output device, and the like.

User interface 132 can include one or more input devices, integral or peripheral to computing device 102 or 104. The input devices can be user-operable, or can be configured for input from other computing device 102 or 104. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device, a gestural input device such as a touchscreen, a grip sensor, an accelerometer, another haptic input, a visual input device such as one or more cameras or image sensors, and the like.

In some examples, computing device 102 or 104 can include one or more measurement units 134. Measurement units 134 can detect physical properties or status of computing device 102 or its environment. Examples of measurement units 134 can include units to detect motion, temperature, pressure, light, sound, electromagnetic radiation (e.g., for wireless networking), or any other detectable form of energy or matter in or within sensing range of computing device 102 or 104. Information from measurement units 134 on computing devices 104 can be incorporated, automatically or at user direction, into document(s) 108.

In some examples, e.g., of a smartphone computing device 104(4), measurement units 134 can include an accelerometer, a microphone, or front- and rear-facing cameras. Examples of measurement units 134 can include devices for measuring physical properties, devices for communicating, or devices for receiving information. In some examples, measurement units 134 can include a network transceiver (e.g., communications interface 130), a motion sensor, a proximity detector (e.g., for nearby life forms, people, or devices), a light sensor (e.g., a CdS photoresistor or a phototransistor), a still imager (e.g., a charge-coupled device, CCD, or complementary metal-oxide-semiconductor, CMOS, sensor), a video imager (e.g., CCD or CMOS), a microphone, a fingerprint reader, a retinal scanner, an iris scanner, or a touchscreen (e.g., in or associated with a display in user interface 132 such as display 210, FIG. 2).

In some examples, computing device 102 or 104 can include one or more sensors 136. Components of communications interface 130, e.g., transceivers for BLUETOOTH, WI-FI, or LTE, can be examples of sensors 136. Such components can be used to, e.g., detect signals corresponding to characteristics of accessible networks. Such signals can also be detected by automatically locating information in a table of network information (e.g., cell-phone tower locations), or by a combination of detection by component of communications interface 130 and table lookup. Components of user interface 132, e.g., touchscreens or phone mouthpieces, can also be examples of sensors 136. Measurement units 134 can also be examples of sensors 136. In some examples, a particular device can simultaneously or selectively operate as part of two or more of communications interface 130, user interface 132, and one or more measurement units 134. For example, a touchscreen can be an element of user interface 132 and used to present information and receive user commands. Signals from the same touchscreen can also be used in determining a user's grip on computing device 102 or 104. Accordingly, that touchscreen in this example is also a sensor 136. Information from measurement units 134 on computing devices 104 can be incorporated, automatically or at user direction, into document(s) 108.

Illustrative Components

Figure 2:
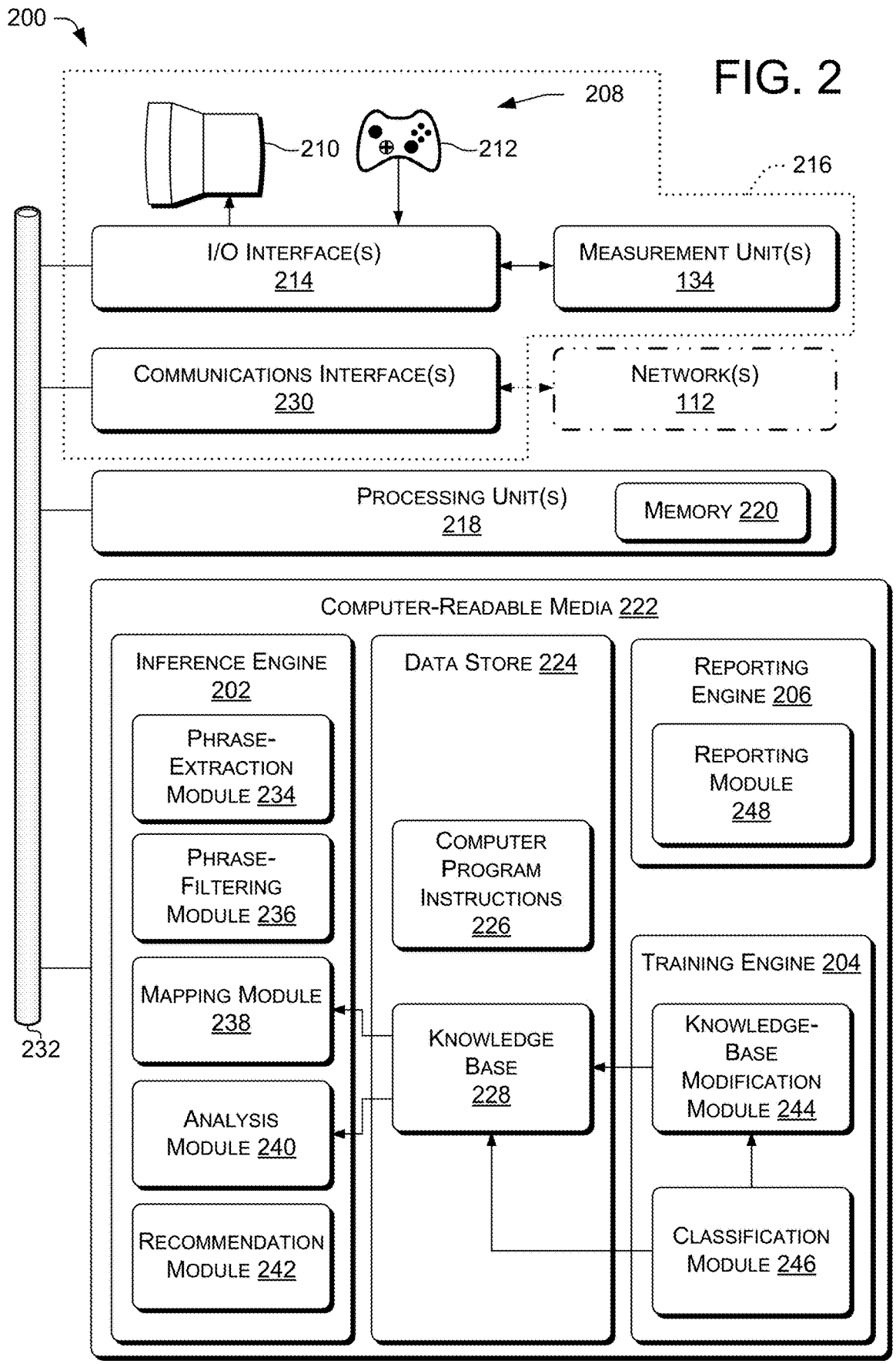
FIG. 2 is a block diagram depicting an example computing device configured to participate in automated text analysis according to various examples described herein.

FIG. 2 is an illustrative diagram that shows example components of a computing device 200, which can represent computing devices 102 or 104, and which can be configured to participate in knowledge-base expansion or inference analysis, according to various examples described herein. Computing device 200 can implement an inference engine 202, which can represent inference engine 124, FIG. 1. Computing device 200 can implement a training engine 204, which can represent training engine 126, FIG. 1. Computing device 200 can implement a reporting engine 206.

In some examples, e.g., of a computing device 102 providing an inference-analysis or suggestion-analysis service, the computing device 200 can implement inference engine 202 and training engine 204 but not reporting engine 206. In some examples, e.g., of a computing device 104 making use of an inference service, the computing device 200 can implement reporting engine 206 but not training engine 204. In some examples, e.g., of a computing device 102 or 104 implementing both an inference service and the use thereof, the computing device 200 can implement inference engine 202, training engine 204, and reporting engine 206.

Computing device 200 can include or be connected to a user interface 208, which can represent user interface 132. User interface 208 can include a display 210. Display 210 can include an organic light-emitting-diode (OLED) display, a liquid-crystal display (LCD), a cathode-ray tube (CRT), or another type of visual display. Display 210 can be a component of a touchscreen, or can include a touchscreen. User interface 208 can include various types of output devices described above with reference to user interface 132. In some examples, the reporting engine 206 is operatively coupled to the display 210 or another output device.

User interface 208 can include a user-operable input device 212 (graphically represented as a gamepad). User-operable input device 212 can include various types of input devices described above with reference to user interface 132.

Computing device 200 can further include one or more input/output (I/O) interfaces 214 by which computing device 200 can communicate with input, output, or I/O devices (for clarity, some not depicted). Examples of such devices can include components of user interface 208 such as user-operable input devices and output devices described above with reference to user interface 132. Other examples of such devices can include power meters, temperature sensors, and other devices for measuring properties of computing device 200 or its environment or of another computing device 102 or 104 or an environment thereof. Computing device 200 can communicate via I/O interface 214 with suitable devices or using suitable electronic/software interaction methods. Input data, e.g., of user inputs on user-operable input device 212, can be received via I/O interfaces 214, and output data, e.g., of user interface screens, can be provided via I/O interfaces 214 to display 210, e.g., for viewing by a user.

The computing device 200 can include one or more sensors 216, which can represent measurement units 134 or other sensors 136, as described above with reference to FIG. 1. Sensors 216 can also include components of user interface 208. In some examples, the user interface 208 can include at least one of the sensors 216. For example, the user interface 208 can include a touchscreen that includes a sensor 216. Individual ones of the sensors 216 can be configured to output sensor data corresponding to at least one physical property, e.g., a physical property of the device, such as acceleration, or of an environment of the device, such as temperature or humidity.

The computing device 200 can include one or more processing units 218, which can represent processing units 116. Processing units 218 can be operably coupled, e.g., via the I/O interface 214, to the user interface 208 and/or the sensors 216. Processing units 218 can include, e.g., processing unit types described above such as CPU- or GPU-type processing units. In some examples, processing units 218 can include or be connected to a memory 220, e.g., a random-access memory (RAM) or cache.

Processing units 218 can be operably coupled to at least one computer-readable media (CRM) 222, discussed below. The processing units 218 can be configured to execute modules of the plurality of modules, e.g., stored on the computer-readable media 222. For example, the computer-executable instructions stored on the computer-readable media 222 can, upon execution, configure a computer such as a computing device 200 to perform acts or operations described herein with reference to the modules of the plurality of modules, e.g., modules of the inference engine 202, training engine 204, and/or reporting engine 206. The modules stored in the computer-readable media 222 can include instructions that, when executed by the one or more processing units 218, cause the one or more processing units 218 to perform acts or operations described herein with reference to the modules of the plurality of modules, e.g., modules of the inference engine 202, training engine 204, and/or reporting engine 206. Examples of modules in computer-readable media 222 are discussed below. Computer-readable media 222 can also include an operating system, e.g., operating system 122.

In the illustrated example, computer-readable media 222 includes a data store 224. In some examples, data store 224 can include data storage, structured or unstructured, such as a database (e.g., a Structured Query Language, SQL, or NoSQL database) or data warehouse. In some examples, data store 224 can include a corpus or a relational database with one or more tables, arrays, indices, stored procedures, and so forth to enable data access. Data store 224 can store data for the operations of processes, applications, components, or modules stored in computer-readable media 222 or computer instructions in those modules executed by processing units 218. In some examples, the data store can store computer program instructions 226 (e.g., instructions corresponding to apps, to processes described herein, or to other software executable by processing units 218). In some examples, the data store 224 can store a knowledge base 228 which can represent knowledge base 128, FIG. 1.

The computing device 200 can also include a communications interface 230, which can represent communications interface 130. For example, communications interface 230 can include a transceiver device such as a network interface controller (NIC) to send and receive communications over a network 112 (shown in phantom), e.g., as discussed above. As such, the computing device 200 can have network capabilities. For example, the computing device 200 can exchange data with computing devices 102 or 104 (e.g., laptops, computers, and/or servers) via one or more networks 112, such as the Internet. As discussed above, sensors 216 can include components of communications interface 230.

In some examples, the processing units 218 can access the modules on the computer-readable media 222 via a bus 232, which can represent bus 120, FIG. 1. I/O interface 214 and communications interface 230 can also communicate with processing units 218 via bus 232.

The modules of the inference engine 202 stored on computer-readable media 222 can include one or more modules, e.g., shell modules, or application programming interface (API) modules, which are illustrated as a phrase-extraction module 234, a phrase-filtering module 236, a mapping module 238, an analysis module 240, and a recommendation module 242. The word "phrase" is used in the names of modules herein for brevity and for clarity of explanation. However, this term is not limiting. The phrase-extraction module 234, the phrase-filtering module 236, and other "phrase"-processing modules herein can operate on phrases or on text segments other than phrases.

The modules of the training engine 204 stored on computer-readable media 222 can include one or more modules, e.g., shell modules, or application programming interface (API) modules, which are illustrated as a knowledge-base modification module 244 and a classification module 246.

The modules of the reporting engine 206 stored on computer-readable media 222 can include one or more modules, e.g., shell modules, or application programming interface (API) modules, which are illustrated as a reporting module 248.

In the inference engine 202, training engine 204, or reporting engine 206, the number of modules can vary higher or lower, and modules of various types can be used in various combinations. For example, functionality described associated with the illustrated modules can be combined to be performed by a fewer number of modules or APIs or can be split and performed by a larger number of modules or APIs. In some examples, the phrase-extraction module 234 and the phrase-filtering module 236; the phrase-extraction module 234, the phrase-filtering module 236, and the mapping module 238; the phrase-extraction module 234, the phrase-filtering module 236, the mapping module 238, and the analysis module 240; the recommendation module 242 and the reporting module 248; the phrase-extraction module 234, the phrase-filtering module 236, the mapping module 238, the analysis module 240, the recommendation module 242, and the reporting module 248; or the knowledge-base modification module 244 and the classification module 246 can be combined in a single module that performs at least some of the example functions described below of those modules. Such a combined module can be shared by or accessible to one or more of the inference engine 202, the training engine 204, and the reporting engine 206. In some examples, computer-readable media 222 can include a subset of modules 234, 236, 238, 240, 242, 244, 246, or 248.

FIG. 3 shows an example document 300 that can represent document 108, as described above with reference to FIG. 1, and that can be obtained by inference engine 202, e.g., from a user's computing device 104. A document 300 can be a physical or electronic document having any type of content including text (e.g., structured or unstructured (free-form)), images, audio, and so on. In some examples, document 300 can include one or more of the following: text from electronic messages such as emails; text from posts on blog or microblogging sites such as WORDPRESS or TWITTER; user feedback collected by an operating system (OS) or OS component, e.g., through feedback dialogs in MICROSOFT WINDOWS or OS X; text from blog articles, social networking sites, websites, online product reviews, or other online communications or magazine articles; blog comments; survey questions or form fields; responses to questionnaires, surveys, or review forms; whole or partial transcripts, or agent notes, of conversations between users and customer-service agents or between users and intelligent software personal assistants; text from instant messages such as via the Short Message Service (SMS) or AOL INSTANT MESSENGER (AIM); text from instant-messaging (IM) logs; user-initiated feedback (UIF) collected by systems such as WINDOWS 10, APPLE OS X, etc.; trouble documents or crash reports, e.g., collected automatically by an operating system or application; user comments provided in trouble documents or crash reports; log entries captured by an operating system or application, e.g., during normal operation or error conditions; log entries including data of user/system interactions; text captured by optical character recognition (OCR), e.g., of error dialogs presented in graphical form, or other screenshots or images of a computing environment; or text provided via customer support portals, e.g., online portals, such as those included in or associated with MICROSOFT OFFICE 365, MICROSOFT AZURE, GOOGLE DOCS, or other tools. In some examples, documents can be collected over time and analyzed for patterns, such as problems that recur whenever a user attempts to perform a particular task using a computing device.

The illustrated document 300 includes various sections relating to a particular user problem or feedback item. For example, document 300 includes a document number section 302 that includes an identifier (e.g., a unique identifier such as a globally-unique identifier, GUID) of the document 300. Document text section 304 includes free-form user text, e.g., feedback from a user in a natural language. Document data section 306 includes various data fields pertinent to the document 300. In the illustrated example, document 300 was submitted by user "JDoe" through the MICROSOFT WINDOWS User Initiated Feedback (UIF) system on Mar. 14, 2015 at 9:26:53 AM. The document 300 has not been modified since, as indicated by the blank "Last Modified by" and "Last Modified on" fields. In this example, the UIF system prompted the user to answer a survey question in addition to providing the user text in the document text section 304. The survey question asked had identification (ID) #42 in a survey question database, and the user's response to the survey question was "4" (e.g., on a scale of 1 to 5). In the illustrated example, document 300 includes the labels of the data fields (e.g., "Feedback Source") as well as the values in those data fields. In some examples, for at least one of the data fields, document 300 can include the values in those data fields but omit the labels of those data fields themselves. Similarly, a document storing survey responses can additionally include at least some the survey questions, or can omit some or all of the survey questions. In some examples in which at least some field labels (e.g., survey questions) are omitted, a document can include data associating the data values stored in the documents with the respective data fields. For example, a data value can be stored in association with an identifier of a data field, e.g., a GUID or serial number ("Survey Question ID" in the illustrated document 300).

In some examples, document data section 306 includes a "hardware type" representing the type of computing device 102 or 104 the user was using at the time the document 300 was created. In the illustrated example, the shown document 300 was created by a user using a tablet computer. In some examples, document data section 306 includes a unique identification value ("Hardware ID") of the computing device 102 or 104 the user was using at the time the document 300 was created, e.g., a GUID. In some examples, document data section 306 includes data from one or more sensors 136 of the computing device 102 or 104 the user was using at the time the document 300 was created. In the illustrated example, the shown document 300 was created by a user in a space with an ambient light level measured at the tablet of 250 lux. In some examples, the document data section 306 can include any number or type of fields providing information about the computing device or environment from or in which the document 300 was created or submitted.

In the illustrated example, certain information is reflected in relatively less structured formats than other information. For example, document data section 306 of document 300 includes numerous specific fields that can be represented directly, e.g., by corresponding database entries that represent or include the knowledge or data in those fields. In contrast, document text section 304 includes relatively less structured information, including the phrase "The 'fullscreen' button on Windows 10 apps should be in a different place."

To a trained human, e.g., a software developer, the phrase "The 'fullscreen' button on Windows 10 apps should be in a different place" can immediately convey a suggestion from user JDoe regarding the positioning of the "fullscreen" button. However, this knowledge is represented in a relatively unstructured format. In some examples, inference engine 124 can process relatively unstructured data such as document text section 304 to infer various motifs, e.g., problems such as software failures, actions such as replacing a failed power supply, or suggestions such as moving the "fullscreen" button on a WINDOWS 10 app.

In the illustrated example, the document text section 304 includes the phrase 308 "Windows 10" and the phrase 310 "maximize/restore buttons" (identified in FIG. 3 with dashed lines for clarity). Phrases 308 and 310 are used as examples in the discussion below. Solely for clarity of explanation, and without limitation, in various examples herein, phrase 308 is considered to be a phrase including a keyword 312, in this example "Windows," and phrase 310 is considered to be a phrase not previously known to the system. In some examples, a "keyword" as used herein can include a contiguous span encompassing more than one word, e.g., more than one space-delimited string of non-whitespace characters (in languages using spaces between words). For example, "Windows 10" can be a keyword 312.

Figure 4:
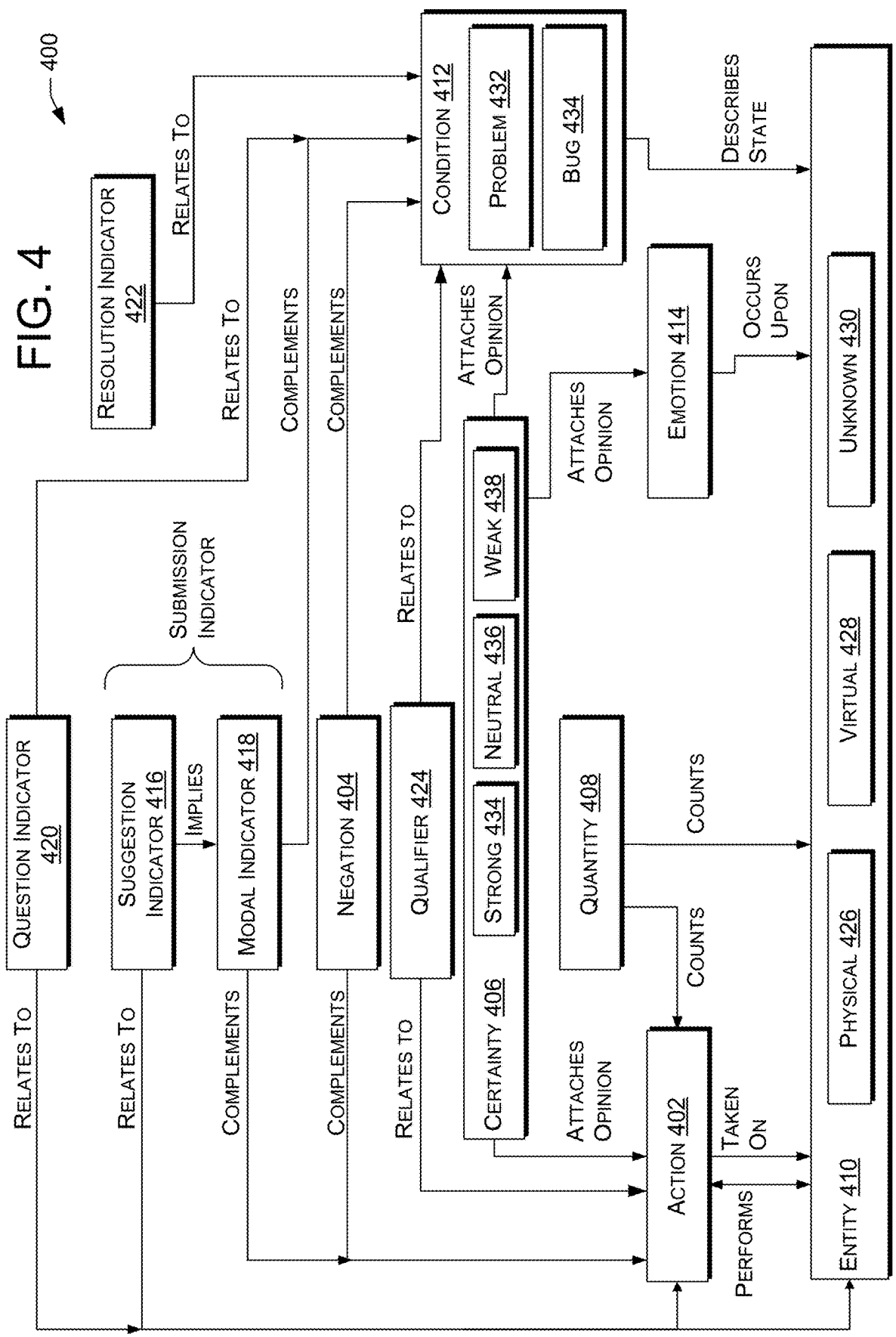
FIG. 4 shows an example ontology that can be employed in accordance with some examples.

FIG. 4 shows an example ontology 400 useful for representing the "semantic interpretation" of domain knowledge for a domain. Ontology 400 includes interconnected classes or hierarchies of classes. In some implementations, classes and subclasses in the ontology are defined and arranged in a taxonomy, as represented by nested blocks in FIG. 4. Labels on connectors indicate syntactical or grammatical interactions that are considered valid between the connected classes. Example classes that can be used in an ontology related to documents 108 are set forth in Table 1. Words or phrases corresponding to specific classes or subclasses of ontology 400 are referred to as "instances" of those classes or subclasses. In some examples, a set of classes includes some or all of the classes of ontology 400 or another ontology. Further examples of ontologies are discussed in U.S. application Ser. No. 13/535,366, entitled "Problem Inference from Support Tickets," filed on Jun. 28, 2012, U.S. application Ser. No. 14/788,247, entitled "Utilizing Semantic Hierarchies to Process Free-Form Text," filed on Jun. 30, 2015, and U.S. application Ser. No. 15/245,675, entitled "Characteristic Pattern Analysis of Text," filed on Aug. 24, 2016, all of which are incorporated herein by reference.

TABLE 1

| Ontology Class | Describes |
| --- | --- |
| Entity | Thing that exists |
| Action | Behavior that can be caused or carried out upon, using, or by an entity |
| Condition | Describes the state of an entity |
| Resolution Indicator | Describes a change to a condition |
| Quantity | Describes the quantity of an entity/action |
| Negation | Changes the sense of a text segment to its opposite |
| Certainty | Adds strength/weakness to a phrase |
| Emotion | Feelings or beliefs held by the writer of the user text |
| Suggestion Indicator | Indicates that associated portion(s) of the user text represent suggestions, e.g., regarding items such as software or hardware |
| Modal Indicator | Indicates that an associated Action in the user text is hypothetical or desirable. |
| Question Indicator | Indicates that associated portion(s) of the user text represent questions, e.g., regarding items such as software or hardware |
| Qualifier | Describes a quality associated with an action or a condition |

The ontology can be constructed to relate the various ontology classes and subclasses according to defined interactions, and can be stored in the knowledge base 228. For example, individual word(s) or phrase(s) appearing in document(s) 108 can be mapped to the classes of an ontology. The mapping of the phrases to the ontology 400 can be stored in the knowledge base 228, e.g., as discussed below with reference to FIG. 6.

Ontology 400 can be used to express relationships between the different classes, which can provide for concise expression of pertinent information included in actionable items 110. Each class or subclass can have mapped to it one or more words or phrases and can correspond to some information provided by a document 108. In some implementations, the domain expert or other individual can select the particular class/subclass for each phrase, possibly assisted by a tool and/or partial automation.

The example ontology 400 can include one or more of the classes from Table 1, e.g., Entity, Action, Condition, Resolution, Incident, Quantity, Negation, Certainty, Emotion, Suggestion Indicator, Modal Indicator, Question Indicator, or Qualifier. Each class is represented by a corresponding block in FIG. 4, e.g., action class 402, negation class 404, certainty class 406, quantity class 408, entity class 410, condition class 412, emotion class 414, suggestion-indicator class 416, modal-indicator class 418, question-indicator class 420, resolution-indicator class 422, and qualifier class 424. As illustrated by the nested blocks, any particular class and its subclasses can be represented as trees or graphs of nodes in a taxonomy for that class.

Arrows and labels in FIG. 4 graphically represent relationships between individual classes consistent with the ontology 400. These relationships represent valid interactions between the ontology classes. For example, an action "taken" on an entity is a valid interaction according to the ontology 400, as shown by the arrow connecting the action class 402 to the entity class 410. Conversely, an action "taken" on a condition would not be a valid interaction according to the ontology 400 since there is no corresponding arrow illustrating such a relationship between the action class 402 and the condition class 412.

The entity class 410 can correspond to phrases that represent an entity, i.e., a thing that exists in a real or virtual sense. In some examples, the entity can be a technical entity, such as a technical word or phrase. Examples include product names such as "XBOX," "PLAYSTATION," "LINUX," and "WINDOWS," component names such as "hard drive," and service names such as "cloud service." The entity class can include subclasses such as physical-entity subclass 426 or virtual-entity subclass 428. For example, a physical entity can be a tangible object such as an accelerometer, a gaming console, etc. A virtual entity can be an intangible object such as a protocol, reference, variable, library, or method. Other examples of entities can include services, e.g., cloud services, software entities, replaceable entities, and logical entities.

In some examples, the entity class 410 can have an unknown-entity subclass 430. The unknown-entity subclass 430 can be used in conjunction with sentences or other blocks of free-form user text that do not contain an identifiable entity, or that are not otherwise associated with an identifiable entity, e.g., in a metadata field of a document containing the free-form user text, as described below with reference to FIG. 6. In some examples, the entity class 410 can include subclasses such as a replaceable entity or a maintenance entity.

The action class 402 can correspond to phrases that represent a behavior that is taken or carried out on or using an entity, or a behavior performed by an entity. Actions can include, e.g., behaviors a user is trying to accomplish with an entity or what a user expects an entity to do. Subclasses of the action class can include those that interact with an entity and/or alter the state of the entity, such as, for example, a physical action (e.g., replace, switch off, switch on, reboot, restart, open, etc.), a maintenance action (e.g., update, upgrade, downgrade, etc.), a troubleshooting action (e.g., test or inspect), and/or a virtual action (e.g., install, wipe, copy, access, animate, build, change, navigate, etc.).

The condition class 412 can correspond to phrases that describe the state of an entity, e.g., an entity can have a faulty condition such as "illegal reference." Example conditions can include properties, modes or abnormal conditions (either physical or virtual), e.g., of an entity "failing to execute," "crashing," or "working intermittently." Words and phrases used in an instance of condition class 412 can be, e.g., subjective, e.g., "crashing," or categorical, e.g., "low" or "high." Example conditions can include problem conditions 432 (e.g., error, freeze, problem, difficult, etc.), or bug conditions 434 (e.g., representing software behavior determined to be faulty due to error in the software rather than in its environment).

The quantity class 408 can correspond to words or phrases that count or describe the quantity of, e.g., an entity (e.g., two virtual desktops) or an action (e.g., clicked twice). Some implementations can use LowQuantity, MediumQuantity, and HighQuantity subclasses to distinguish phrases that reflect relatively low, moderate, and high quantities depending upon the context. A quantity can also be used to reflect severity, e.g., LowQuantity can correspond to a relatively minor or low volume incident whereas HighQuantity can correspond to a relatively major or high volume incident.

The negation class 404 can correspond to text segments, e.g., words or phrases, that change the meaning of one or more other words or phrases to a substantially opposite meaning, e.g., "did not" changing "reinstalled the prior version" to "did not reinstall the prior version." The negation class can include a SyntheticNegations subclass that uses verbs or nouns to change the meaning of a condition, incident, or action, e.g., phrases such as "absence of," "declined," "denied," and the like. The negation class 404 can also include AnalyticNegations subclass that uses "not" to change the meaning of a text segment describing a condition, incident, or action. In some examples, the negation class 404 can also correspond to words or phrases that change the meaning of text segments describing problems, bugs, or conditions, e.g., "not" in the example phrase "ONEDRIVE is not crashing any more." In some examples, instances of the negation class 404 can be applied to any text segment(s), e.g., individual words or phrases, to instances of other classes, or to combinations of any of those. In another example, a negation "not" can be applied to the entire phrase "losing my emails" to indicate that a problem with email loss has been resolved. Pushdown grammars can be used to parse user text, and instances of the negation class 404 can be applied to one or more nodes of a parse tree. These examples of negation class 404 are for purposes of illustration and are not limiting.

The certainty class 406 can correspond to words or phrases that represent confidence of the user regarding an entity, condition, or emotion represented in the free-form user text, e.g., by adding strength or weakness to a text segment. In the example sentence "I confirm that the keyboard shortcuts work," "confirm" can be associated with the certainty class 406. The certainty class 406 can include a StrongCertainty subclass 434, e.g., phrases such as "confirm" or "affirmative" that denote certainty or high confidence. The certainty class 406 can also include a NeutralCertainty subclass 436, e.g., phrases such as "not sure." The certainty class 406 can also include a WeakCertainty subclass 438, e.g., corresponding to phrases such as "unlikely" or "doubtful" that denote uncertainty or low confidence. Note that phases in the WeakCertainty subclass can be phrases that may not explicitly indicate negative sentiment, but rather tend to be used by individuals when speculating about the nature of, e.g., a missing feature or unexpected behavior in software or hardware.

The emotion class 414 can correspond to words or phrases that represent feelings or beliefs of the user writing the free-form user text. For example, in the sentence "MICROSOFT is great," "great" is an emotion the writer feels about the entity "MICROSOFT." Other example instances include "awesome," "lousy," "angry," "satisfied," etc. Instances of the emotion class can occur, e.g., in "delighters," e.g., stories or other expressions of a positive experience with an entity, e.g., a product, service, or feature.

The suggestion-indicator class 416 can correspond to words or phrases that represent the presence of a suggestion. Example instances of the suggestion-indicator class 416 can include, e.g., "allow," "enable," "improve," "make it possible, "please," "you should," "should," etc.

The modal-indicator class 418 can correspond to words or phrases, such as modal auxiliaries in English, that indicate that an associated instance of the action class 402 in the free-form user text is hypothetical or desirable. Example instances of modal-indicator class 418 can include, e.g., "it would be nice," "it would," "could," etc. In some examples, instances of the modal-indicator class 418 can include, e.g., imperative verbs such as "add," "change," or "remove." In some examples, an instance of suggestion-indicator class 416, e.g., "you should," implies or includes a corresponding instance of modal-indicator class 418, e.g., "should." As used herein, the term "submission indicator" refers to an instance of suggestion-indicator class 416 or of modal indicator class 418, or any combination thereof. In some examples, a submission indicator can indicate a problem, e.g., with hardware or software, to which the party providing the document wishes a solution. In some examples, the negation of a submission indicator can correspond to, e.g., a problem that has been resolved.

The question-indicator class 420 can correspond to words or phrases that represent the presence of a question, or words or phrases that are used to elicit information, e.g., regarding items such as software or hardware, or other, e.g., entities, actions, or conditions. Example instances of question-indicator class 420 can include, e.g., "What does this mean?", "How does this work?", "Why is my program crashing?", "How do I play my videos?", or "Where is my program installed?"

The resolution-indicator class 422 can correspond to words or phrases that represent a resolution of a prior problem. Example instances of resolution-indicator class 422 can include, e.g., "fixed," "working," "repaired," and so on. As discussed below, the presence of a resolution-indicator class 422 instance does not necessarily imply that the problem is solved. The phrases "is working" and "is not working" both contain an instance ("working") of the resolution-indicator class 422, but are opposite in sense. In some examples, a negation of a resolution indicator can correspond to, e.g., a problem that needs to be resolved. In some examples, an instance of the modal-indicator class 418 associated with an instance of the resolution-indicator class 422, such as the phrase "should be fixed," can correspond to, e.g., a problem that needs to be resolved.

The qualifier class 424 can correspond to words or phrases that describe qualities of actions or conditions. That is, the qualifier class 424 can include descriptive words or phrases. Examples of words or phrases used in instances of qualifier class 424 can include "fast," "quick," "lengthy," "slow," "fuzzy," "sharp," etc. Words or phrases used in instances of qualifier class 424 can be binary (e.g., fast vs. slow), subjective (e.g., fuzzy), categorical (e.g., low, high, etc.), quantitative (e.g., 'level 3') or other types, as well as their combinations.

Other classes can be present. For example, a property class can represent static, volatile, dynamic, or other properties of entities. A privacy class can correspond to words or phrases that indicate a user's expectations or desires with respect to access to information or other entities, e.g., "personal" or "public."

Example instances of entity class 410 can include products, features, services, and components. For example, an entity class 410 can represent or include words related to a feature, product, software, or thing, such as "account," "password," "drive," "keyboard," "mouse," "screen," "computer," "phone," "interface," etc.

Example instances of condition class 412 can include states, e.g., properties, modes or (abnormal) conditions (either physical or virtual), associated with an entity, such as "failing to execute," "crashing," "working intermittently," etc. A state of an entity can be binary (e.g., up vs. down), subjective (e.g., crashing), categorical (e.g., low, high, etc.), quantitative (e.g., 'level 3') or other types, as well as their combinations. In some examples, condition instances can be associated with instances of classes for actions 402, conditions 412 (e.g., problem conditions 432 or bug conditions 434), questions 420, certainties 406, submission indicators (e.g., suggestion indicators 416 or modal indicators 418), quantities 408, emotions 414, qualifiers 424, etc.

Example instances of action class 402 can include words or phrases that represent a behavior that is taken or carried out on or using an entity, or a behavior performed by an entity, such as "click," "browse," etc.

Example instances of problem-condition class 432 can include words or phrases that represent a problem or issue with an entity, such as "crashing," "disconnected," etc.

Examples instances of a submission indicator class (e.g., instances of suggestion-indicator class 416 or modal-indicator class 418) can include words or phrases that relate to a new behavior or change in an existing behavior of an entity, such as "add new shortcut," "change API call/settings name," "remove animations," etc. For example, the suggestion-indicator class 416 can include words or phrases that relate to a feature request by a user.

Example instances of a question class 420 can include words or phrases that are used to elicit information, such as "What does this mean?" or "How does this work?"

Example instances of an emotion class 414 can include words or phrases that represent feelings or beliefs of a user, such as "like new app interface," "find animations confusing," etc.

Examples of a qualifier class 424 can include words or phrases that represent descriptive qualities associated with actions or conditions, such as "fast," "quick," "lengthy," "slow," "fuzzy," "sharp," etc.

A domain expert, administrator, or other individual can assign specific words or phrases, e.g., remaining in the post-filtered subset discussed below with reference to the phrase-filtering module 236, to one or more classes or subclasses of ontology 400. In this way, the knowledge base 128 can include a mapping of various phrases in the documents 108 to classes and/or subclasses of the ontology 400, e.g., entries in the dictionary respectively corresponding to the classes and/or subclasses. The ontology 400 can be constructed to relate the various ontology classes and subclasses according to defined interactions and can be stored in the knowledge base 228.

FIG. 4 shows an example of a domain ontology 400. The knowledge base 228 can include one or more domain ontologies. The knowledge base 228 can additionally or alternatively include one or more global or universal ontologies covering terms in at least two domains.

Figure 5:
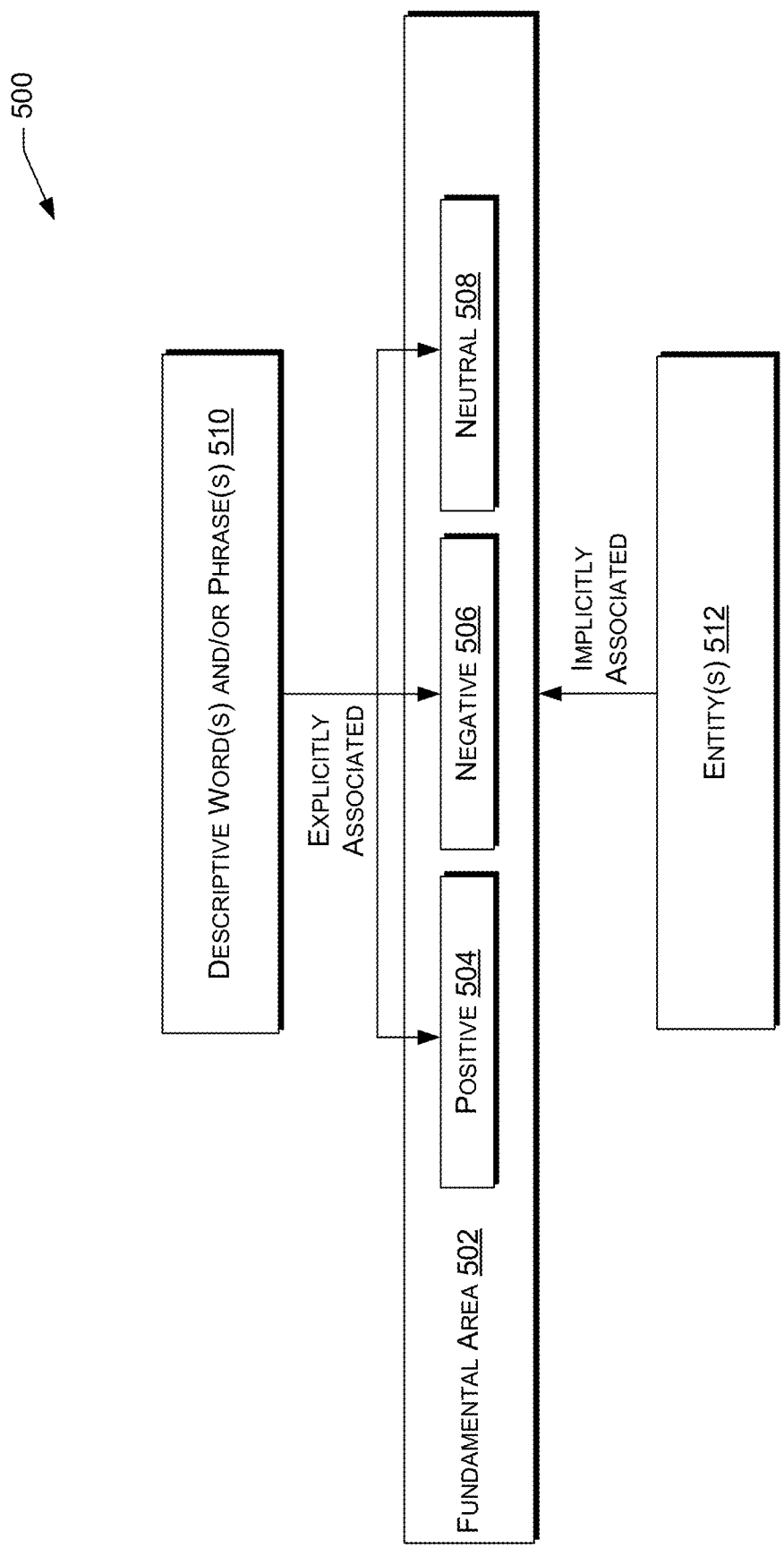
FIG. 5 shows another example of an ontology that can be employed in accordance with some examples.

FIG. 5 shows a domain ontology 500 that includes additional details associated with the domain ontology 400 described above with respect to FIG. 4. In at least one example, a domain expert, an administrator, or another individual can add classes to an ontology to enable more granular inferences. For instance, a domain expert, an administrator, or another individual can add an ontology class associated with a fundamental area to the ontology 500. The fundamental area is represented by a block in ontology 500, e.g., fundamental area 502. A fundamental area 502 can correspond to an area of interest to a domain expert, an administrator, or another individual. As described above, a fundamental area can be a user-defined class of the model, e.g., an ontology. As an example, in a software domain, the fundamental areas can correspond to compatibility, functionality, localization, performance, privacy, reliability, usability, security, etc. A domain expert, an administrator, or another individual can map one or more subclasses to each fundamental area 502. Each subclass is represented by a corresponding block in FIG. 5, e.g., a positive class 504, a negative class 506, and a neutral class 508. Although only one fundamental area 502 is shown, with its corresponding subclasses 504, 506, and 508, this is not limiting. In some examples, ontology 500 can include multiple classes representing respective, different fundamental areas. For each fundamental-area class, ontology 500 can include at least one of a respective positive subclass, a respective negative subclass, or a respective neutral subclass. In some examples, at least one fundamental-area class has no subclasses.

In at least one example, a descriptive word or phrase (e.g., qualifier 424) can be explicitly associated with a subclass of a fundamental area 502. Accordingly, the domain expert, the administrator, or the other individual can map various descriptive words or phrases 510 to each of the subclasses, e.g., positive class 504, negative class 506, or neutral class 508, in a dictionary, as described above. For instance, the domain expert, the administrator, or the other individual can map the word "slow" to a negative subclass 506 associated with the fundamental area class of performance. Or, the domain expert, the administrator, or the other individual can map the word "easy" to a positive subclass 504 associated with the fundamental area class of usability.

In at least one example, one or more entities 512, which can correspond to entity(s) 410 as described above with reference to FIG. 4, can be implicitly associated with a fundamental area 502. In some examples, the domain expert, the administrator, or the other individual can map entities 512 to individual fundamental areas, such as fundamental area 502, in a dictionary, as described herein. For instance, the word "password," which is representative of an entity 512, can be mapped to a fundamental area class of security, or the word "printer," which is representative of another entity 512, can be mapped to a fundamental area class of usability. In some examples, entities can be mapped to a neutral subclass of a fundamental area. For instance, in the non-limiting example above, "password" can be mapped to the neutral subclass of the fundamental area class of security and "printer" can be mapped to the neutral subclass of the fundamental area class of usability.

Figure 6:
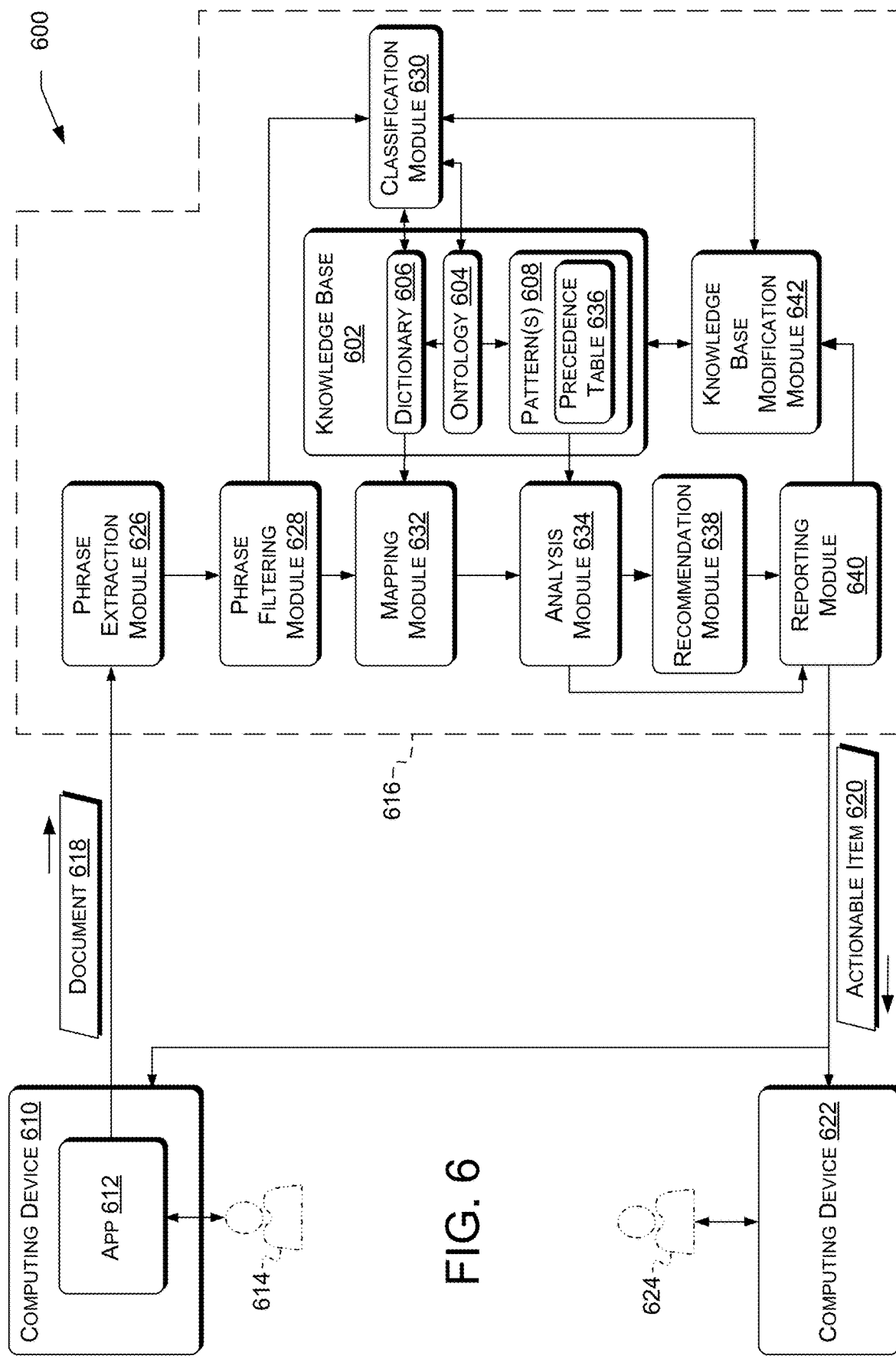
FIG. 6 is a dataflow diagram depicting example module interactions during provision of documents, text analysis of those documents, and updating of a knowledge base.

FIG. 6 is a dataflow diagram 600 illustrating example interactions between the modules illustrated in FIG. 2. Modules and operations shown in FIG. 6, as well as processing steps shown in FIGS. 7-10 and 12, can be performed in series or parallel, or can be pipelined, e.g., by the document 108 or by text segment(s) within document(s) 108, in any combination.

Some of the modules described below make use of a knowledge base 602, which can represent the knowledge base 228, as described above with reference to FIG. 2. The knowledge base 602 can be stored on the computer-readable media 222, as described above with reference to FIG. 2. The knowledge base 602 can include at least one of an ontology 604 (which can represent ontology 400 and ontology 500), a dictionary 606, and a pattern set 608 including one or more grammar pattern(s). The dictionary 606 can include a trie or other data structure or computational model mapping individual words or phrases of the free-form user text of the respective document to individual classes of a model such as the ontology 604. At least one example, the dictionary 606 can include entries respectively corresponding to classes of the model, e.g., ontology 604. The pattern set 608 can include a formal grammar, e.g., a context-free grammar (CFG), or other representation of a mapping between sequences of classes of the model and motifs. Other examples of patterns in the pattern set 608 are discussed below with reference to the phrase-filtering module 628. In some examples, ontology 604 is represented implicitly in a set of classes shared at least in part between dictionary 606 and pattern set 608. "Classes" can also be referred to as "labels" that identify a function or role of the text segment in the free-form user text of a document 618. In some examples, the knowledge base 602 can also include a synonym list used to collapse various synonymous terms into a standardized term. For example, the terms "browser," "INTERNET EXPLORER" and "IE10" can each mean the same thing in the context of a software entity. In this way, entries in the synonym list for each of these terms can map to "browser," for example.

Some phrases may not be suited for use within the ontology 604, e.g., because of reduced specificity relative to other phrases. For example, in the context of suggestions for the source code of open-source projects, the phrase "handler" can lack specificity compared to the phrase "interrupt handler" for the purposes of understanding a suggestion. The phrase "interrupt handler" is more specific and provides more context for semantic interpretation. For this reason, in some implementations, the knowledge base 602 can include phrases that are determined to be sufficiently specific for mapping to the ontology. For example, the bigram "interrupt handler" can be mapped in knowledge base 602 to a particular class and/or subclass of the ontology 604 model and the unigram "handler" can be omitted from knowledge base 602.

In some examples, a computing device 610, which can represent computing device 104, can run or otherwise host an app 612, e.g., a smartphone app, desktop application, or command-line utility. For example, the processing unit 116, as described above with reference to FIG. 1, of computing device 610 can execute one or more program module(s) of the app 612, e.g., computer program instructions 226, as described above with reference to FIG. 2. The app 612 can interact with a user 614 (or other entity). Via the app 612 and/or other component(s) of computing device 610, user 614 can provide a document 618, e.g., as discussed above with reference to FIG. 3. In some examples, the app 612 or other(s) component of computing device 610, can transmit and receive data such as documents 618 or actionable items 620, e.g., via an HTTP connection carrying API messages in the representational state transfer (REST) or Web Services styles.

A computing device 616, which can represent computing device 102, e.g., a computing device in cluster 106, can receive one or more document(s) 618, which can represent document(s) 108, e.g., using communications interface 230, as described above with reference to FIG. 2 (omitted here for brevity) or another interface. The computing device 616 can determine one or more motifs and one or more actionable items 620, which can represent actionable items 110 as described above with reference to FIG. 1, based on the one or more motifs. The computing device 616 can then transmit the actionable items 620 to a computing device 622 of, or associated with, a user 624 (or other entity), e.g., a system administrator or manager, that is associated with management of the software or hardware that is a subject of the document 618. In some examples, the computing device 616 can additionally or alternatively transmit the actionable items 620 to computing device 610. In some examples, computing device 616, e.g., a node in a computing cluster or a cloud server, can implement at least one of modules 626, 628, 630, and 632, e.g., modules 630 and 632. Such a computing device 616 can, e.g., receive phrases of text and provide corresponding tag sentences, classes of a model, synonyms, or other information determined based at least in part on knowledge base 602.

In some examples, a phrase-extraction module 626, which can represent the phrase-extraction module 234, or another component of computing device 200, can be configured to filter documents 618 based on document metadata. For example, the phrase-extraction module 626 can be configured to process only documents having particular keywords in title or subject metadata.

In some examples, the phrase-extraction module 626 can be configured to identify various phrases (e.g., n-grams) that can appear in the document 618. For example, the phrases can be repeated patterns of linguistic elements, e.g., n-grams of length one or more that appear in multiple instances in the documents 618. The phrase-extraction module 626 can apply a two-pass phrase extraction technique to obtain a frequency estimate of n-grams in the documents 618.

In some examples, the phrase-extraction module 626 is configured to perform one or more of the processing acts described below. In some examples, text in the documents 618 can be tokenized into sentences. For example, the documents 618 can be parsed into individual unigrams (e.g., words) and delimiters such as periods, question marks, or exclamation marks can be used to identify sentences. In some examples, specified punctuation characters can be removed from the documents 618, e.g., after division into sentences. In some examples, text in the documents 618 can be divided into n-grams. In some examples, redundant phrase extraction can be performed on documents 618 via word-level compression. The phrase-extraction module 626 can use a compression algorithm to operate on the tokenized documents. For example, some implementations can use a word-level Lempel-Ziv-Welch ("LZW") or other "dictionary-based" compression algorithm to build a compression dictionary of phrases (e.g., sequences of unigrams) from the tokenized documents 618, although other compression algorithms can be used as well. Note that the compression dictionary is independent of dictionary 606 in knowledge base 602. Generally, the compression algorithm can compress the text of the tokenized documents 618 and output compressed text while building a compression dictionary of each phrase that appears in the compressed text. In some examples, the compressed output (e.g., a compressed binary) is discarded and the compression dictionary is retained for subsequent processing. The compression dictionary can include some or all sequences of phrases of any length, e.g., applying the compression to just the phrase "the regular order" from the document text section 304, as described above with reference to FIG. 3, can result in compression-dictionary entries including "the," "regular," "order," "the regular," "regular order," "the regular order," and so on for the entire document 618. Note that some implementations can include only repeated phrases in the compression dictionary. Relatively infrequent phrases can use longer encoding since they will have less of an impact on the size of the compressed output.

The documents and the compression dictionary can then be used to perform frequency estimation of redundant phrases. The frequency estimation can be performed using a pattern matching technique such as the Aho-Corasick algorithm. For example, an ordered representation of the compression dictionary can be constructed. For example, a finite state automaton (e.g., a trie) can be used to represent the compression dictionary, with an empty string at the root, unigrams at layer 1, bigrams at layer 2, and so on. Generally speaking, the trie can be used to look up individual phrases in the compression dictionary.

Frequency estimation can be performed for individual phrases in the documents 618. For example, the frequency estimation can be performed in a single pass over the documents 618 to match phrases (n-grams) in the documents 618 to entries in the trie. The estimated frequencies can include respective frequenc(ies) with which individual entr(ies) in the compression dictionary appeared in the documents 618.

In some examples, a phrase-filtering module 628, which can represent the phrase-filtering module 236, can be configured to filter the extracted phrases from the phrase-extraction module 626 to identify a subset of the phrases that have relatively significant meaning, e.g., that can contribute to understanding the motif and actionable item 620 in the document 618. Generally speaking, the phrase-filtering module 628 can apply filtering to the phrases identified by the phrase-extraction module 626 to eliminate certain phrases, e.g., using the frequencies estimated by phrase-extraction module 626 or other criteria. The phrase-filtering module 628 can also apply information theoretic measures to perform filtering based on computed importance of the phrases.

In at least one example, extracted phrases may be preprocessed prior to the phrase-filtering module 628 filtering the extracted phrases. In such an example, the phrase filtering module 628, or another module, may analyze and correct spelling, grammar, and/or punctuation, perform stemming and/or lemmatizing operations, remove stopwords, etc. The phrase-filtering module 628 may then filter the phrases, as described below.

In some examples, phrases that appear frequently in the existing documents 618 can be useful for inferring motifs from the documents 618. For example, the phrases "microsoft windows" and "user option" can be helpful in understanding motifs in a document 618 that suggests an additional user option be added to MICROSOFT WINDOWS. In another example, a phrase such as "SQL Server 2012 R2 Enterprise Edition" can be helpful in understanding motifs in a document 618 that describe a problem with installation or operation of that specific software package. In contrast, other phrases can also appear frequently in the documents 618, but these phrases can be less useful for understanding, e.g., specific motifs in the documents 618. For example, the sentence "I love it!" may not be not helpful for identifying a motif such as a user suggestion. In other examples, when documents 618 are emailed, stock phrases such as "in reply to" and "message forwarded on" can occur very frequently but not be directly indicative of a motif, e.g., a user suggestion. In still other examples, boilerplate phrases added by electronic agents, e.g., "Thank you for contacting IT support. Please call 1-800-666-1337 to contact the support team," can occur frequently but not be directly indicative of a motif.

In other examples of emailed documents 618, "reply all" messages can tend to duplicate prior conversations. This can result in some phrases appearing frequently in the documents 618 even if they do not relate directly to a motif in those documents 618. In some examples, the phrase-filtering module 628 is configured to filter out such phrases automatically while retaining other phrases that do tend to contribute to or indicate motifs in the documents 618.

In some examples, the phrase-filtering module 628 is configured to perform one or more of the processing acts described below. In some examples, repeated phrases and their frequencies can be obtained, e.g., from phrase extraction module 626. As discussed above, the phrases can include n-grams of varying lengths, e.g., unigrams, bigrams, etc., up to arbitrary lengths. Phrases can then be removed from further consideration using one or more filters.

In some examples of filters, predetermined phrases such as the "IT support" message above can be filtered out. Predetermined phrases can be, e.g., phrases on a list of literal texts, regular expressions, or other templates.

In some examples of filters, length and/or frequency filtering can be performed. For example, relatively long-length phrases tend to be "noisy" n-grams due to long repeated phrases (e.g., automated phrases) in the documents 618. Emails and frequently-repeated templates can include long phrases that appear often in the documents 618. Such phrases tend to be relative long in length, e.g., many automated emails can include phrases such as "if you need assistance outside of these hours please call the toll free number . . . " and so on. Such phrases tend to be of relatively little value in inferring motifs from a document 618. Thus, relatively long repeated phrases, e.g., over a length of 20 words, can be filtered out regardless of how many times the phrases appear in the documents 618. In some examples, n-grams in a document 618 can be ranked by a combination of length and frequency, and a predetermined number of the highest-ranking (longest and highest-frequency) n-grams can be filtered out.

In some examples of filters, relatively low-length phrases that appear with relatively low frequency can be filtered out. Examples of relatively low frequencies can include, e.g., phrases occurring in less than a certain percentage (e.g., 1%) of the documents 618 or occurring fewer than a selected number of times (e.g., <10 occurrences in 1000 documents 618). These phrases can include, e.g., multiple instances of mistyped words, such as "shuold read my mnd."

In some examples of filters, unigrams, stop words or phrases, or words or phrases containing numbers can be filtered out. In some examples of filters, words or phrases containing numbers can be retained for further processing.

The phrase-filtering module 628 can be configured to apply any of the above-noted filters or other filters to the identified phrases. For example, in determining user suggestions related to the APPLE IPHONE, the phrase-filtering module 628 can be configured to retain (i.e., not filter out) phrases containing numbers. This can permit distinguishing suggestions relating to products whose names differ only by a number (e.g., IPHONE 5 versus IPHONE 6).

In some examples, the phrase-filtering module 628 can be configured to perform part-of-speech processing to select phrases remaining after filtering that match predetermined (or otherwise selected) part-of-speech patterns. For example, Justeson-Katz (J-K) collocation filtering can be applied to identify phrases matching part-of-speech patterns such as [.*Adjective Noun.*], [.*Noun Noun.*], [.*Adjective Adjective Noun.*] [.*Adjective Noun Noun.*] [.*Noun Adjective Noun.*] [.*Noun Noun Noun.*] [.*Noun Preposition Noun.*], etc. Phrases matching the part-of-speech patterns can be selected and other patterns discarded.

As used herein, patterns, including part-of-speech patterns and grammar patterns, are represented textually surrounded by square brackets ("[", "]"). In the listed J-K patterns and other patterns herein, ".*" represents zero or more instances of any element, e.g., a character or word (e.g., excluding newlines). Adjacent elements are matched in order in patterns herein. The term "pattern," as used herein, is not restricted to patterns expressible with this specific form of textual representation. "Patterns" can include literal word or word-sequence matches, regular expressions, context-free grammars, context-sensitive grammars, recursive grammars, or other computational models configured to determine, for a segment of user text or tagged user text (e.g., a tag sentence, as described below), whether that user text matches or otherwise satisfies the pattern. As used herein, a "pushdown grammar" is a grammar that uses a pushdown automaton (PDA) or computational technique at least as strong as a PDA to process. For the avoidance of doubt, conventional POSIX extended regular expressions (EREs), as well as other regular-expression flavors that do not support recursive patterns, are not capable of expressing pushdown grammars (notwithstanding that a set of regular expressions recursively expanded to a selected depth before matching can be able to parse texts including submatches that nest down to that depth). In some examples, pushdown grammars can include grammars parseable by computational techniques at least as strong as a pushdown automaton, e.g., context-free grammars, context-sensitive grammars, or recursive grammars. In some examples, Perl-Compatible Regular Expressions (PCRE) or Perl 6 rules, which do support recursive patterns, can be used to parse pushdown grammars.

In some examples, the phrase-filtering module 628 can be configured to perform filtering, e.g., of the selected phrases, based on one or more information theoretic measures. For example, residual inverse document frequency (RIDF) and mutual information (MI) measures can be computed for individual phrase(s) remaining after any previously-applied filtering or selecting processing. RIDF represents a difference between the proportion of documents 618 that contain a term (e.g., a text segment such as a word or phrase) and the proportion of documents 618 that, under a random model following, e.g., a Poisson distribution, would contain a term (e.g., a text segment such as a word or phrase) with comparable frequency. MI represents a difference between the probability of two words appearing together and the probabilities of those words appearing independently.

In some examples, the phrase-filtering module 628 can be configured to select n-grams with relatively negative MI scores (e.g., below a threshold of, e.g., −10). These words tend not to be found in standard dictionaries, e.g., because they include technical words or terms used in unconventional ways. In some examples, the phrase-filtering module 628 can be configured to select n-grams with relatively high RIDF scores, e.g., above a threshold of 4. In some examples, the phrase-filtering module 628 can be configured to select n-grams with both relatively negative MI and relatively high RIDF scores. In some examples, phrases with negative MI and high RIDF tend to be domain-specific phrases that do not appear in conventional dictionaries and can be added to dictionary 606, e.g., a domain-specific dictionary, for further processing. Words or phrases not selected can be discarded, in some examples.

In some examples, the phrase-filtering module 628 can be configured to select words or phrases with high RIDF (e.g., above a threshold of 4) and positive MI (e.g., above a threshold of 0.0) from the documents 618. These words or phrases can include words that are part of a general vocabulary (e.g., words found in a conventional English dictionary). Such phrases tend to be included in sentences and can be useful for motif inference, subject/object differentiation, and/or other subsequent processing discussed herein. Words or phrases not selected can be discarded, in some examples.

In some examples, words or phrases determined by the phrase extraction-module 626 or the phrase-filtering module 628 can be provided to mapping module 632 or classification module 630. Such words or phrases can include words or phrases located in the free-form user text (e.g., from document text section 304) of a single document 618, at least one document 618, or a plurality of documents 618. In some examples, the phrase-filtering module 628 can be configured to additionally or alternatively determine characteristic pattern(s) associated with respective word(s) or phrases(s) of the free-form user text. For example, the characteristic pattern for a text segment can include a tag sentence, as described below, a sequence of part-of-speech tags, or other forms described herein.

In some examples, a classification module 630, which can represent the classification module 246, can be configured to determine an association between a first text segment, e.g., a word or phrase in the free-form user text, and a first individual class of a model, e.g., of ontology 604. The classification module 630 can determine the association, e.g., based at least in part on a characteristic pattern associated with the first text segment. The classification module 630 can update the dictionary 606 to include the association.

In some examples, the classification module 630 is configured to identify a particular text segment that is not associated with a stored dictionary 606 of the knowledge base 602. In at least one example, the particular text segment can be present in one(s) of the plurality of documents 618. For example, the classification module 630 can take as input words or phrases from the phrase-filtering module 628 that extracted from the document 618 but are not found in the dictionary 606.

In at least one example, the dictionary 606 includes respective attribute(s) for individual one(s) of the words or phrases in the dictionary 606, in addition to the classes to which those words or phrases map. Some examples of attributes include, but are not limited to, part(s) of speech of word(s) or of word(s) in phrase(s), identification of which of the Justeson-Katz patterns a phrase matches, spatial relationships between words in a phrase, context(s) in which a phrase can occur (e.g., before or after a verb), stems of word(s), e.g., in a phrase (e.g., "run" for "running"), synonyms of word(s), e.g., in a phrase, order of selected words in a phrase, e.g., words considered to be important based on, e.g., RIDF or MI scores, or distances between ones of the selected words. In at least one example, a neural network or other classifier (e.g., multiple class one-vs.-all classifier, random forest classifier, etc.) can be trained based on the respective attribute(s) for individual one(s) of the words or phrases in the dictionary 606 and the classes to which those words or phrases map.

In some examples, the classification module 630 is configured to determine one or more respective attribute(s) of the particular text segment. Some examples of attributes include, but are not limited to, a parts-of-speech tag for the word or the phrase, stemmed output associated with the word or the phrase in view of other stemmed output, or a co-occurrence relationship between the word or the phrase and other words or phrases used in a similar context as the word or the phrase. The classification module 630 may determine additional and/or alternative attribute(s) listed above, e.g., using techniques described herein with reference to the phrase-extraction module 626 and the phrase-filtering module 628. The determined attribute(s) of the particular text segment can be arranged, e.g., as a "feature vector" expressing values of the attribute(s) in a predetermined order.

In at least one example, the classification module 630 can be configured to update the dictionary 606, e.g., to associate, in the dictionary 606, the particular text segment with a particular class of the model based at least in part on the one or more attribute(s) of the particular text segment and one or more of the attribute(s) of individual one(s) of the words or phrases in the dictionary 606. For example, the classification module 630 can provide the feature vector to a neural network or other classifier that has been trained based on the respective attribute(s) for individual one(s) of the words or phrases in the dictionary 606 and the classes to which those words or phrases map, as described above. The neural network or other classifier can output a set of probabilities, set of values, and/or set of multi-dimensional information criteria over a plurality of classes associated with the model. The set of probabilities, set of values, and/or set of multi-dimensional information criteria can include a plurality of probabilities, values, and/or multi-dimensional information criteria that respectively correspond to the plurality of classes associated with the model. That is, a probability, value, and/or multi-dimensional information criteria can represent a likelihood that the particular text segment corresponds to a class associated with the model. In some examples, the neural network or other classifier can output a confidence value in addition to a probability, value, and/or multi-dimensional information criteria. The confidence value can indicate a level of confidence associated with a classification of the particular text segment.

In at least one example, the classification module 630 is configured to compare individual of the probabilities, values, and/or multi-dimensional information criteria to a predetermined threshold. In at least one example, the predetermined threshold can be multi-dimensional. If a probability, value, and/or multi-dimensional information criteria is greater than the predetermined threshold, the classification module 630 can transmit or present an indication associated with the particular text segment, e.g., to a domain expert, an administrator, or another individual. The indication can identify a class corresponding to the probability, value, and/or multi-dimensional information criteria that is greater than the predetermined threshold. That is, the indication can suggest that the particular text segment belongs to the class. In some examples, the indication can include the probability, value, and/or multi-dimensional information criteria, and/or a confidence score associated with the class. In at least one example, more than one probability, value, and/or multi-dimensional information criteria can be greater than the predetermined threshold. In such an example, the classification module 630 can select a class associated with a highest probability, value, and/or multi-dimensional information criteria, or a predetermined number of classes associated with the highest probabilities, values, and/or multi-dimensional information criteria, to transmit or present via an indication associated with the particular text segment. In another example, no probabilities, values, and/or multi-dimensional information criteria may be greater than the predetermined threshold. In such an example, the classification module 630 can transmit or present an indication associated with the particular text segment that identifies a class associated with the model that the classifier determines to have a highest probability, value, and/or multi-dimensional information criteria, and the indication can include a confidence value indicating that the class is associated with low confidence, i.e., a confidence value below a threshold.

In at least one example, the classification module 630 can cause a user interface to be presented, e.g., to a domain expert, an administrator, or another individual to present indication(s). In some examples, the user interface can identify one or more classes associated with the model that the classifier determined correspond to the particular text segment, i.e., one or more classes having probabilities, values, and/or multi-dimensional information criteria above the predetermined threshold. The user interface can enable the domain expert, the administrator, or the other individual to take one or more actions with respect to the indication(s). As an example, the user interface can enable the domain expert, the administrator, or the other individual to accept, reject, or modify information associated with an indication. For instance, an indication can identify a class to which the particular text segment belongs, and the user interface can enable the domain expert, the administrator, or the other individual to accept the class, reject the class, or modify the class. If the domain expert, the administrator, or the other individual accepts the class, i.e., agrees that the particular text segment belongs to the class, the particular text segment can be mapped to an entry in the dictionary 606 corresponding to the class. If the domain expert, the administrator, or the other individual rejects the class, i.e., disagrees that the particular text segment belongs to the class, the particular text segment may not be mapped to any entry in the dictionary 606. If the domain expert, the administrator, or the other individual modifies the class, the domain expert, the administrator, or the other individual can identify a new class to which the particular text segment belongs. The new class can be a class newly added to the ontology 604 for this particular text segment, or can be an existing class in the ontology 604. In such an example, can update the ontology 604 and/or the dictionary 606 by mapping the particular text segment to an entry in the dictionary 606 corresponding to the new class.

Modifications can be useful for iteratively training the classifier. That is, the feature vector associated with the particular text segment and the new class can be added to the respective attribute(s) for individual one(s) of the words or phrases in the dictionary 606 and the classes to which those words or phrases map, which can be utilized in re-training the classifier.

In some examples, an indication associated with the particular text segment that includes one or more classes associated with the model can be presented via the user interface to the domain expert, the administrator, or the other individual. The domain expert, the administrator, or the other individual can take actions with respect to individual classes or all of the classes at a same time. That is, the domain expert, the administrator, or the other individual can interact with the user interface via a single interaction to accept, reject, or modify all of the classes presented with the indication associated with the particular text segment. For instance, the domain expert, the administrator, or the other individual can accept all of the classes presented via the user interface or reject all of the classes presented via the user interface with a single interaction. Or, the domain expert, the administrator, or the other individual can interact with the user interface via multiple interactions to accept, reject, or modify individual of the classes presented with the indication associated with the particular text segment. For instance, in an example, the domain expert, the administrator, or the other individual can accept a first class of the one or more classes presented via the user interface and reject a second class and a third class of the one or more classes presented via the user interface via multiple interactions with the user interface.

In additional and/or alternative examples, the classification module 630 can automatically map the particular text segment to an entry corresponding to a class in the dictionary 606 that corresponds to the class that was identified by the classifier. That is, in at least one example, the dictionary 606 can be updated based on policies. In such examples, the classification module 630 can determine that the probability, value, and/or multi-dimensional information criteria associated with the class is above a predetermined threshold and can automatically map the particular text segment to the entry corresponding to the class in the dictionary 606, without any input from the domain expert, the administrator, or the other individual. In at least one example, the predetermined threshold for automatically mapping the particular text segment to the entry in the dictionary 606 can be greater than the predetermined threshold for presenting the class to a domain expert via the user interface. As described above, in at least one example, the predetermined threshold can be multi-dimensional. In some examples, both the probability, value, and/or multi-dimensional information criteria associated with the class and a confidence value indicating a level of confidence associated with the probability, value, and/or multi-dimensional information criteria and/or the class may be required to be above a predetermined threshold for the particular text segment to be mapped to the entry corresponding to the class in the dictionary 606. In at least one example, at least one of a probability, value, and/or multi-dimensional information criteria associated with a class can be below a predetermined threshold and/or a confidence value can be below a predetermined threshold and the classification module 630 can refrain from mapping the particular text segment to the dictionary 606, without any input from the domain expert, the administrator, or the other individual.

Based at least in part on mapping the particular text segment to one or more entries of the dictionary 606 (via input from the domain expert, the administrator, or the other individual or automatically), the classification module 630 can then update the dictionary 606 to record an association between the particular text segment and class(es) of the model. The classification module 630 can also store at least some of the determined attribute(s), e.g., the feature vector, in the dictionary 606 as attribute(s) of the particular text segment. In some examples, the classification module 630 can store, as an attribute of the particular text segment, an indication that the class was determined automatically, provided by a human domain expert, administrator, or other individual, etc. In some examples, the classification module 630 can provide information about words, phrases, attributes, and mappings to the knowledge-base modification module 642. In some of these examples, the knowledge-base modification module 642 can then make changes to the knowledge base 602.

In some examples, a mapping module 632, which can represent the mapping module 238, can be configured to receive individual words or phrases of the free-form user text of the individual ones of the plurality of documents 618 including free-form user text. The mapping module 632 can map one(s) of the received individual words or phrases to individual classes of a model, e.g., an ontology 400 or 604. For example, the individual classes can include a question-indicator class 420, an emotion class 414, or other classes described herein or otherwise defined in a model. In some examples, the mapping module 632 can determine synonyms of ones of the individual words or phrases, e.g., using dictionary 606, as described above. The mapping module 632 can then determine at least some of the individual classes of the model based at least in part on the synonyms instead of, or in addition to, the individual words or phrases.

In a nonlimiting example given above, the dictionary 606 can be configured to map "browser," "INTERNET EXPLORER" and "IE10" to the synonym "browser." The mapping module 632 can then determine the classes using the word "browser" to avoid an over-specified mapping, or using both "browser" and the original word to provide more specificity.

The terms "mapping" and "tagging" are used interchangeably herein to describe techniques or processes for associating classes with words or phrases. A particular text segment can have one or multiple tags, i.e., can be associated with one or more classes of the model. For example, the word "should" can be associated with both the suggestion indicator class 416 and the modal indicator class 418, as described above with reference to FIG. 4. In some examples, the mapping module 632 can determine a collection of class(es) of the model associated with individual word(s) or phrase(s) of the free-form user text based at least in part on the association determined by the classification module 630. As used herein, the term "collection" refers to an individual item or group of multiple items.

The model can include one or more classes such as those described above with reference to FIGS. 4 and 5. As used herein, the term "tag sentence" refers to a sequence of tags corresponding to some or all of the free-form user text, arranged in the same order in which the corresponding words or phrases are presented in the user text. A tag sentence is not required to correspond to a complete sentence in the user text. In some examples, individual tag(s) in a tag sentence can be associated with corresponding words or phrases. Tag sentences are represented in this document as quoted lists of <text segment>/<class> pairs, e.g., "ball/Entity bounce/Action" for the sentence "the ball bounces" or "uploading/Action ONEDRIVE/Entity fast/Qualifier" for the sentence "uploading to ONEDRIVE is fast." In some examples, a tag sentence can be represented as a list of one or more pairs, each pair including a word or phrase and an associated ontology class. The order of terms listed in tag sentences in this application is not limiting. Terms in tag sentences may occur in the same order as the corresponding words or phrases in the user text, or in a different order.

In some examples, the mapping module 632 can be configured to determine, for individual sentence(s) or other delimited subsets of the free-form user text, whether an entity (a text segment of entity class 410) is present in that sentence or other subset. In some of these examples, if no entity is present, the mapping module 632 can add to the tag sentence an unknown-entity class 430, even in the absence of a specific word or phrase with which to associate the unknown-entity class 430.

For example, in the sentence "if it could work better, that would be great," the subject, "it," is a stopword and so is filtered out in this example. As a result, no instance of entity class 410 is expressly identified in the sentence. The result of the phrase-extraction module 626, the phrase-filtering module 628, and the mapping module 632 can be the tag sentence "could/Modal-Indicator work/Action would/Modal-Indicator great/Positive-Emotion." Since no entity is present in this tag sentence, the mapping module 632 can add an instance of the unknown-entity subclass 430 to provide to the analysis module 634 the tag sentence, e.g., "-/Unknown-Entity could/Modal-Indicator work/Action would/Modal-Indicator great/Positive-Emotion" or "work/Action would/Modal-Indicator great/Positive-Emotion-/UnknownEntity could/Modal-Indicator," where "-" represents the instance of the unknown-entity subclass 430.

In some examples, an analysis module 634, which can represent the analysis module 240, can be configured to identify motifs expressed in the documents 618. In at least one example, a "motif" is a high-level category associated with a specific grammar pattern, e.g., as described below with respect to Table 2. In some examples, the analysis module 634 can be configured to identify actionable items 620 based at least in part on identified motif(s). In at least one example, an "actionable item" is a piece of text, e.g., provided by a user, that matches a grammar pattern. The analysis module 634 can provide the actionable item 620 or an indication thereof to, e.g., the recommendation module 638 or the reporting module 640.

User feedback can be identified as including an actionable item 620 when a particular motif is associated with the user feedback. An actionable item 620 can generally include a problem motif, a suggestion motif, a question motif, or other motif that can require attention of a user (e.g., an administrator or other user 624). For example, if the analysis module 634 determines that a sentence is associated with a problem motif, the analysis module 634 can determine that the sentence relates to an actionable item 620 (e.g., a problem). To illustrate, a sentence that states "These account settings are confusing" can be associated with a problem for an account entity (e.g., problem motif—account settings/entity followed by confusing/ProblemCondition). Here, the sentence is flagged as including an actionable item so that an administrator of the account settings can address the problem. In some examples, the actionable item 620 can include a user suggestion regarding software or hardware, e.g., "my computer should levitate" (computer/Entity should/Suggestion-Indicator levitate/Action).

Analysis module 634 can identify these motifs based at least in part on a comparison of the mapped words or phrases for the respective document to a predetermined (or otherwise selected, and likewise throughout) grammar pattern, e.g., stored in the pattern set 608. For example, analysis module 634 can identify these motifs based at least in part on individual one(s) of the mapped words or phrases for the respective document 618 that match a predetermined grammar pattern or on mapped words or phrases of the respective document that match the predetermined grammar pattern for a motif, e.g., a suggestion motif. Example grammar patterns can express relationships between classes in a tag sentence such as proximity or order. These relationships can be expressed, e.g., using CFGs or other grammars, e.g., regular expressions that treat tags as atomic rather than characters of text and that can thus be applied to tag sentences. In some examples, analysis module 634 can apply the predetermined grammar patterns to the tag sentences, e.g., to the mapped classes and subclasses corresponding to the user text. In some examples, the pattern set 608 can be updated dynamically, e.g., to add, remove, or modify patterns, during analysis of a user text or between analyses of two user texts. In some examples, analysis module 634 can determine that a tag sentence matching any grammar pattern in the pattern set 608 is an actionable item. In some examples, grammar patterns in the pattern set 608 can be associated with respective flags indicating whether tag sentences matching those grammar patterns are actionable items or not. For example, the "Suggestion" patterns in Table 2, below, can be flagged as indicating actionable items. In another example, a motif corresponding to a grammar pattern such as [Strong-Certainty Emotion Entity] can be flagged as not indicating an actionable item. Such a grammar pattern might match user text such as "I really hate my computer," which might not be considered actionable since it lacks detail.

In some examples, the analysis module 634 or other component(s) of the computing device 616 are configured to identify set(s) of one or more of the mapped words or phrases that correspond to the predetermined grammar pattern. In some of these examples, the predetermined grammar pattern is associated with a motif, which can be associated with an actionable item 620, e.g., a user suggestion. In some examples, the predetermined grammar pattern can define a first class of the model preceding a second class of the model. In some examples, the predetermined grammar pattern can indicate that a suggestion-indicator class 416 (the first class) followed by an entity class 410 (the second class) corresponds to a motif, e.g., a user suggestion such as a sentence beginning "It would be nice if WINDOWS . . . ."

In some examples, the predetermined grammar pattern can indicate that a modal-indicator class 418 (the first class) followed by an entity class 410 (the second class) corresponds to a motif, e.g., a user suggestion such as "add/Modal-Indicator new shortcut/Entity," "change/Modal-Indicator API/Entity call or settings name," or "remove/Modal-Indicator animations/Entity." In some examples, the predetermined grammar pattern for the suggestion motif defines a first class of the ontology 604 preceding a second class of the ontology 604. The first class or the second class in some of these examples comprises a suggestion-indicator class 416 for words or phrases that represent presence of a suggestion in the free-form text of document(s) 618.

Example grammar patterns for various motifs are listed in Table 2. Square brackets surround patterns, parentheses denote grouping, and vertical bars ("|") denote alternation, i.e., matching any of the options separated by the vertical bars in a particular group. The mapping module 632 can be configured, in some examples, to apply one or more of the example patterns in Table 2 to the tag sentence or tagged text from the phrase-filtering module 628. In an example, the tag sentence "HALO/Entity should/Modal-Indicator teleport/Action me in real life" matches the pattern in the first row of Table 2 since it has a group of an instance of modal-indicator class 418 followed by an instance of action class 402, and that group follows an instance of entity class 410.

TABLE 2

| Motif | Example Pattern |
| --- | --- |
| Suggestion | [.* (Modal-Indicator .* Action | Suggestion-Indicator) .*] preceding or following [Entity] |
| Suggestion | [Submission-Indicator] preceding or following [Entity] |
| Suggestion | ([Submission-Indicator] preceding or following [Entity]) followed by [Action] |
| Problem | [Problem-Condition | Condition | Negation .* Action] |
| Problem | [Entity] preceding or following [Problem-Condition] |
| Action | [Entity] preceding or following [Action] |
| Question | [Entity] preceding or following [Question-Indicator Action | Question-Indicator Problem-Condition] |
| Question | [Entity] preceding or following [Question-Indicator Negation .* Action] |

In some examples, the patterns can include subpatterns, or subpatterns can be used to compose a higher-level pattern in a recursive manner. For example, [Entity] can represent [Virtual-Entity|Physical-Entity|Replaceable-Entity|Maintenance-Entity]. In another example, [Submission Indicator] can represent [Suggestion-Indicator|Modal-Indicator].

In some examples, the analysis module 634 is configured to query the dictionary 606 using one(s) of the words or phrases from the phrase-filtering module 628. The dictionary 606, e.g., implemented using a trie or hash map, can provide class(es) of the model, e.g., ontology 604. The identified occurrences of the words or phrases can be tagged, e.g., in the free-form text or in sentences extracted therefrom, according to the provided class(es).

In some examples, the analysis module 634 is configured to process the tagged text of the documents to identify valid interactions according to the ontology 604. Document(s) 618, or individual sentence(s) in document(s) 618, can be filtered out if they do not include valid interactions according to the ontology 604. Examples of valid interactions are discussed above with reference to FIG. 4.

In some examples, the analysis module 634 is configured to infer motifs from the tag sentences, e.g., those not filtered out based on interactions. Nonlimiting examples of motifs can include problems, actions, or suggestions. Problems can identify a particular entity (e.g., operating system or hard drive) and associated state, condition, or symptoms (e.g., crash or defective). Actions can identify actions performed by or on an entity, e.g., to improve or alter the state of the entity, such as rebooting a computer or restarting an application. Suggestions can identify user suggestions, e.g., regarding improvement of hardware or software, e.g., "make it more reliable" or "allow font sizes of 6.14 points."

Note that the action motif is different from the action class 402 of the ontology 400. The action motif is an inferred meaning obtained from a given document 618, whereas the action class 402 is a way of identifying selected words or phrases in the dictionary 606. A document 618 containing a text segment tagged with the action class 402 may or may not include text corresponding to the action motif.

In some implementations, the analysis module 634 can be configured to match certain grammar patterns to the tag sentences to identify the motifs. For example, the analysis module 634 can use different grammar patterns for each of the types of motifs, e.g., problems, actions, or suggestions. The grammar patterns can be built using the classes or subclasses of the model, e.g., ontology 604. Examples are discussed above with reference to Table 2.

As described above with respect to FIG. 5, in some examples, a domain expert, an administrator, or another individual can add classes to the ontology 604 to enable more granular inferences. For instance, a domain expert, an administrator, or another individual can add an ontology class associated with a fundamental area to the ontology 604 and dictionary 606. In some examples, the analysis module 634 can be configured to match certain grammar patterns to the tag sentences to identify whether the tag sentences are directed to subclasses of fundamental areas, in a similar process as described above. For example, the analysis module 634 can use different grammar patterns for each of the types of fundamental areas, e.g., reliability, security, usability, etc. The grammar patterns can be built using the classes or subclasses of the model, e.g., ontology 604. As described above, tag sentences can be represented in this document as quoted lists of <text segment>/<class> pairs. As a non-limiting example, a grammar pattern that can map to a motif associated with a fundamental area, e.g., a problem associated with a fundamental area, is [Action].*[Negative Fundamental Area]. That is, the grammar pattern that can map to a motif associated with a fundamental area can include an Action tag followed by a Negative Fundamental Area tag. For instance, restarting/Condition-Problem device/Entity slow/NegativeFundamentalAreaPerformance can represent the tag sentence of "restarting the device is slow." Based on the tag sentence, the analysis module 634 can determine that the motif is a problem associated with performance.

Example grammar patterns for various motifs associated with fundamental areas are listed in Table 3. Square brackets surround patterns, parentheses denote grouping, and vertical bars ("|") denote alternation, i.e., matching any of the options separated by the vertical bars in a particular group. As described above, the mapping module 632 can be configured, in some examples, to apply one or more of the example patterns in Table 3 to the tag sentence or tagged text from the phrase-filtering module 628.

TABLE 3

| Motif | Example Pattern |
|---|---|
| Suggestion-Performance | [.* (Modal-Indicator .* Action | Suggestion-Indicator) .*] preceding or following [Entity] preceding or following [Positive Fundamental Area Performance] |
| Problem-Security | [Problem-Condition | Condition | Negation .* Action] preceding or following [Negative Fundamental Area Security] |
| Question-Usability | [Entity] preceding or following [Question-Indicator Action | Question-Indicator Problem-Condition] preceding or following [Neutral Fundamental Area Usability] |

In another example, the analysis module 634 can be configured to perform post-processing to determine whether a tag sentence is associated with one or more fundamental areas, such as reliability, security, usability, etc. In at least one example, classes or subclasses of the model, e.g., ontology 604, can respectively correspond to entries in the dictionary 606. For instance, an entry in the dictionary 606 can correspond to the fundamental area of security and another entry in the dictionary 606 can correspond to the fundamental area of performance. Each entry can have one or more words or phrases mapped to the entry. The one or more words or phrases can also be mapped to other classes of the ontology, e.g., entity class 410, qualifier class 424, etc. As an example, the words "password" or "log-in homepage," which are entities, can be mapped to an entry corresponding to the fundamental area of security (and also to an entry corresponding to the entity class 410). Additionally and/or alternatively, various qualifiers, e.g., "slow," "fast," etc. can be mapped to an entry corresponding to the fundamental area of performance (and also to an entry corresponding to the qualifier class 424). In some examples, words or phrases can be mapped to entries corresponding to subclasses associated with the fundamental areas. For instance, example qualifiers such as "lagging," "creep," "crawl," etc., can be mapped to an entry corresponding to a negative subclass of the fundamental area of performance (and also to an entry corresponding to the qualifier class 424).

In at least one example, the analysis module 634 can access a word or a phrase corresponding to a particular tag, e.g., a word or phrase tagged as an entity (an instance of entity class 410), a word or phrase tagged as a qualifier (an instance of qualifier class 424), etc. identified in a tag sentence. The analysis module 634 can compare the word or the phrase associated with the particular tag to various entries in the dictionary 606. Based at least in part on comparing the word or the phrase associated with the particular tag with the various entries in the dictionary 606, the analysis module 634 can determine that the word or the phrase associated with the particular tag is mapped to a class corresponding to a fundamental area. As a result, the analysis module 634 can change the association of the word or the phrase with the motif to include the corresponding fundamental area.

Based at least in part on determining that the word or the phrase is mapped to an entry in the dictionary corresponding to a fundamental area, or a subclass of a fundamental area, the analysis module 634 can change the association of the word with the motif to include the fundamental area, or the subclass of the fundamental area. For instance, if the analysis module 634 determines that a tag sentence corresponds to a problem motif, and the entity identified in the tag sentence is mapped to a fundamental area associated with security, the analysis module 634 can change the association of the word with the motif to include the fundamental area, e.g., security problem motif. As a non-limiting example, if the word "password" is tagged as an entity in a tag sentence associated with a problem motif, and the analysis module 634 determines that the word "password" is mapped to the fundamental area of security, the analysis module 634 can determine that the tag sentence is associated with a security-problem motif. Additionally and/or alternatively, if the analysis module 634 determines that a tag sentence corresponds to a problem motif, and a qualifier identified in the tag sentence is mapped to a fundamental area associated with performance, the analysis module 634 can change the association of the word with the motif to include the fundamental area, e.g., performance problem motif. As a non-limiting example, if the word "slow" is tagged as a qualifier in a tag sentence associated with a problem motif, and the analysis module 634 determines that the word "slow" is mapped to the fundamental area of performance, the analysis module 634 can determine that the tag sentence is associated with a performance problem motif.

In some implementations, the analysis module 634 can analyze both unstructured data such as free-form text in the documents 618 and structured data from the documents 618 and/or other data. In some examples, structured data from a document 618 (e.g., Survey Question ID or Survey Response from document data section 306, FIG. 3) can be appended to the free-form text and analyzed as discussed above. In some examples, structured data can be tagged by mapping module 632 and tested against grammatical patterns in pattern set 608.

In some examples, inferred motifs can be verified against data in the document data section 306, e.g., a flag indicating that a suggestion is present in the document text section 304 of a given document 300. For example, the analysis module 634 can be configured to compare motifs directly extracted from structured data to motifs inferred from free-form text to see if the motifs match. In some examples, the analysis module 634 can be configured to infer the motifs based at least in part on data external to the documents 618, e.g., automatic-upgrade cycles of software entities or batch numbers of parts used in hardware entities. For example, the analysis module 634 can determine that a suggestion motif is present using more relaxed grammar patterns during the week following a software rollout than in subsequent weeks.

In at least one example, the analysis module 634 can infer more than one motif associated with a document 618. In such examples, the analysis module 634 can access a precedence table 636 associated with the pattern set(s) 608. Precedence table 636 is illustrated as included in pattern set(s) 608. Additionally or alternatively, precedence table 636 can be stored separately from the pattern set(s) 608, e.g., in a database table having a foreign key relationship with pattern set(s) 608. The precedence table 636 can be a predefined set of rules that determine which motif of multiple motifs should be prioritized. That is, the precedence table 636 can be utilized to remove redundant inferences. In an example, the precedence table 636 can be defined by a domain expert, an administrator, or another user. In another example, the precedence table 636 can be learned by a neural network or other machine learning mechanism. In such an example, the neural network or other machine learning mechanism may be trained on passively observing which types of motifs are more frequently used to generate actionable items. Additionally and/or alternatively, a domain expert, an administrator, or another user can manually tag motifs with a value indicative of a level of importance, which can be used to train a neural network or other machine learning mechanism. For instance, a domain expert, an administrator, or another user can manually tag a specific motif with a first value that is greater than a second value associated with a generic motif. Accordingly, the specific motif can be prioritized over the generic motif in the precedence table 636.

The precedence table 636 can specify a first motif that supersedes a second motif. In some examples, the precedence table 636 can specify that the second motif supersedes a third motif and so on. In at least one example, the precedence table 636 can include code, which can be read from left to right to determine priority. For instance, a motif on the left can be prioritized over a neighboring motif to the right and so on. In at least one example, the precedence table 636 can prioritize specific motifs over generic motifs. In an alternative example, the precedence table 636 can prioritize generic motifs over specific motifs. Or, in yet another example, the precedence table 636 can indicate that neither a generic motif nor a specific motif is prioritized over the other and that either one can be selected. As a non-limiting example, the precedence table 636 can indicate that if the analysis module 634 determines that a document 618 is associated with a problem, a suggestion, and a delighter, that the analysis module 634 should prioritize the problem over the suggestion and the suggestion over the delighter.

Or, as an additional non-limiting example, the precedence table 636 can indicate that if the analysis module 634 determines that a document 618 is associated with a problem and a problem associated with the fundamental area of performance, e.g., a performance problem motif, that the analysis module 634 should prioritize the performance problem motif over the problem motif. Accordingly, the analysis module 634 can determine that the problem associated with the performance problem motif is the motif that corresponds to the document 618.

In some examples, the precedence table 636 may include pair-wise lambda expressions, as described above. That is, a pair-wise lambda expression may indicate that a first motif supersedes a second motif. In at least one example, two or more pair-wise lambda expressions may be combined in a chain of pair-wise lambda expressions, which may be executed end-to-end, i.e., an end-to-end chain. For instance, a chain of pair-wise lambda expressions may include a first pair-wise lambda expression indicating that a first motif supersedes a second motif, a second pair-wise lambda expression indicating that the second motif supersedes a third motif, and a third pair-wise lambda expression indicating that a fourth motif supersedes the first motif. Accordingly, the end-to-end chain may indicate that the fourth motif supersedes the first motif which supersedes the second motif which supersedes the third motif. That is, an end-to-end chain may connect pair-wise lambda expressions in a transitory manner. In such examples, part or all of the chain may be executed in a bottom-up manner.

Table 4 below provides a non-limiting example of precedence table 636, which includes non-limiting examples of a precedence analysis for each precedence rule in the Table 4.

TABLE 4

| Precedence Rule | Pattern | Example Sentence | Precedence Analysis |
| --- | --- | --- | --- |
| NonDelighters are PRECEDED OVER by Specific Problems | NonDelightersNONSTRICT": ["Problems_FundamentalArea"] | I am angry Outlook is too slow | Instead of generating two Inferences - NonDeligther for being Angry and Problem_Performance for being too slow, one Inference about Problem_Performance is generated and the emotional aspect of being angry is captured as RecordQualifier associated with the Inference |
| Generic Problems are PRECEDED OVER by Specific Problems | "Problems": ["Problems_FundamentalArea", "ProblemsNONSTRICT_FundamentalArea", "ProblemsFUNAREA_FUNCTIONAL] | Printing is a problem because it is very slow | Instead of generating two Inferences - Problems for being a problem and Problem_Performance for being too slow, one Inference about Problem_Performance is generated |
| Suggestions are PRECEDED OVER by Problems | "SuggestionsFUNAREA_FUNCTIONAL": ["ProblemsFUNAREA_FUNCTIONAL"] | Please fix the issue | Instead of generating two Inferences - Suggestions for "Please" and Problems for the "issue," one Inference about Problem_Functional is generated |

Accordingly, the analysis module 634 can determine that the problem is the motif that corresponds to the document 618.

In some examples, a recommendation module 638, which can represent the recommendation module 242, can be configured to analyze individual ones of the motifs and corresponding actionable items 620 from analysis module 634 to generate one or more recommendations. The recommendation(s) can, e.g., relate to an update to the software or hardware. The recommendation module 638 can determine the actionable item(s) 620, e.g., as the top-ranked one or more items in a ranked list of the actionable items 620. The recommendation module 638 can determine the actionable item(s) 620, e.g., based on the number of times a particular actionable item 620 has been determined. For example, the number can indicate the number of times a user suggestion has been made in (e.g., determined by the analysis module 634 for or with respect to) the plurality of documents 618. The recommendation module 638 can be configured to make this determination, e.g., based on metadata associated with actionable items 620 (e.g., a count of "Like" or "Me Too" comments on a user feedback site), or based on relative priorities of the entities identified in the actionable items 620. In a nonlimiting example of relative priorities, actionable items 620 related to an operating system, such as WINDOWS, might be higher or lower priority than actionable items 620 related to an application program such as OFFICE in various example configurations of recommendation module 638.

In some examples, a reporting module 640, which can represent the reporting module 248, can be configured to present or transmit an indication of at least one actionable item 620, e.g., provided by the analysis module 634. Additionally or alternatively, the reporting module 640 can be configured to present or transmit an indication of the actionable item 620, e.g., provided by the recommendation module 638. For example, the reporting module 640 can be configured to send the recommendation to a computing device 622 of a user 624 that is associated with management of the software and/or hardware, as discussed above. The reporting module 640 can additionally or alternatively transmit indication(s) of one or more of the actionable item(s) 620 from the analysis module 634. For example, the reporting module 640 can include or communicate with a database front-end or Web server to provide dashboard or other user-interface representations of actionable item(s) 620 or 620.

In some examples, an actionable item 620 includes a ranking of the actionable items 620, e.g., based on selected ranking criteria. In some of these examples, a first actionable item 620, e.g., a first user suggestion, is ranked higher than a second actionable item 620, e.g., a second user suggestion, when the first actionable item 620 occurs more frequently in the plurality of documents 618 than does the second actionable item 620. In some examples, an actionable item 620 includes a ranking determined based at least in part upon ranking criteria that can include at least some of: pre-defined knowledge, specific top-k actionable items ($k \in \mathbb{Z}$), or which user or data channel was the source of the document 618 including the suggestion.

In some examples, a knowledge-base modification module 642, which can represent the knowledge-base modification module 244, is configured to determine a first text segment in the free-form user text. For example, the knowledge-base modification module 642 can determine a text segment not represented in the dictionary 606 of the knowledge base 602. The knowledge-base modification module 642 can then determine that the first text segment has a threshold level of similarity to a second, different text segment represented in the dictionary 606 of the knowledge base 602. The threshold level of similarity can be, e.g., a subset relationship or a specified Hamming distance in tokens. For example, the phrase "SQL SERVER 2012" is a subset of the phrase "SQL SERVER 2012 R2 ENTERPRISE EDITION." In this example, the knowledge-base modification module 642 can determine that the former has the threshold level of similarity to the latter. The knowledge-base modification module 642 can then replace and/or supplement the second text segment in the dictionary 606 of the knowledge base 602 with the first text segment. This can permit reducing the memory consumption and computational load of the dictionary 606 while retaining accuracy in identification of motifs in documents 618, or balancing accuracy and memory consumption. For example, the level of specificity or generality of words or phrases in the dictionary 606 of the knowledge base 602 can be adjusted, e.g., to provide effective detection of motifs in a given set of documents 618.

In some examples, the knowledge-base modification module 642 is configured to add, for individual words mapped to at least one class of the model, at least one of one or more synonyms of the respective word or one or more lexical or morphological forms of the respective word to a knowledge base 602 dictionary 606 associated with the model. A morphological form of a term can include, e.g., a stem of a term plus any endings (suffixes) of the stem (e.g., for a stem of "confuse"—"confusing," "confused," "confuses," "confusion," etc.). In an example, the dictionary 606 includes the word "work" associated with the condition class 412. The knowledge-base modification module 642 can use a stemming algorithm or other information to add "working," "works," and "worked" to dictionary 606 so that those forms map to the same class as the word "work." In some examples, the knowledge-base modification module 642 can add past- or future-tense forms of present-tense entries, plural forms of singular entries (or vice versa), or other grammatical variants or spelling variants ("gray" vs. "grey") of terms to the dictionary 606.

Additionally, in at least one example, the knowledge-base modification module 642 can be configured to update the knowledge base 602 to include enhancements that can be made to the ontology 604 and corresponding dictionary 606, as described above with reference to FIG. 5.

In some examples, the reporting module 640 can generate various visualizations, e.g., graphical interfaces, that reflect motifs inferred by the analysis module 634. The graphical interfaces can reflect individual user suggestions or trends across multiple suggestions. The reporting module 640 can provide interface options such as menu selections to filter by product name, product model (e.g., WINDOWS 7 versus WINDOWS 10 or GMAIL beta versus GMAIL non-beta), or other fields to identify particular properties of suggestions that are obtained from the documents 618. The reporting module 640 can also implement a queryable application programming interface (API), e.g., a REST, Web Services, or other API, to allow other modules (e.g., third-party software) to access the output.

In some examples, the reporting module 640 can provide a graphical representation of a motif tree showing the motif(s), ontology classes and subclasses, and words or phrases found in one or more document(s) 618. Such a tree can show how the motif(s) were identified. The reporting module 640 can present the motif tree as part of a graphical user interface that allows a user to interact with the motif tree. For example, users can move the mouse cursor over a given node and the immediate parent and sibling nodes can be highlighted. This can be useful, for example, for helping users quickly grasp the significance of relatively complicated motif trees.

In some examples, the reporting module 640 can provide a graphical representation of trends across multiple documents 618, e.g., by showing a "tag cloud" of entities or a view showing icons indicating, e.g., by their size or color, how frequently particular words or phrases, classes, or motifs occur in the analyzed documents 618. Example icons can include circles sized relative to the number of instances of individual motifs extracted from the documents 618. The graphical representation can include or be presented accompanying selectable user options to view analyses of documents 618 at user-specified levels of granularity.

In some examples, an entity 614, e.g., a user, can receive actionable item 620, e.g., via an app 612 or other component of, or executing on, computing device 610. Examples are discussed above. In some examples, entity 614 can provide feedback information the system can use to improve the accuracy and utility of the output. In some examples, entity 614 can provide an indication of text in a document for which actionable item 620 should have been identified, in the judgment of entity 614, but for which the system did not identify actionable item 620. For example, app 612 can present at least part of a document via a user interface. The user interface can additionally present a prompt, such as "select the portion of the document you believe should be acted on." The user interface can permit entity 614 to highlight, circle, touch, or otherwise indicate text or other contents of the document. App 612 can then transmit feedback information of at least the indicated portions to the system.

In some examples, app 612 can, e.g., via a user interface, receive indications from entity 614 that multiple technical phrases in at least one document refer to the same entity or other ontology-class instance. For example, the user interface can present document(s) and receive touches, drags, or other inputs indicating synonyms or relationships between words or technical phrases. For example, app 612 can receive input from entity 614 indicating that the words "XB1" and "XBOX ONE" occurring in one or more document(s) represent the same entity. Indications of synonyms or other associations can be provided as feedback information.

In some examples, app 612 can permit entity 614 to annotate or modify actionable item 620 or outputs of intermediate stages of processing. For example, document 618 can include the text "start is crashing." Actionable item 620, or the output of mapping module 632, can include the tagged words "start/Entity" and "crashing/State." App 612 can present these tagged words (or phrases) and receive modified tags or text, e.g., from entity 614. For example, entity 614 can, via a user interface provided by app 612, modify the text to read "start of an app is crashing," and modify the tag sentence to indicate "app/Entity startup-crashing/Condition." The modified text and tag sentence can be provided as feedback information.

In some examples, feedback information such as described in the preceding paragraphs can be provided, e.g., to knowledge-base modification module 642. Module 642 can adjust knowledge base 602 based at least in part on at least some of the feedback information. In an example in which knowledge base 602 includes at least one machine-learned computational model, e.g., a neural network, module 642 can add the feedback information to a training dataset or otherwise update the training dataset based at least in part on the feedback information. The inputs associated with the feedback information can include document 618 or other information used in determining the module output(s), e.g., output(s) of at least one of modules 626, 628, 630, 632, 634, or 638, or actionable item 620, with which the feedback information is associated.

Illustrative Processes

Figure 7:
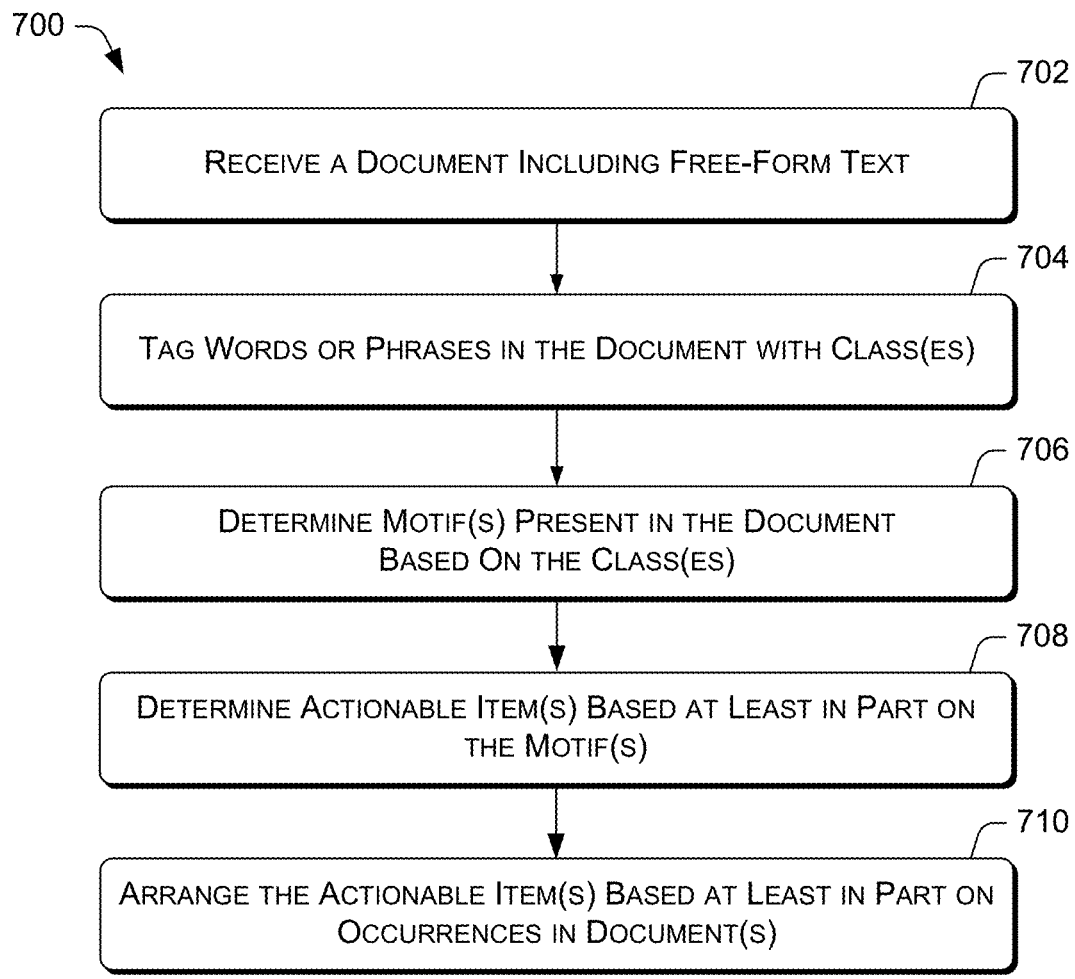
FIG. 7 is a flow diagram that illustrates an example process for determining motif(s) and corresponding actionable item(s) using a computing device.

FIG. 7 is a flow diagram that illustrates an example process 700 for determining actionable item(s) using a computing device, e.g., computing device 102 as described above with reference to FIG. 1, computing device 200 as described above with reference to FIG. 2, or computing device 610 as described above with reference to FIG. 6. Example functions shown in FIG. 7 and other flow diagrams and example processes herein can be implemented on or otherwise embodied in one or more computing devices, e.g., using software running on such devices. For the sake of illustration, the example process 700 is described below with reference to processing unit 218 and other components of computing device 200, as described above with reference to FIG. 2, and to ontologies, dataflows and operations discussed above with reference to FIGS. 4-6, that can carry out or participate in the steps of the example method. However, other processing units such as processing unit 116 and/or other components of computing devices 102 or 104 can carry out steps of described example processes such as process 700. Similarly, example methods shown in FIGS. 8-10 and 12 are also not limited to being carried out by any particularly-identified components.

The order in which the operations are described in each example flow diagram or process is not intended to be construed as a limitation, and any number of the described operations can be combined in any order and/or in parallel to implement each process. Moreover, the operations in each of FIGS. 7-10 and 12 can be implemented in hardware, software, and/or a combination thereof. In the context of software, the operations represent computer-executable instructions that, when executed by one or more processors, cause one or more processors to perform the recited operations. For example, modules and other components described below can be stored in a memory, e.g., computer-readable media 222, and executable by at least one processor, e.g., processing unit(s) 218, to perform the described functions. In the context of hardware, the operations represent logic functions implemented in circuitry, e.g., datapath-control and finite-state-machine sequencing functions.

At block 702, a phrase-extraction module 234 can receive a document including free-form text. In an example the free-form text can be associated with feedback from a user in a natural language. As described above, the documents can be received from a variety of sources, such as an online source, a customer support portal, an electronic message, a conversation with a customer or intelligent personal assistant, and so on. The document can generally include at least some free-form text provided by a user, e.g., text in a natural language. Further, the document can include a variety of information which may or may not be relevant to an actionable item. For example, the document can include a sentence regarding a problem that a user is having with a software element, a sentence regarding a feature of the software element for which the user has indicated an interest, e.g., a feature the user likes, a sentence that is unrelated to the software element, and so on. The phrase-extraction module 234, and the phrase-filtering module 236, can process the document as described above with reference to FIG. 6, to determine words or phrases in the document.

At block 704, the mapping module 238 can tag words or phrases in the document with individual classes of a set of classes. In some examples, a mapping module 238 can be configured to receive words or phrases from the document.

The mapping module 238 can map words or phrases to individual classes of a model. In at least one example, the model can be associated with an ontology, as described above with reference to FIGS. 4 and 5. The terms "mapping" and "tagging" are used interchangeably herein to describe techniques or processes for associating classes with words or phrases. A word or phrase can have one or multiple tags, i.e., can be associated with one or more classes of the model, as described above with reference to FIG. 6.

At block 706, the analysis module 240 can determine one or more motifs present in the document based on the class(es). As described above, a "motif" is a high-level category associated with a specific grammar pattern, e.g., from Table 2. A motif can be a suggestion, a question, etc. In some examples, the analysis module 240 can be configured to identify one or more motifs expressed in the document. As described above, the analysis module 240 can be configured to identify one or more motifs associated with the document based at least in part on the class(es) determined by the mapping module 238 and at least one grammar pattern, e.g., of a pattern set associated with the knowledge base 228. For example, the analysis module 240 can determine that the tagged words or phrases of the document match a stored grammar pattern for particular motif(s), e.g., a grammar pattern shown above in Table 2. In at least one example, a motif can correspond to a fundamental area, as described above with reference to FIG. 6. In some examples, the analysis module 634 can be configured to match certain grammar patterns to the tagged words or phrases to identify whether the tagged words or phrases are directed to subclasses of fundamental areas, as described above.

At block 708, the analysis module 240 can determine one or more actionable items based on the one or more motifs. As described above, an "actionable item" is a piece of text, e.g., provided by a user, that matches a grammar pattern. Actionable items can include, e.g., prompts, indications, flagged statements, or other data, e.g., text, which can require attention of a user (e.g., an administrator or other user). For example, all motifs, or only some motifs, may be considered actionable, as discussed herein with reference to analysis module 634. The analysis module 240 can provide the one or more actionable items or an indication thereof to, e.g., the recommendation module 242 or reporting module 248.

At block 710, the recommendation module 242 can arrange the one or more actionable items in an order based at least in part on occurrences of individual ones of the motifs for the plurality of documents, or based at least in part on other ranking criteria described herein. In some examples, the recommendation module 242 can be configured to analyze individual ones of the actionable items from analysis module 634 to generate one or more recommendations. The recommendation(s) can, e.g., relate to an update to the software or hardware. The recommendation module 242 can determine the actionable item(s), e.g., as the top-ranked one or more items in a ranked list of the actionable items. The recommendation module 242 can determine the actionable item(s), e.g., based on the number of times a particular actionable item has been determined, as described above.

In some examples, block 710 can include or be followed by a block (not shown) of outputting the arranged, e.g., ranked actionable items. This can be done, e.g., as discussed above with reference to the reporting module 248.

Figure 8:
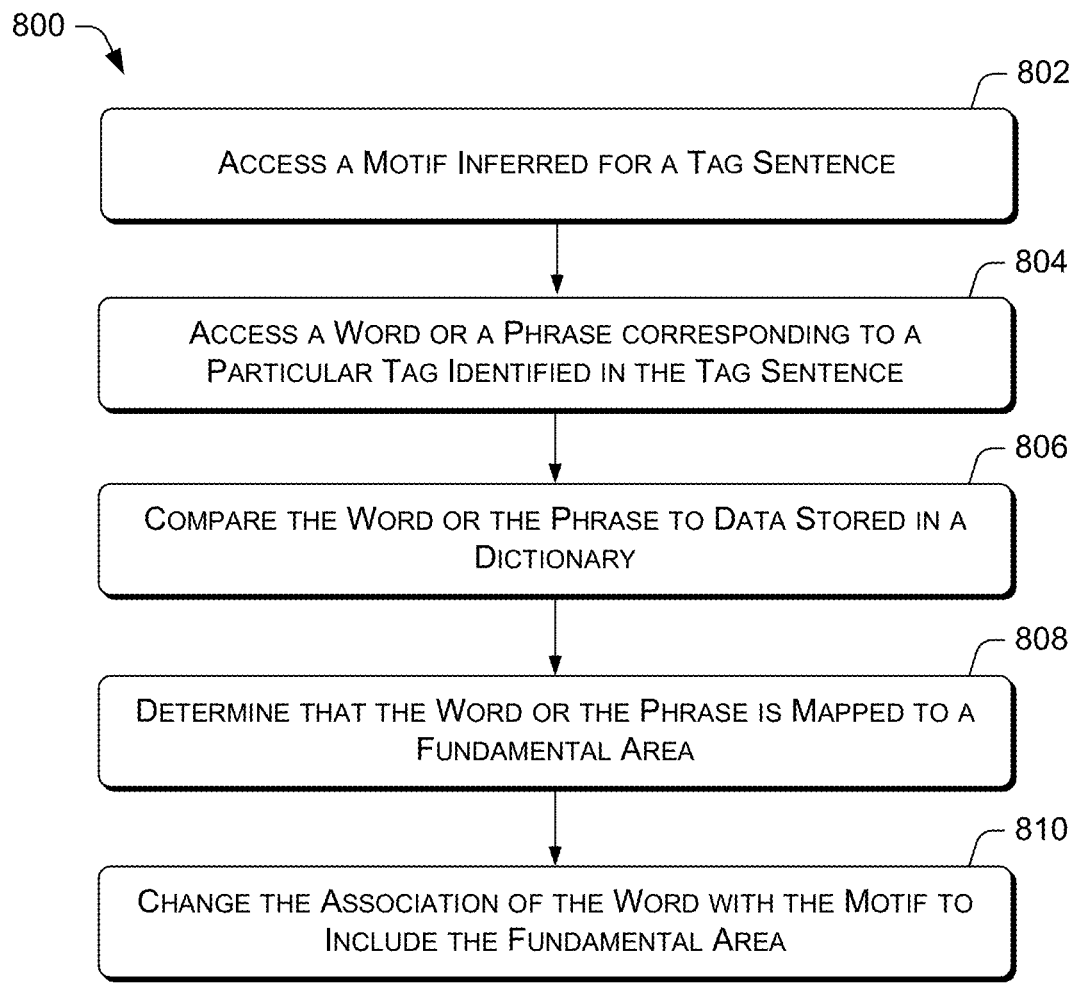
FIG. 8 is a flow diagram that illustrates an example process for determining whether motif(s) are associated with fundamental area(s).

FIG. 8 is a flow diagram that illustrates an example process 800 for determining whether motifs are associated with fundamental areas. As described above, in at least one example, the analysis module 240 can be configured to perform post-processing to determine whether a tag sentence is associated with one or more fundamental areas, such as reliability, security, usability, etc. In some examples, process 800 can begin with at least one of block 802, block 804, or block 806.

At block 802, the analysis module 240 can access a motif inferred for a tag sentence. As described above, a motif can be a suggestion, a question, etc. In at least one example, the analysis module 240 can be configured to identify a motif associated with the tag sentence based at least in part on the class(es) determined by the mapping module 238 and at least one grammar pattern, e.g., of a pattern set associated with the knowledge base 228. For example, the analysis module 240 can determine that the tagged words or phrases of the respective document match a stored grammar patterns for a motif.

At block 804, the analysis module 240 can access a word or a phrase corresponding to a particular tag identified in the tag sentence. As described above, the mapping module 238 can map individual words or phrases to individual classes of a model, e.g., an ontology 400 or 604. The individual classes are described above with reference to FIGS. 4 and 5. In some examples, the mapping module 238 can be configured to determine, for individual sentence(s) or other delimited subsets of the free-form user text, whether an entity (a text segment of entity class 410) is present in that sentence or other subset. In additional or alternative examples, the mapping module 238 can be configured to determine, for individual sentence(s) or other delimited subsets of the free-form user text, whether a qualifier (a text segment of qualifier class 424) is present in that sentence or other subset. The analysis module 240 can access the output from the mapping model 238, and accordingly can access a word or a phrase corresponding to a particular tag, e.g., entity, qualifier, etc., identified in the tag sentence.

At block 806, the analysis module 240 can compare the word or the phrase to data stored in a dictionary associated with a knowledge base 228. In at least one example, classes or subclasses of the model, e.g., an ontology 400 or 604, can respectively correspond to entries in the dictionary. For instance, an entry in the dictionary can correspond to the fundamental area of security and another entry in the dictionary can correspond to the fundamental area of performance. Each entry can have one or more words or phrases mapped to the entry. The one or more words or phrases can also be mapped to other classes of the ontology, e.g., entity class 410, qualifier class 424, etc. As an example, the words "password" or "log-in homepage," which are entities, can be mapped to an entry corresponding to the fundamental area of security (and also to an entry corresponding to the entity class 410). Additionally and/or alternatively, various qualifiers, e.g., "slow," "fast," etc., can be mapped to an entry corresponding to the fundamental area of performance (and also to an entry corresponding to the qualifier class 424). In some examples, words or phrases can be mapped to entries corresponding to subclasses associated with the fundamental areas. For instance, example qualifiers such as "slow," "lagging," "creep," "crawl," etc., can be mapped to an entry corresponding to a negative subclass of the fundamental area of performance (and also to an entry corresponding to the qualifier class 424). In at least one example, the analysis module 240 can compare the word or the phrase to the entries stored in the dictionary.

At block 808, the analysis module 240 can determine that the word or the phrase is mapped to a fundamental area. That is, based at least in part on comparing the word or the phrase to the entries stored in the dictionary, the analysis module 240 can determine that the word or the phrase is mapped to an entry in the dictionary corresponding to a fundamental area. In some examples, based at least in part on comparing the word or the phrase to the entries stored in the dictionary, the analysis module 240 can determine that the word or the phrase is mapped to an entry in the dictionary corresponding to a subclass of a fundamental area.

At block 810, the analysis module 240 can change the association of the word with the motif to include the fundamental area. Based at least in part on determining that the word or the phrase is mapped to an entry in the dictionary corresponding to a fundamental area, or a subclass of a fundamental area, the analysis module 240 can change the association of the word with the motif to include the fundamental area, or the subclass of the fundamental area. For instance, if the analysis module 240 determines that a tag sentence corresponds to a problem motif, and the entity identified in the tag sentence is mapped to a fundamental area associated with security, the analysis module 240 can change the association of the word with the motif to include the fundamental area, e.g., security problem motif. As a non-limiting example, if the word "password" is tagged as an entity in a tag sentence associated with a problem motif, and the analysis module 240 determines that the word "password" is mapped to the fundamental area of security, the analysis module 240 can determine that the tag sentence is associated with a security-problem motif. Additionally and/or alternatively, if the analysis module 240 determines that a tag sentence corresponds to a problem motif, and a qualifier identified in the tag sentence is mapped to a fundamental area associated with performance, the analysis module 240 can change the association of the word with the motif to include the fundamental area, e.g., performance problem motif. As a non-limiting example, if the word "slow" is tagged as a qualifier in a tag sentence associated with a problem motif, and the analysis module 240 determines that the word "slow" is mapped to the fundamental area of performance, the analysis module 240 can determine that the tag sentence is associated with a performance problem motif.

Figure 9:
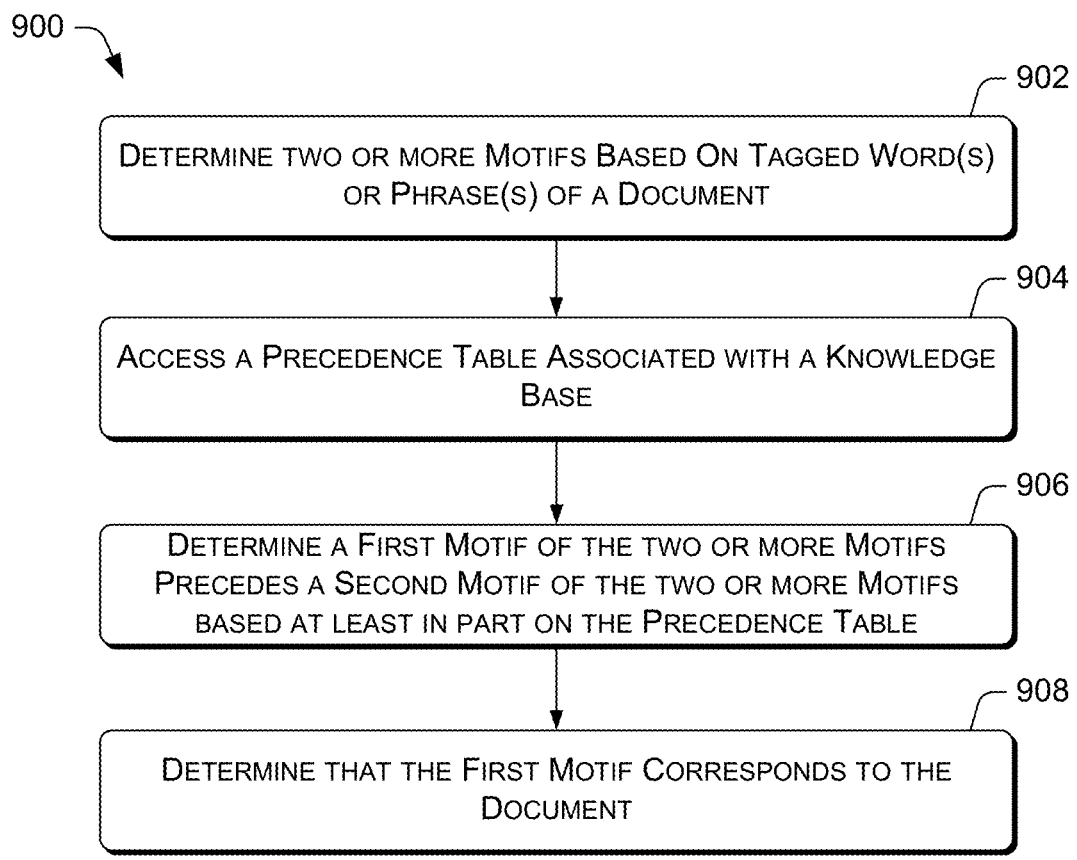
FIG. 9 is a flow diagram that illustrates an example process for prioritizing two or more motifs that are inferred from documents.

FIG. 9 is a flow diagram that illustrates an example process 900 for prioritizing two or more motifs that are inferred from documents.

In block 902, the analysis module 240 can infer two or more motifs based on tagged word(s) or phrase(s) of a document. In some examples, the analysis module 240 can be configured to identify two or more motifs expressed in the document based at least in part on the collection of class(es) determined by the mapping module 238 and grammar patterns, e.g., of a pattern set associated with the knowledge base 228. For example, the analysis module 240 can determine that the tagged words or phrases of the respective document match stored grammar patterns for two or more particular motif(s). In some examples, processing the document based on the pattern set can result in two or more motifs corresponding to the document.

In block 904, the analysis module 240 can access a precedence table associated with a knowledge base 228, e.g., precedence table 636 associated with the pattern set(s) 608. The precedence table can be a predefined set of rules that determine which motif of multiple motifs to prioritize. In an example, the precedence table can be defined by a domain expert, administrator, or another individual. In another example, the precedence table can be learned by a neural network or other machine learning mechanism, e.g., as discussed herein with reference to the analysis module 634.

In block 906, the analysis module 240 can determine that a first motif of the two or more motifs precedes a second motif of the two or more motifs based at least in part on the precedence table. The precedence table can specify a first motif that supersedes a second motif. In some examples, the precedence table can specify that the second motif supersedes a third motif and so on. In at least one example, the precedence table can include code, which can be read from left to right to determine priority. For instance, a motif on the left can be prioritized over a neighboring motif to the right and so on. In at least one example, the precedence table can prioritize specific motifs over generic motifs. In an alternative example, the precedence table can prioritize generic motifs over specific motifs. Or, in yet another example, the precedence table can indicate that neither a generic motif nor a specific motif is prioritized over the other and that either one can be selected. Based at least in part on the set of rules defined in the precedence table, the analysis module 240 can determine that a first motif of the two or more motifs precedes a second motif of the two or more motifs.

In block 908, the analysis module 240 can determine that the first motif corresponds to the document. In at least one example, the analysis module 240 can output the first motif as the motif corresponding to the document. As described herein, one or more actionable items can be determined based at least in part on the motif identified.

Figure 10:
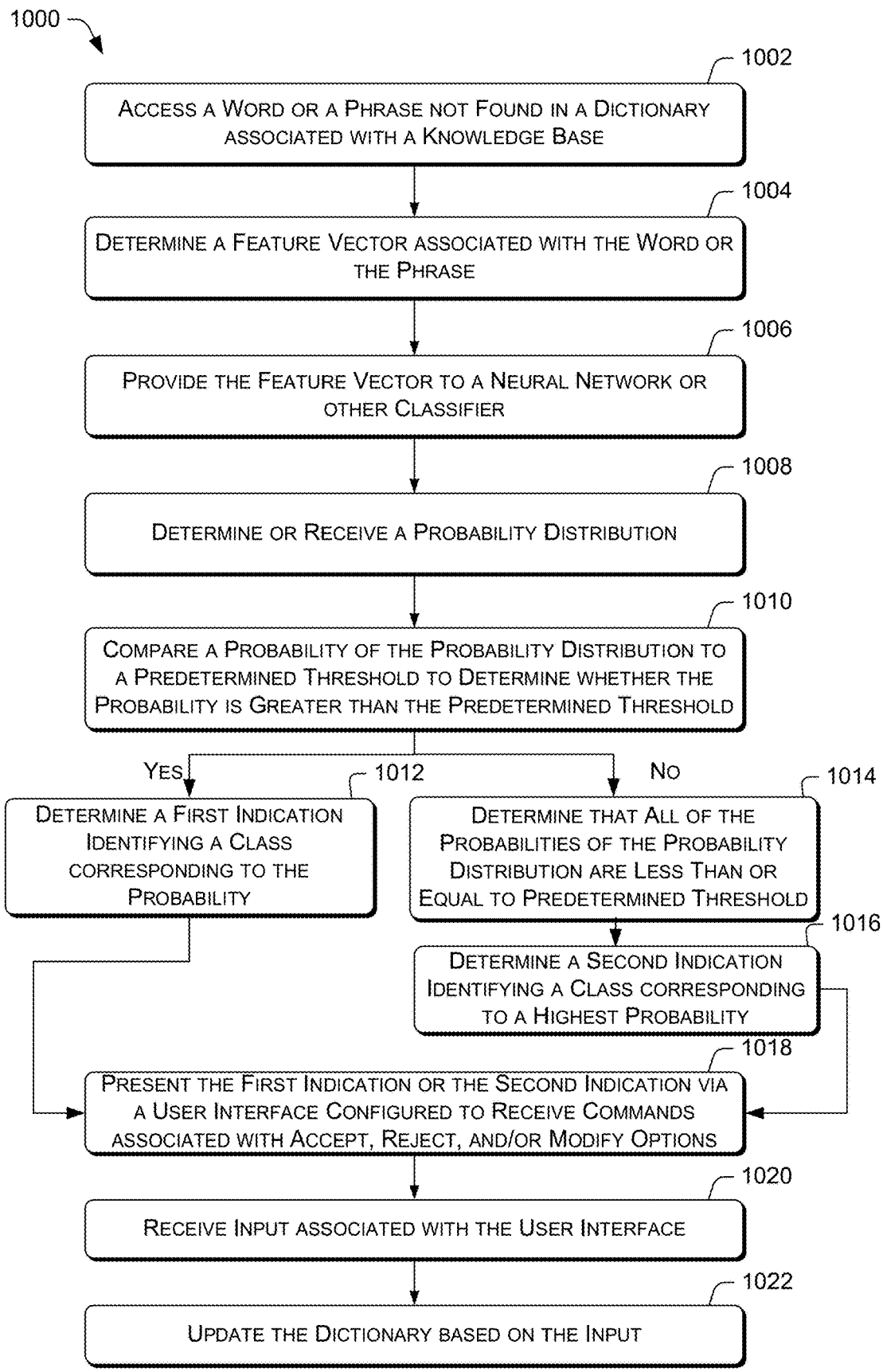
FIG. 10 is a flow diagram that illustrates an example process for updating a dictionary.

FIG. 10 is a flow diagram that illustrates an example process 1000 for updating a dictionary. As described above, in some examples, the classification module 246 is configured to classify a particular text segment that is not associated with a stored dictionary of a knowledge base 228 so that the particular text segment can be added to the stored dictionary.

At block 1002, the classification module 246 can access a word or a phrase that is not found in a dictionary associated with a knowledge base 228. For example, the classification module 246 can take as input words or phrases from the phrase-filtering module 628 that are not found in the dictionary.

At block 1004, the classification module 246 can generate a feature vector associated with the word or the phrase. In some examples, the classification module 246 is configured to determine one or more respective attribute(s) of the word or the phrase. Some examples of attributes include, but are not limited to part(s) of speech of word(s) or of word(s) in phrase(s), identification of which of the Justeson-Katz patterns a phrase matches, spatial relationships between words in a phrase, context(s) in which a phrase can occur (e.g., before or after a verb), stems of word(s), e.g., in a phrase (e.g., "run" for "running"), synonyms of word(s), e.g., in a phrase, order of selected words in a phrase, e.g., words considered to be important based on, e.g., RIDF or MI scores, and distances between ones of the selected words. The determined attribute(s) of the word or the phrase can be arranged, e.g., as a "feature vector" expressing values of the attribute(s) in a predetermined order.

At block 1006, the classification module 246 can provide the feature vector to a neural network or other classifier. As described above, a neural network or other classifier (e.g., multiple class one-vs.-all classifier, random forest classifier, etc.) can be trained based on the respective attribute(s) for individual one(s) of the words or phrases stored in the dictionary and the classes to which those words or phrases map. In at least one example, the feature vector can be provided to the neural network or other classifier.

At block 1008, the classification module 246 can determine or receive a set of probabilities output by the neural network or other classifier. The set of probabilities can include at least one probability, e.g., a plurality of probabilities that respectively correspond to individual classes of a plurality of classes associated with a model, e.g., ontology 400. That is, a probability can represent a likelihood that the word or the phrase corresponds to a class associated with the model. In some examples, the neural network or other classifier can output a confidence value in addition to a probability. As described above, in alternate examples, any set of values and/or set of multi-dimensional information criteria, can be used to represent a likelihood that the word or the phrase corresponds to a class associated with the model.

At block 1010, the classification module 246 can compare a probability of the set of probabilities to a predetermined threshold to determine whether the probability is greater than the first predetermined threshold. Based at least in part on determining that the probability is greater than the predetermined threshold, the classification module 246 can determine a first indication, which can be transmitted or presented, e.g., to a domain expert, an administrator, or another individual, as shown at block 1012. The first indication can identify a class corresponding to the probability that is greater than the predetermined threshold. That is, the indication can suggest that the word or the phrase belongs to the class. In some examples, if more than one probability is greater than the predetermined threshold, the classification module 246 can select a class associated with a highest probability or a predetermined number of classes associated with the highest probabilities to transmit or present via an indication of the word or the phrase.

Based at least in part on determining that the probability is not greater than the predetermined threshold, the classification module 246 can determine whether any of the probabilities associated with the set of probabilities are greater than the predetermined threshold. Based at least in part on determining that each of the probabilities are less than or equal to the predetermined threshold, as shown at block 1014, the classification module 246 can determine a second indication, which can be transmitted or presented, e.g., to a domain expert, an administrator, or another individual, as shown at block 1016. The second indication can identify a class associated with the model that the classifier determines to have a highest probability, and the indication can include a confidence value indicating that the class is associated with low confidence.

As described above, in alternate examples, any set of values and/or set of multi-dimensional information criteria, can be used to represent a likelihood that the word or the phrase corresponds to a class associated with the model. In such examples, the classification module 246 can compare a value and/or a multi-dimensional information criteria to a predetermined threshold to determine whether the value and/or the multi-dimensional information criteria is greater than the first predetermined threshold. The classification module 246 can proceed as set forth above based on determining whether the value and/or the multi-dimensional information criteria is greater than the first predetermined threshold.

At block 1018, the classification module 246 can present the first indication or the second indication via a user interface configured to receive commands associated with accept, reject, and/or modify options. Examples are discussed herein, e.g., with reference to FIG. 11. In at least one example, the classification module 246 can cause the user interface to be presented, e.g., to a domain expert, an administrator, or another individual. In some examples, the user interface can present one or more classes associated with the model that the classifier determined correspond to the word or the phrase, e.g., one or more classes having probabilities above the predetermined threshold, or a class having a highest probability when no other class has a probability above the predetermined threshold, one or more classes having values and/or multi-dimensional information criteria above the predetermined threshold, or a class having a highest value and/or a highest multi-dimensional information criteria, above the predetermined threshold, when no other class has a value and/or a multi-dimensional information criteria above the predetermined threshold.

The user interface can enable the domain expert, the administrator, or the other individual to cause the computing device to take one or more actions with respect to the indication(s). In at least one example, the user interface can enable the domain expert, the administrator, or the other individual to accept, reject, and/or modify information associated with an indication. For instance, an indication can identify a class to which the word or the phrase belongs, and the user interface can enable the domain expert, the administrator, or the other individual to accept the class, e.g., provide input corresponding to an acceptance that the word or the phrase is associated with the class; reject the class, e.g., provide input corresponding to a rejection that the word or the phrase is not associated with the class; or modify the class, e.g., provide input corresponding to a modification of the class to another class. A non-limiting example of a user interface that can present an indication and provide functionality for a user to provide input the domain expert, the administrator, or the other individual to accept the class, reject the class, or modify the class, is illustrated below with reference to FIG. 11.

At block 1020, the classification module 246 can receive input, e.g., a command, associated with the user interface. In at least one example, a domain expert, an administrator, or another individual can interact with the user interface to accept, reject, or modify information associated with an indication. For instance, the domain expert, the administrator, or the other individual can accept a class identified to be associated with the word or the phrase, reject a class identified to be associated with the word or the phrase, or modify a class identified to be associated with the word or the phrase. In some examples, the domain expert, the administrator, or the other individual can interact with a control, hyperlink, or other mechanism presented via the user interface to accept, reject, or modify a class presented via the user interface. In other examples, the domain expert, the administrator, or the other individual can provide speech input, haptic input, or another type of input to accept, reject, or modify a class presented via the user interface.

At block 1022, the classification module 246 can update the dictionary based on the input. Additional details associated with updating the dictionary are described with reference to FIG. 12, below.

Figure 11:
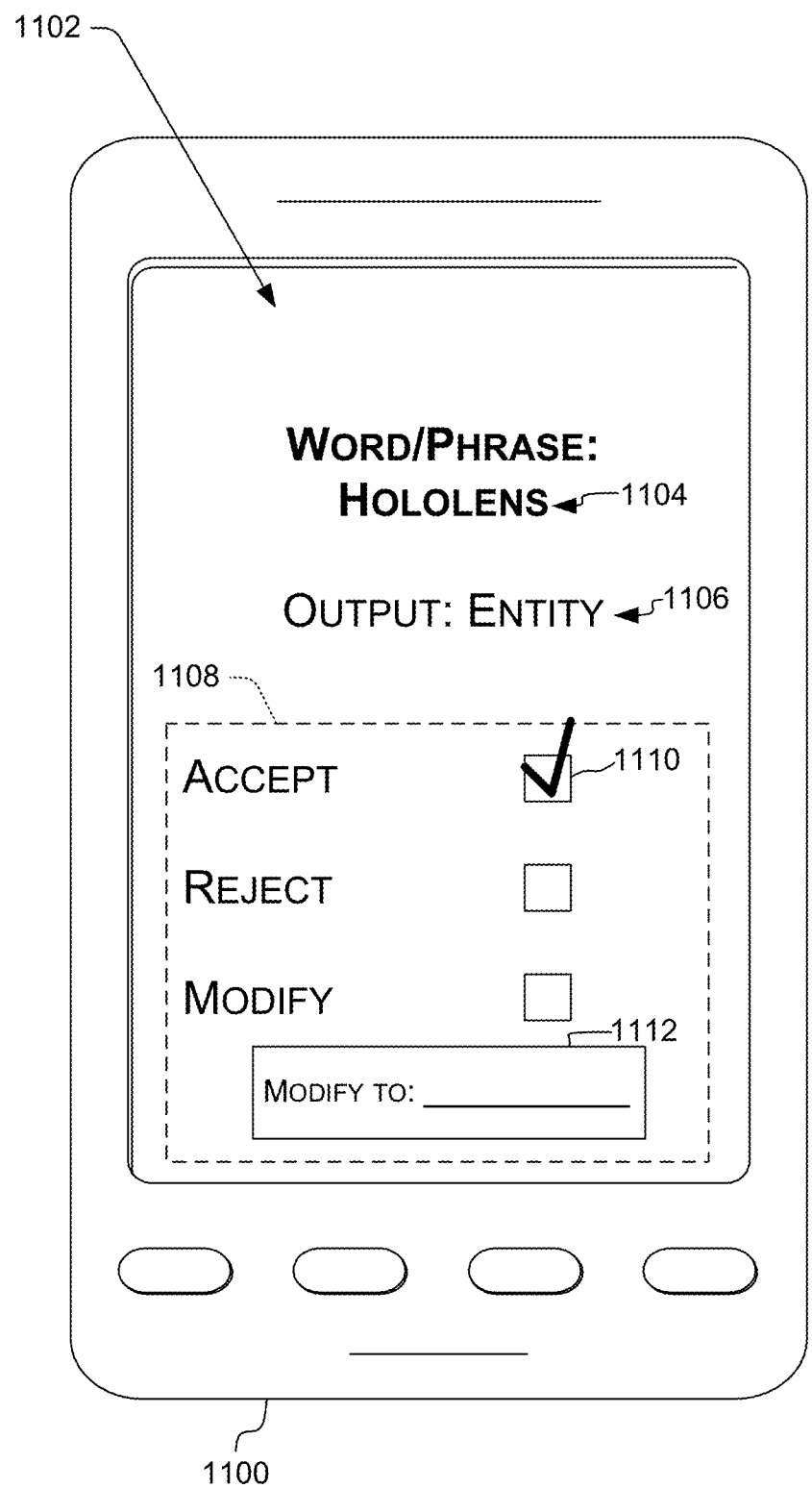
FIG. 11 is a graphical representation of an example computing device displaying an example user interface that can be presented to a user as described herein.

FIG. 11 is a graphical representation of an example computing device 1100 displaying an example user interface 1102 that can be presented to a user as described herein. User interface 1102 can correspond to user interface 132, described above with reference to FIG. 1. As shown, an indication can be presented via the user interface 1102. The indication can identify a word or a phrase 1104 that is the subject of the classification. As shown, the word "Hololens" is the subject of the classification. The indication can also include an output 1106 of the classification. As shown the output 1106 is "entity." That is, based at least in part on determining a set of features associated with the word "Hololens," and providing the set of features to a neural network or other classifier, e.g., as described above with reference to FIG. 10, the classification module 246 may determine that the word "Hololens" likely corresponds to an entity, e.g., entity class 410.

As described above with reference to block 1018, the user interface 1102 can be configured to receive commands, e.g., from a user. The user interface can provide one or more option controls 1108 to receive the commands. The option controls 1108 can be operated by, e.g., a domain expert, an administrator, or another individual, e.g., a user of the user interface 1102. The option controls 1108 can include option controls to accept the output, e.g., receive input corresponding to an acceptance indicating that the word or the phrase is associated with the class; to reject the output, e.g., receive input corresponding to a rejection indicating that the word or the phrase is not associated with the class; or to modify the output, e.g., receive input corresponding to a modification of the association between the word or phrase 1104 and the output of the classification. It should be noted that the options of "accept," "reject," and "modify" are non-limiting examples of options that can be selected using option controls presented via the user interface. For instance, in an alternative example, the options can include "add," "do not add," and "edit." Various other options or corresponding option controls can be available and presented to, e.g., a domain expert, an administrator, or another user.

In at least one example, the domain expert, the administrator, or the other individual can interact with the user interface 1102 to provide a command to accept, reject, or modify information associated with the indication of the word or phrase 1104 or the output 1106. In some examples, the domain expert, the administrator, or the other individual can interact with a control, hyperlink, or other mechanism presented via the user interface 1102 to accept, reject, or modify an output presented via the user interface 1102. For instance, the domain expert, the administrator, or the other individual can interact with the control 1110 corresponding to the accept option to provide a command to accept the output presented via the user interface 1102. In other examples, the domain expert, the administrator, or the other individual can provide speech input, haptic input, or another type of input (e.g., as discussed herein with reference to user interface 132 or user-operable input device 212) to accept, reject, or modify a class presented via the user interface 100.

In some examples, the domain expert, the administrator, or the other individual can interact with a control, hyperlink, or other mechanism corresponding to a modify option, to modify the output 1106. In at least one example, the user interface 1102 can include a free-form text input field 1112 for the domain expert, the administrator, or the other individual to input a new class, as illustrated in FIG. 11. In some examples, the word or phrase 1104 can be associated with the new class instead of with the output 1106. In other examples, based at least in part on the domain expert, the administrator, or the other individual interacting with the user interface 1102 such to indicate that he or she desires to modify the output, a pop-up, overlay, etc. can be presented to the domain expert, the administrator, or the other individual to input a new class.

User interface 1102 is one example of a user interface that facilitates presenting an indication to a domain agent, an administrator, or another individual, and any other presentation or configurations can be used. In the illustrated example, user interface 1102 is presented by computing device 1100, which can represent computing device 104 or 200; however, this is not limiting.

FIG. 12 is a flow diagram that illustrates an example process 1200 for updating a dictionary.

At block 1202, the classification module 246 can present, via a user interface, an indication associated with a word or a phrase that is not found in a dictionary associated with a knowledge base, the indication suggesting at least one class associated with a model to which the word or the phrase belongs. In at least one example, the indication can present results of classification, described above with reference to FIG. 10. Additionally, the user interface can present options for a domain expert, an administrator, or another individual to indicate whether he or she desires to add the word or the phrase to the dictionary, and which class the word or the phrase should be associated with.

At block 1204, the classification module 246 can determine an input, e.g., a command, associated with the user interface. In at least one example, a domain expert, an administrator, or another individual can interact with the user interface to accept, reject, or modify information associated with an indication. For instance, the domain expert, the administrator, or the other individual can accept a class identified to be associated with the word or the phrase, reject a class identified to be associated with the word or the phrase, or modify a class identified to be associated with the word or the phrase. In some examples, the domain expert, the administrator, or the other individual can interact with a control, hyperlink, or other mechanism presented via the user interface to accept, reject, or modify a class presented via the user interface. In other examples, the domain expert, the administrator, or the other individual can provide speech input, haptic input, or another type of input to accept, reject, or modify a class presented via the user interface.

At block 1206, the classification module 246 can determine, based at least in part on the input, an option selected. If a domain expert, an administrator, or another individual accepts the class, the word or the phrase can be mapped to an entry in the dictionary corresponding to the class, as shown at block 1208. If the domain expert, the administrator, or the other individual rejects the class, the word or the phrase may not be added to the dictionary, as shown in block 1210. That is, in such an example, the word or the phrase may not be mapped to any entry in the dictionary.

If the domain expert, the administrator, or the other individual modifies the class, the domain expert, the administrator, or the other individual can identify a new class to which the word or the phrase belongs. The new class can be a class newly added to the ontology for the word or the phrase, or can be an existing class in the ontology. In such an example, the classification module 246 can validate the modification made by the domain expert, the administrator, or the other individual and can update the ontology and/or the dictionary by mapping the word or the phrase to an entry in the dictionary corresponding to the new class, as shown in block 1212. That is, in an example, an input corresponding to a modification can change the mapping between a the word or the phrase and a class identified by the classifier to a different class, e.g., specified by the domain expert, the administrator, or the other individual.

As described above, in some examples, an indication can include two or more classes. The domain expert, the administrator, or the other individual can take actions with respect to individual classes or all of the classes at a same time. That is, the domain expert, the administrator, or the other individual can interact with the user interface via a single interaction to accept, reject, or modify all of the classes presented with the indication associated with the particular text segment. For instance, the domain expert, the administrator, or the other individual can accept all of the classes presented via the user interface or reject all of the classes presented via the user interface with a single interaction. Or, the domain expert, the administrator, or the other individual can interact with the user interface via multiple interactions to accept, reject, or modify individual of the classes presented with the indication associated with the particular text segment. For instance, in an example, the domain expert, the administrator, or the other individual can accept a first class of the two or more classes presented via the user interface and reject a second class and a third class of the two or more classes presented via the user interface via multiple interactions with the user interface.

As described above, in additional and/or alternative examples, the classification module 246 can automatically map the word or the phrase to a class in the dictionary that corresponds to the class that was identified by the classifier. In such examples, the classification module 246 can determine that the probability, value, and/or multi-dimensional information criteria associated with the class is above a predetermined threshold and can automatically map the word or the phrase to the class in the dictionary, without any further input from the domain expert. In at least one example, the predetermined threshold for automatically mapping the word or the phrase to the class in the dictionary can be greater than the predetermined threshold for presenting the class to a domain expert, an administrator, or another individual via the user interface.

Based at least in part on the word or the phrase being mapped to an entry corresponding to the at least one class or the new class, the classification module 246 can use the word or the phrase, and the at least one class or new class, for re-training the neural network or other classifier described above. Additionally, based at least in part on the word or the phrase being mapped to an entry corresponding to the at least one class or the new class, the mapping module 238 can map the at least one class or the new class, to the word or the phrase—or a word or a phrase substantially similar to the word or the phrase—in a new document received by the inference engine 202. For the purpose of this discussion, a first text segment (e.g., a word or a phrase) can be substantially similar to a second text segment if a feature vector associated with the first text segment is within a threshold of a feature vector associated with the second text segment. Based at least in part on receiving a new document including a word or a phrase that is substantially similar to the word or the phrase classified by the classification module 246, the inference engine 202 may execute the process described above with reference to FIG. 7 to determine motif(s), and corresponding actionable item(s), associated with the new document. In such an example, the mapping of the word or the phrase to the at least one class or new class, may enable the mapping module 238 to map the word or the phrase that is substantially similar to the word or the phrase classified by the classification module 246, to the at least one class or the new class, and such mapping can be used to infer a motif, and corresponding actionable item, associated with the new document.

Example Clauses

A: A system comprising: at least one processor; memory communicatively coupled to the at least one processor; and one or more modules stored in the memory and executable by the at least one processor to: determine a first set of values associated with the first text segment, the first set of values including a plurality of first values respectively corresponding to individual classes of a plurality of classes of an ontology; determine that a first value of the plurality of first values is greater than a first predetermined threshold, the first value corresponding to a first class of the plurality of classes; and present, via a user interface, a first indication identifying the first class, the user interface configured to receive at least one of: a first command to cause the first text segment to be mapped to a first entry in a dictionary corresponding to the first class; or a second command to cause the first text segment to be mapped to a second entry in the dictionary corresponding to a second class of the plurality of classes instead of the first entry.

B: The system as paragraph A recites, wherein the one or more modules stored in the memory are further executable by the at least one processor to: determine a feature vector associated with the first text segment, wherein the feature vector comprises at least one of a parts-of-speech tag for the first text segment, stemmed output associated with the first text segment in view of other stemmed output, or a co-occurrence relationship between the first text segment and second text segments used in a similar context as the first text segment; and determine the first set of values based on the feature vector.

C: A system as paragraph A or B recites, wherein the plurality of classes of the ontology comprise at least one of a suggestion-indicator class for text segment(s) that represent the presence of a suggestion, a modal-indicator class for text segment(s) that represent the presence of a suggestion, an entity class for text segment(s) that represents an entity, an action class for text segment(s) that represents a behavior that is taken on an entity, a certainty class for text segment(s) that represents the confidence of the user regarding an entity or condition represented in the text segment(s), an emotion class for text segment(s) that represents feelings or beliefs of the user writing the text segment(s), a negation class for text segment(s) that change the meaning of other text segment(s) to a substantially opposite meaning, or a qualifier class for text segment(s) that represents descriptive terms used to describe an action or a condition.

D: A system as any of paragraphs A-C recites, wherein the one or more modules are further executable by the at least one processor to: receive, via the user interface, the first command; and map the first text segment to the first entry corresponding to the first class in the dictionary.

E: A system as any of paragraphs A-D recites, wherein the one or more modules are further executable by the at least one processor to: receive, via the user interface, the second command and an identification of the second class; and map the first text segment to the second entry corresponding to the second class.

F: A system as any of paragraphs A-E recites, wherein the user interface is further configured to receive a third command to prevent the first text segment from being added to the dictionary and the module is executable by the at least one processor further to: receive, via the user interface, the third command; and refrain from adding the first text segment to the dictionary.

G: A system as any of paragraphs A-F recites, wherein the one or more modules are further executable by the at least one processor to: determine a second set of values associated with a second text segment, the second set of values including a plurality of second values respectively corresponding to individual classes of the plurality of classes; determine that each second value of the plurality of second values is less than or equal to the first predetermined threshold; determine a highest second value of the plurality of second values; and present, via the user interface, a second indication identifying a third class of the plurality of classes, the third class corresponding to the highest second value and the user interface configured to receive at least one of: a third command to cause the second text segment to be mapped to a third entry in the dictionary corresponding to the third class; a fourth command to cause the second text segment to be mapped to a fourth entry in the dictionary corresponding to a fourth class of the plurality of classes instead of the third entry; or a fifth command to prevent the second text segment from being added to the dictionary.

H: A system as any of paragraphs A-G recites, wherein the one or more modules are further executable by the at least one processor to: determine a second set of values associated with a second text segment, the second set of values including a plurality of second values respectively corresponding to individual classes of the plurality of classes; determine that a second value of the plurality of second values is greater than a second predetermined threshold, the second value corresponding to a third class of the plurality of classes; and automatically map the second text segment to a third entry of the plurality of entries, the third entry corresponding to the third class.

I: A system as paragraph H recites, wherein the second predetermined threshold is associated with a greater value than the first predetermined threshold.

J: A system as any of paragraphs A-I recites, wherein the one or more modules are further executable by the at least one processor to: determine a second set of probabilities associated with a second text segment, the second set of probabilities including a plurality of second probabilities respectively corresponding to individual classes of the plurality of classes; determine that a second probability of the plurality of second probabilities is less than a second predetermined threshold, the second probability corresponding to a third class of the plurality of classes; and automatically refrain from mapping the second text segment to a third entry corresponding to the third class in the dictionary.

K. A system as any of paragraphs A-J recites, wherein the one or more modules are further executable by the at least one processor to: based at least in part on receiving input associated with the second command, determine that the second class corresponds to a new class; and update a precedence table to provide an updated precedence table, the updated precedence table identifying at least one motif associated with the second class that is preceded by or succeeded by another motif associated with the second class.

L. A system as any of paragraphs A-K recites, wherein the one or more modules are further executable by the at least one processor to: based at least in part on receiving input associated with the second command, receive an indication that the second class is associated with a positive sub-class, a negative sub-class, or a neutral sub-class; and map the first text segment to the second class and the positive sub-class, the negative sub-class, or the neutral sub-class.

M: A system as any of paragraphs A-L recites, wherein the one or more modules are further executable by the at least one processor to: receive, from a computing device operated by a user, a new text segment; determine, based at least in part on the dictionary, that the new text segment is associated with the second class; and infer an actionable item associated with the new text segment based at least in part on the second class and at least one grammar pattern.

N: A computer-implemented method comprising: receiving, from a computing device operated by a user, a document associated with a text segment; accessing a predetermined knowledge base including: a dictionary associated with an ontology comprising a plurality of classes; and a precedence table, the precedence table establishing a priority between motifs; determining, based at least in part on the dictionary, that the text segment is associated with a first motif and a second motif, the first motif defining a first relationship between individual classes of the plurality of classes and the second motif defining a second relationship between individual classes of the plurality of classes; determining, based at least in part on the precedence table, that the first motif precedes the second motif; and inferring an actionable item associated with the text segment based at least in part on the first motif.

O: A computer-implemented method as paragraph N recites, further comprising: determining, based at least in part on the dictionary, that the text segment is associated with a third motif defining a third relationship between individual classes of the plurality of classes; and determining, based at least in part on the precedence table, that the first motif precedes the third motif and that the third motif precedes the second motif.

P: A computer-implemented method as paragraph N or OP recites, further comprising: determining, based at least in part on the dictionary, that the text segment is associated with a third motif defining a third relationship between individual classes of the plurality of classes; and determining, based at least in part on the precedence table, that the second motif precedes the third motif.

Q: A computer-implemented method as any of paragraphs N-P recites, further comprising, prior to receiving the document associated with the text segment, generating the precedence table based at least in part on: associating individual motifs with values representative of importance; and determining prioritizations between the individual motifs based at least in part on the values.

R: One or more computer-readable media encoded with instructions that, when executed by a processor, configure a computer to perform a method as any of paragraphs N-Q recites.

S: A device comprising one or more processors and one or more computer readable media encoded with instructions that, when executed by the one or more processors, configure a computer to perform a computer-implemented method as recited in any one of paragraphs N-Q.

T: A computer-implemented method comprising: means for receiving, from a computing device operated by a user, a document associated with a text segment; means for accessing a predetermined knowledge base including: a dictionary associated with an ontology comprising a plurality of classes; and a precedence table, the precedence table establishing a priority between motifs; means for determining, based at least in part on the dictionary, that the text segment is associated with a first motif and a second motif, the first motif defining a first relationship between individual classes of the plurality of classes and the second motif defining a second relationship between individual classes of the plurality of classes; means for determining, based at least in part on the precedence table, that the first motif precedes the second motif; and means for inferring an actionable item associated with the text segment based at least in part on the first motif.

U: A computer-implemented method as paragraph T recites, further comprising: means for determining, based at least in part on the dictionary, that the text segment is associated with a third motif defining a third relationship between individual classes of the plurality of classes; and means for determining, based at least in part on the precedence table, that the first motif precedes the third motif and that the third motif precedes the second motif.

V: A computer-implemented method as paragraph T or U recites, further comprising: means for determining, based at least in part on the dictionary, that the text segment is associated with a third motif defining a third relationship between individual classes of the plurality of classes; and means for determining, based at least in part on the precedence table, that the second motif precedes the third motif.

W: A computer-implemented method as any of paragraphs T-V recites, further comprising, means for, prior to receiving the document associated with the text segment, generating the precedence table based at least in part on: associating individual motifs with values representative of importance; and means for determining prioritizations between the individual motifs based at least in part on the values.

X: One or more computer readable media storing computer-executable instructions that, when executed by the at least one processor, cause the at least one processor to perform acts comprising: receiving, from a computing device operated by a user, a document associated with a text segment; accessing a predetermined knowledge base including a dictionary associated with an ontology comprising a plurality of classes, a class of the plurality of classes being associated with a positive sub-class, a negative sub-class, and a neutral-subclass; determining, based at least in part on the ontology, that the text segment is associated with the positive sub-class, the negative sub-class, or the neutral-subclass; and inferring an actionable item associated with the text segment based at least in part on the positive sub-class, the negative sub-class, or the neutral-subclass and at least one grammar pattern.

Y: One or more computer readable media as paragraph X recites, the acts further comprising updating the dictionary based at least in part on: receiving a new text segment; determining a first set of values associated with the new text segment, the first set of values including a plurality of first values respectively corresponding to individual classes of the plurality of classes; determining that a first value of the plurality of first values is greater than a first predetermined threshold, the first value corresponding to a particular class of the plurality of classes; presenting, via a user interface, a first indication identifying the particular class, the user interface configured to receive at least one of: a first command to cause the first text segment to be mapped to a first entry in the dictionary corresponding to the particular class; or a second command to cause the first text segment to be mapped to a second entry in the dictionary corresponding to a different class of the plurality of classes instead of the first entry; and receiving input corresponding to the first command or the second command.

CONCLUSION

Motif-inference techniques described herein can reduce the amount of time required to filter documents for user suggestions and can permit users to provide feedback in natural language, which is faster and easier for the users than completing structured feedback forms. Various examples permit inferring trends across multiple documents. The motifs and trends can be output via various interfaces, e.g., visualizations, programming interfaces, etc. The outputs can be used to enhance the ability of engineers or managers to readily solve user problems. Newly-identified phrases in new or incoming documents can automatically be added to a dictionary over time to iteratively learn the new phrases for use as future documents arrive for processing. This automated updating of the dictionary can permit inferring suggestions, e.g., regarding newly-released or beta products, without requiring a domain expert to manually classify words.

Although the techniques have been described in language particular to structural features or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing devices 102, 104, or 200 such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" and/or "can," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" and the phrase "and/or" are used herein in an inclusive sense unless specifically stated otherwise. Accordingly, conjunctive language such as the phrases "X, Y, or Z," "X, Y, and/or Z," "at least X, Y, or Z," or "at least one of X, Y or Z," unless specifically stated otherwise, is to be understood as signifying that an item, term, etc., can be either X, Y, or Z, or a combination thereof.

The disclosure includes combinations of the examples described herein. References to a particular "example" and the like refer to features that are present in at least one example or configuration of what is within the scope of the disclosed subject matter. Separate references to "an example" or "particular examples" or the like do not necessarily refer to the same example or examples; however, such examples are not mutually exclusive, unless specifically indicated. The use of singular or plural in referring to "example," "examples," "method," "methods" and the like is not limiting.

Any routine descriptions, elements or blocks in the flow diagrams described herein and/or depicted in the attached figures should be understood as potentially representing modules, segments, or portions of code that include one or more executable instructions for implementing particular logical functions or elements in the routine. Alternative implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:

1. A system comprising:
   at least one processor;
   memory communicatively coupled to the at least one processor; and
   instructions stored in the memory and executable by the at least one processor to:
   receive, from a computing device operated by a user, a document associated with a first text segment and a second text segment, wherein the document includes a user experience written in natural language;
   identify a motif for the first text segment and the second text segment based on an inferred meaning of the first text segment and the second text segment;
   access a predetermined knowledge base including a dictionary associated with an ontology comprising a plurality of classes;
   determine a first set of values associated with the first text segment, the first set of values including a plurality of first values respectively corresponding to individual classes of the plurality of classes;
   determine that a first value of the plurality of first values is greater than a first predetermined threshold, the first value corresponding to a first class of the plurality of classes;
   infer a first actionable item associated with the first text segment based at least in part on the first class and the motif, wherein the first actionable item is an instruction for an action to be performed by another user to respond to the first text segment according to the motif, with the action corresponding to the first class and the motif;
   infer a second actionable item associated with the second text segment;
   determine a priority for the first actionable item and the second actionable item based on the motifs;
   determine a ranked list of actionable items based on the priority for the first actionable item and the priority for the second actionable item; and
   transmit the ranked list of actionable items to a computing device of the another user.

2. The system as claim 1 recites, wherein the one or more modules stored in the memory are further executable by the at least one processor to:
   determine a feature vector associated with the first text segment, wherein the feature vector comprises at least one of a parts-of-speech tag for the first text segment, stemmed output associated with the first text segment in view of other stemmed output, or a co-occurrence relationship between the first text segment and second text segments used in a similar context as the first text segment; and
   determine the first set of values based on the feature vector.

3. The system as claim 1 recites, wherein the plurality of classes of the ontology comprise at least one of a suggestion-indicator class for text segment(s) that represent the presence of a suggestion, a modal-indicator class for text segment(s) that represent the presence of a suggestion, an entity class for text segment(s) that represents an entity, an action class for text segment(s) that represents a behavior that is taken on an entity, a certainty class for text segment(s) that represents the confidence of the user regarding an entity or condition represented in the text segment(s), an emotion class for text segment(s) that represents feelings or beliefs of the user writing the text segment(s), a negation class for text segment(s) that change the meaning of other text segment(s) to a substantially opposite meaning, or a qualifier class for text segment(s) that represents descriptive terms used to describe an action or a condition.

4. The system as claim 1 recites, wherein the instructions are further executable by the at least one processor to:
   determine a second set of values associated with the second text segment, the second set of values including a plurality of second values respectively corresponding to individual classes of the plurality of classes;
   determine that each second value of the plurality of second values is less than or equal to the first predetermined threshold;
   determine a highest second value of the plurality of second values, the highest second value corresponding to a second class of the plurality of classes;
   wherein the inference of the second actionable item associated with the second text segment is based at least in part on the second class, wherein the second actionable item is an instruction for an action to be performed by the another user, with the action corresponding to the second class.

5. The system as claim 1 recites, wherein the instructions are further executable by the at least one processor to:
   determine a second set of values associated with the second text segment, the second set of values including a plurality of second values respectively corresponding to individual classes of the plurality of classes;
   determine that a second value of the plurality of second values is greater than a second predetermined threshold, the second value corresponding to a third class of the plurality of classes; and
   automatically map the second text segment to a second class of the plurality of classes.

6. The system as claim 5 recites, wherein the second predetermined threshold is associated with a greater value than the first predetermined threshold.

7. The system as claim 1 recites, wherein the instructions are further executable by the at least one processor to:
   determine a second set of values associated with the second text segment, the second set of values including a plurality of second values respectively corresponding to individual classes of the plurality of classes;

determine that a second value of the plurality of second values is less than a second predetermined threshold, the second value corresponding to a second class of the plurality of classes; and automatically refrain from mapping the second text segment to a second class of the plurality of classes.

8. The system as claim 1 recites, wherein the instructions are further executable by the at least one processor to:

receive, from a computing device operated by a second user, a new text segment;

determine, based at least in part on the dictionary, that the new text segment is associated with a second class of the plurality of classes; and infer an actionable item associated with the new text segment based at least in part on the second class and at least one grammar pattern.

9. A computer-implemented method comprising:

receiving, from a computing device operated by a user, a document associated with a first text segment and a second text segment, wherein the document includes a user experience written in natural language;

accessing a predetermined knowledge base including:
a dictionary associated with an ontology comprising a plurality of classes; and
a precedence table, the precedence table establishing a priority between motifs;

identify a set of classes for the first text segment;

determining, based at least in part on the dictionary and the set of classes, a first motif and a second motif for the first text segment, the first motif defining a first relationship between individual classes of the plurality of classes and the second motif defining a second relationship between individual classes of the plurality of classes;

determining, based at least in part on the precedence table, that the first motif precedes the second motif, wherein the precedence table ranks a plurality of motifs by priority;

inferring a first actionable item associated with the first text segment based at least in part on the first motif, wherein the first actionable item is an instruction for an action to be performed by another user to respond to the first text segment according to the first motif, with the action corresponding to the first motif;

inferring a second actionable item associated with the second text segment;

determining a priority for the first actionable item and the second actionable item based on the motifs;

determining a ranked list of actionable items based on the priority for the first actionable item and the priority for the second actionable item; and transmitting the ranked list of actionable items to a computing device of the another user.

10. The computer-implemented method as claim 9 recites, further comprising:

determining, based at least in part on the dictionary, that the first text segment is associated with a third motif defining a third relationship between individual classes of the plurality of classes; and determining, based at least in part on the precedence table, that the first motif precedes the third motif and that the third motif precedes the second motif.

11. The computer-implemented method as claim 9 recites, further comprising:

determining, based at least in part on the dictionary, that the first text segment is associated with a third motif defining a third relationship between individual classes of the plurality of classes; and determining, based at least in part on the precedence table, that the second motif precedes the third motif.

12. The computer-implemented method as claim 9 recites, further comprising, prior to receiving the document associated with the first text segment and the second text segment, generating the precedence table based at least in part on:

associating individual motifs with values representative of importance; and determining prioritizations between the individual motifs based at least in part on the values.

13. The computer-implemented method as claim 9 recites, further comprising:

updating the dictionary based at least in part on:
receiving a new text segment;
determining a first set of values associated with the new text segment, the first set of values including a plurality of first values respectively corresponding to individual classes of the plurality of classes;
determining that a first value of the plurality of first values is greater than a first predetermined threshold, the first value corresponding to a particular class of the plurality of classes;
presenting, via a user interface, a first indication identifying the particular class, the user interface configured to receive at least one of:
a first command to cause the new text segment to be mapped to a first entry in the dictionary corresponding to the particular class; or
a second command to cause the new text segment to be mapped to a second entry in the dictionary corresponding to a different class of the plurality of classes instead of the first entry; and
receiving input corresponding to the second command; and
updating the precedence table based at least in part on the input.

14. One or more non-transitory computer readable media storing computer-executable instructions that, when executed by the at least one processor, cause the at least one processor to perform acts comprising:

receiving, from a computing device operated by a user, a document associated with a first text segment and a second text segment, wherein the document includes a user experience written in natural language;

identifying a motif for the first text segment and the second text segment based on an inferred meaning of the first text segment and the second text segment;

accessing a predetermined knowledge base including a dictionary associated with an ontology comprising a plurality of classes, a class of the plurality of classes being associated with a positive sub-class, a negative sub-class, and a neutral-subclass;

determining, based at least in part on the ontology, that the first text segment and the second text segment are associated with the positive sub-class, the negative sub-class, or the neutral-subclass;

inferring a first actionable item associated with the first text segment based at least in part on the positive sub-class, the negative sub-class, or the neutral-sub-class, the motif, and at least one grammar pattern, wherein the first actionable item is an instruction for an action to be performed by another user to respond to the first text segment according to the motif, with the action corresponding to the positive sub-class, the negative sub-class, or the neutral-subclass and the motif;

inferring a second actionable item associated with the second text segment;

determining a priority for the first actionable item and the second actionable item based on the motifs;

determining a ranked list of actionable items based on the priority for the first actionable item and the priority for the second actionable item; and transmitting the ranked list of actionable items to a computing device of the another user.

15. The one or more non-transitory computer readable media as claim 14 recites, the acts further comprising updating the dictionary based at least in part on:

receiving a new text segment;

determining a first set of values associated with the new text segment, the first set of values including a plurality of first values respectively corresponding to individual classes of the plurality of classes;

determining that a first value of the plurality of first values is greater than a first predetermined threshold, the first value corresponding to a particular class of the plurality of classes;

presenting, via a user interface, a first indication identifying the particular class, the user interface configured to receive at least one of:

a first command to cause the first text segment to be mapped to a first entry in the dictionary corresponding to the particular class; or a second command to cause the first text segment to be mapped to a second entry in the dictionary corresponding to a different class of the plurality of classes instead of the first entry; and receiving input corresponding to the first command or the second command.

\* \* \* \* \*